(12) United States Patent
Hammad

(10) Patent No.: US 10,192,216 B2
(45) Date of Patent: Jan. 29, 2019

(54) CLOUD-BASED VIRTUAL WALLET NFC APPARATUSES, METHODS AND SYSTEMS

(71) Applicant: Visa International Service Association, San Francisco, CA (US)

(72) Inventor: Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/024,605

(22) Filed: Sep. 11, 2013

(65) Prior Publication Data

US 2014/0074637 A1  Mar. 13, 2014

Related U.S. Application Data

(60) Provisional application No. 61/699,665, filed on Sep. 11, 2012, provisional application No. 61/801,395, filed on Mar. 15, 2013.

(51) Int. Cl.
| | |
|---|---|
| G06Q 20/36 | (2012.01) |
| G06Q 20/38 | (2012.01) |
| G06Q 20/40 | (2012.01) |
| G06Q 20/12 | (2012.01) |
| G06Q 20/20 | (2012.01) |

(Continued)

(52) U.S. Cl.
CPC ............ *G06Q 20/36* (2013.01); *G06Q 20/12* (2013.01); *G06Q 20/204* (2013.01); *G06Q 20/227* (2013.01); *G06Q 20/325* (2013.01); *G06Q 20/3226* (2013.01); *G06Q 20/3227* (2013.01); *G06Q 20/3278* (2013.01); *G06Q 20/351* (2013.01); *G06Q 20/352* (2013.01); *G06Q 20/353* (2013.01); *G06Q 20/385* (2013.01); *G06Q 20/425* (2013.01)

(58) Field of Classification Search
CPC ...... G06Q 20/105; G06Q 20/20; G06Q 20/22; G06Q 20/363; G06Q 20/401
USPC .......................... 705/16, 26.1, 39, 40, 41, 44
See application file for complete search history.

(56) References Cited

U.S. PATENT DOCUMENTS

| | | |
|---|---|---|
| 5,280,527 A | 1/1994 | Gullman |
| 5,613,012 A | 3/1997 | Hoffman |

(Continued)

FOREIGN PATENT DOCUMENTS

| | | |
|---|---|---|
| EP | 1028401 A2 | 8/2000 |
| EP | 2156397 A1 | 2/2010 |

(Continued)

OTHER PUBLICATIONS

Wang, U.S. Appl. No. 62/000,288 (unpublished), Payment System Canonical Address Format filed May 19, 2014.

(Continued)

*Primary Examiner* — Olusegun Goyea
(74) *Attorney, Agent, or Firm* — Kilpatrick Townsend and Stockton LLP

(57) ABSTRACT

The CLOUD-BASED VIRTUAL WALLET NFC APPARATUSES, METHODS AND SYSTEMS ("EAE") transform user enhanced security transaction initiation requests using EAE components into time-limited, session-specific transaction bounding tokens. In some implementations, the disclosure provides a processor-implemented method of transforming a transaction bounding token request into transaction bounded tokens and purchase authorizations.

20 Claims, 55 Drawing Sheets

Example: Enhanced Transaction Identity Security Element Authentication

(51) Int. Cl.
*G06Q 20/22* (2012.01)
*G06Q 20/32* (2012.01)
*G06Q 20/34* (2012.01)
*G06Q 20/42* (2012.01)

(56) References Cited

U.S. PATENT DOCUMENTS

| | | |
|---|---|---|
| 5,781,438 A | 7/1998 | Lee |
| 5,883,810 A | 3/1999 | Franklin |
| 5,930,767 A | 7/1999 | Reber |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,453,301 B1 | 9/2002 | Niwa |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,528,067 B2 | 9/2013 | Hurry et al. |
| 8,533,860 B1 | 9/2013 | Grecia |

(56) References Cited

U.S. PATENT DOCUMENTS

| | | |
|---|---|---|
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 * | 11/2013 | Weiss ............... G06F 21/32 705/64 |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0032649 A1 * | 3/2002 | Selvarajan ............... G06Q 20/06 705/40 |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0088801 A1 * | 4/2007 | Levkovitz ............ H04L 12/1859 709/217 |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |

(56) References Cited

U.S. PATENT DOCUMENTS

| | | |
|---|---|---|
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0208658 A1 | 8/2011 | Makhotin |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0264543 A1* | 10/2011 | Taveau .................. G06Q 20/12 705/23 |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0130853 A1* | 5/2012 | Petri .................. G06Q 30/0609 705/26.35 |
| 2012/0143752 A1* | 6/2012 | Wong .................. G06Q 20/105 705/41 |
| 2012/0143767 A1 | 6/2012 | Abadir |
| 2012/0143772 A1 | 6/2012 | Abadir |
| 2012/0158580 A1 | 6/2012 | Eram |
| 2012/0158589 A1* | 6/2012 | Katzin .................. G06Q 20/12 705/44 |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0209749 A1* | 8/2012 | Hammad .................. G06Q 30/06 705/27.1 |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0239560 A1* | 9/2012 | Pourfallah .................. G06Q 50/22 705/40 |
| 2012/0246070 A1 | 9/2012 | Vadhri |
| 2012/0246071 A1 | 9/2012 | Jain |
| 2012/0246079 A1 | 9/2012 | Wilson et al. |
| 2012/0253852 A1* | 10/2012 | Pourfallah .................. G06Q 20/3276 705/4 |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054412 A1* | 2/2013 | Brendell .................. G06Q 20/12 705/26.41 |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0132854 A1* | 5/2013 | Raleigh .................. G06F 3/0482 715/738 |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0240622 A1* | 9/2013 | Zhou .................. G06Q 20/105 235/379 |
| 2013/0246199 A1* | 9/2013 | Carlson .................. G06Q 20/20 705/16 |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0257900 A1* | 10/2013 | Brahmakal .................. G01C 21/3679 345/619 |
| 2013/0262296 A1 | 10/2013 | Thomas |
| 2013/0262302 A1 | 10/2013 | Lettow |
| 2013/0262315 A1 | 10/2013 | Hruska |

(56) References Cited

U.S. PATENT DOCUMENTS

| | | |
|---|---|---|
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1* | 3/2014 | Hammad ............... G06Q 20/12 705/21 |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0197725 A1 | 7/2016 | Hammad |
| 2016/0269391 A1 | 9/2016 | Gaddam et al. |
| 2016/0308995 A1 | 10/2016 | Youdale et al. |
| 2017/0109745 A1 | 4/2017 | Al-Bedaiwi |
| 2017/0186001 A1 | 6/2017 | Reed et al. |
| 2017/0201520 A1 | 7/2017 | Chandoor |
| 2017/0295155 A1 | 10/2017 | Wong et al. |
| 2017/0364903 A1 | 12/2017 | Lopez |
| 2018/0075081 A1 | 3/2018 | Chipman |

FOREIGN PATENT DOCUMENTS

| | | |
|---|---|---|
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

(56) References Cited

OTHER PUBLICATIONS

Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Kaja, et al., U.S. Appl. No. 15/585,077 (Unpublished), System and Method Using Interaction Token, filed May 2, 2017.
Hammad, U.S. Appl. No. 15/977,921 (Unpublished), Integration of Verification Tokens with Mobile Communication Devices, filed May 11, 2018.
Raj, et al. U.S. Appl. No. 15/956,991 (Unpublished), Mobile Tokenization Hub, filed Apr. 19, 2018.

\* cited by examiner

Example: In-Store Enhanced Transaction Identity Security Element Authentication

Example Datagraph: Purchase Transaction Clearance ("PTC") component

Example: Virtual Wallet Mobile App - Offers

2202

Add a Payment Method

CARD INFORMATION
- Card Number
- Name on Card
- Expiration Date
- Security Code

BILLING ADDRESS
- Choose Address ▶

CARD SETTINGS
- Nickname
- Pre-configured preferences ▶

Save

Example: Cloud NFC Enrollment

2201

Create a v.me by Visa Account

ACCOUNT INFORMATION
- First & Last Name
- Email
- Password
- Country ▶

SECURITY QUESTIONS
- Choose Question ▶
- Question Answer
- Choose Question ▶
- Question Answer ☐ Agree to v.me Terms of Service Agree and Create Account

Figure 22

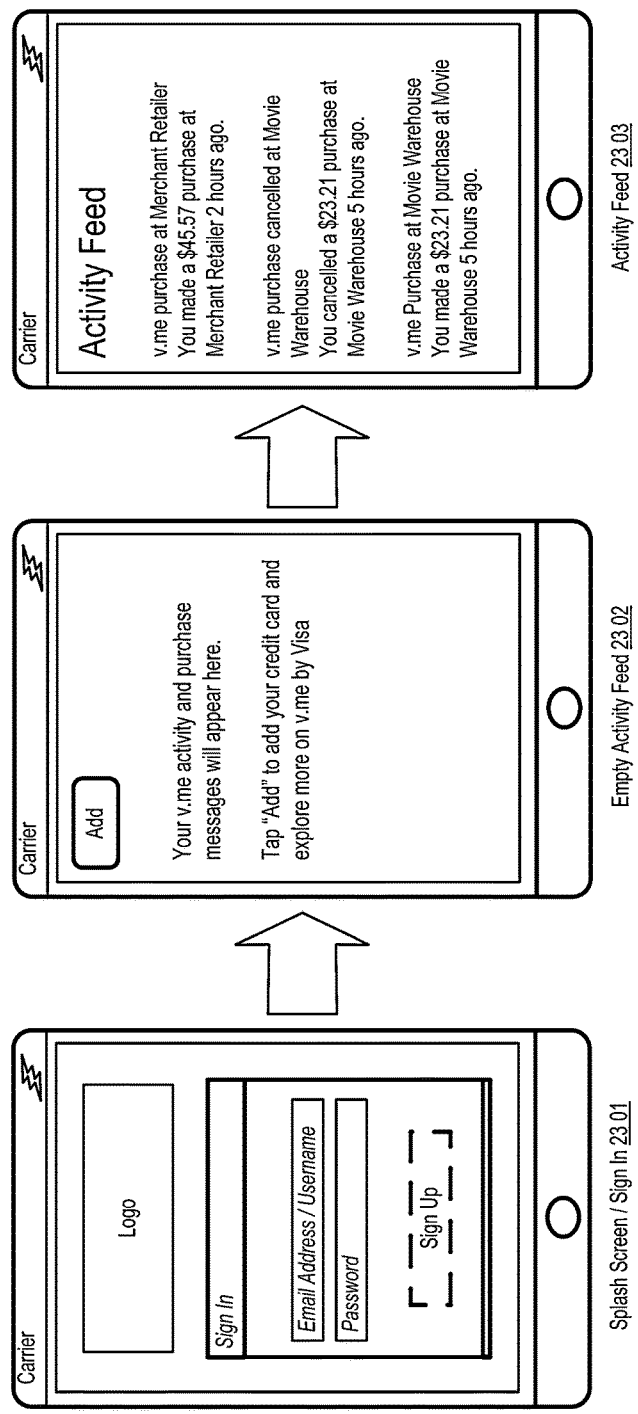
Figure 23 — Example User Interface: Combined Login and Enrollment with Activity Feeds Figure 29 Example Logic Flow: Secure Card Element Transaction Token Generation (SCETG Component 2900)

CLOUD-BASED VIRTUAL WALLET NFC APPARATUSES, METHODS AND SYSTEMS

PRIORITY CLAIM

This application claims priority under 35 USC § 119 to: U.S. provisional patent application Ser. No. 61/699,665 filed Sep. 11, 2012, entitled "CLOUD-BASED VIRTUAL WALLET NFC APPARATUSES, METHODS AND SYSTEMS,", and U.S. provisional patent application No. 61/801,395 filed Mar. 15, 2013, entitled "ENHANCED TRANSACTION SECURITY ELEMENT AUTHENTICATION APPARATUSES, METHODS AND SYSTEMS,". The entire contents of the aforementioned application(s) are expressly incorporated by reference herein.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods and systems for electronic purchase transactions, and more particularly, include CLOUD-BASED VIRTUAL WALLET NFC APPARATUSES, METHODS AND SYSTEMS ("EAE").

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Consumer transactions require a customer to select a product from a store shelf, and then to check them out at a checkout counter. Product information is entered into a point-of-sale terminal device, or the information is entered automatically by scanning an item barcode with an integrated barcode scanner, and the customer is usually provided with a number of payment options, such as cash, check, credit card or debit card. Once payment is made and approved, the point-of-sale terminal memorializes the transaction in the merchant's computer system, and a receipt is generated indicating the satisfactory consummation of the transaction.

BRIEF DESCRIPTION OF THE DRAWINGS

The accompanying appendices and/or drawings illustrate various non-limiting, example, innovative aspects in accordance with the present descriptions:

FIG. 22 shows example user interfaces for Cloud NFC enrollment, in one embodiment of the EAE;

FIG. 23 shows example user interfaces for combined login and enrollment with activity feeds, in one embodiment of the EAE;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

EAE

The CLOUD-BASED VIRTUAL WALLET NFC APPARATUSES, METHODS AND SYSTEMS (hereinafter "EAE" user interface) transform the framework and content of web pages, via EAE components, in response to user browsing activities. In some embodiments, this is carried out in real time.

Figure 1:
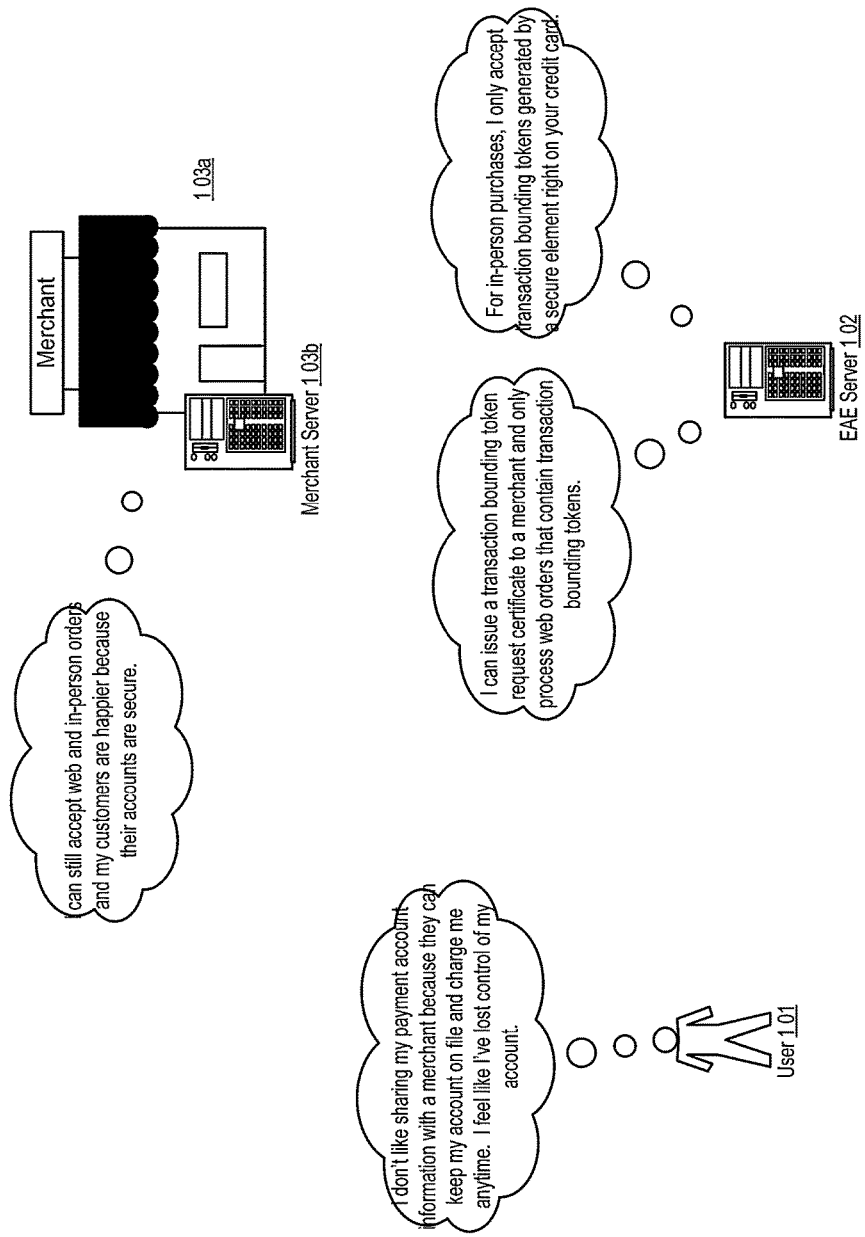
FIG. 1 shows a block diagram illustrating example aspects of enhanced transaction identity security element authentication, in one embodiment of the EAE.

FIG. 1 shows a block diagram illustrating example aspects of enhanced transaction identity security element authentication, in one embodiment of the EAE. In one embodiment, a user 101 may desire to engage in a transaction with a merchant either in-person, e.g., 103a, or virtually, e.g., 103b. The user may desire to communicate their payment account information to the merchant without allowing the merchant to recharge (e.g., charge again) the payment account at will. In one embodiment, the consumer may wish to share a current payment account number with a merchant. In one embodiment, an EAE server may issue transaction bounding tokens to either the user (e.g., a user mobile device, and/or the like) or a merchant (e.g., a merchant server 103b, a merchant in-store point-of-sale terminal, and/or the like). A transaction bounding token may be a secure token (e.g., a cryptographic key and/or the like) generated by or in communication with EAE server 102 and thereinafter required by EAE server to be submitted with the corresponding transaction authorization. In one embodiment, EAE server 102 may generate tokens using a secure element integrated into a chip/pin capability of a payment card (e.g., via secure token instruction code running in communication with a smart chip embedded in a payment card, and/or the like). In one embodiment, merchants can accept transactions in a more secure manner, increasing consumer confidence.

In one embodiment, the EAE server may allow transactions to be authorized and fulfilled securely while the consumer is present at a merchant, e.g., an in-store transaction, as well as when a consumer places an order via a merchant website. In the in-store context, a secure element on a consumer's payment card may be configured to generate transaction tokens. Transaction tokens may be time-limited, merchant specific, transaction specific, amount specific, recurrence specific (e.g., only usable for a specific number of transactions and/or a specific number of transactions at a given amount), and/or the like. However, in instances where a consumer wishes to complete a transaction remotely such as by a merchant's website, it may be difficult for the consumer to allow the merchant to utilize the secure element on the consumer's card. For example, in some instances, a dedicated reader may be required for a consumer to complete a transaction remotely. In such embodiments, the consumer must insert their card containing the secure element such that the reader may in this embodiment perform the function of a merchant located point-of-sale device. In order to facilitate commerce where a dedicated reader is not available for remote transactions, in some embodiments, the EAE server may instead issue a secure certificate to a merchant for use in card not present and/or remote transactions. The secure certificate may be utilized by the merchant to generate transaction tokens in much the same manner as may be accomplished by a merchant in communication with the secure element embedded in a consumer's payment card. By allowing payment tokens to be generated by both secure elements embedded in payment cards, over the air via a server acting as a secure embedded element proxy, and via certificates issued to merchants (e.g., online), a payment network may require that all transactions submitted through the network be facilitated by tokens. Additionally, embodiments may also allow physical payment cards to use dynamic tokens and/or NFC enabled (or similar communication technology) devices to take the role of either card or reader in embodiments described herein. Such a configuration allows the EAE server to secure both in person and remote commerce utilizing tokens while simultaneously reducing or eliminating the instances where a consumer's master card number or account number are transferred in order to complete a transaction.

In embodiments where a merchant server has been issued a certificate to generate transaction tokens, the tokens may be generated for a given transaction utilizing a variety of mechanisms discussed herein. For example, in one embodiment, a merchant may utilize the issued certificate and/or an issued private key in order to cryptographically sign a transaction token request. For example, in one embodiment, a merchant may concatenate a variety of strings into a single string/value and encrypt the string/value using an issued key. In one such implementation, a merchant website may concatenate a merchant identifier string such as a merchant ID number issued by the payment network, a transaction amount, a consumer identifier, and a time of transaction. These various strings may be combined into one string and the resultant string encrypted utilizing the issued private key. This private key may then be transmitted to the EAE server wherein the EAE server may decrypt the string and thereafter generate a transaction token based on the information contained therein. The EAE server may respond to the merchant Web server with a transaction bounding token, which the merchant may then submit in addition to or in place of a consumer charge account number, e.g. a credit card number and/or the like, in order to authorize and receive payment for a given transaction. In other embodiments, the transaction token may be generated directly on the merchant server, such as may be the case when the merchant server has been issued software code and/or a device sufficient to replicate or stand-in for the capabilities of the secure element contained on consumer's payment cards.

Further implementations of the EAE may allow a secure element contained on a user's payment card to perform the features described herein without being in physical contact or proximately connected to a merchant point-of-sale reader. For example, in one embodiment, a user's mobile device such as a mobile phone may operate as an NFC reader and perform the features otherwise performed herein by a merchant point-of-sale reader. In so doing, the user mobile device may then perform out of band communications with the EAE server to retrieve and/or calculate information that is not available or not readable from the user's payment card. In so doing, the mobile phone or device may act as a proxy for a secure element on a card and may in fact assert itself as a contactless card to a merchant point-of-sale reader device.

In some embodiments, a consumer's card containing a secure element may be placed in physical contact with a merchant point-of-sale reader device. The point-of-sale reader device may provide power to the secure element, such as a smart chip, and interrogate the secure device to determine the device type, a user's account number, the user's name, an expiration date, a count representing the number of times a read has been performed on the secure element, and/or the like. Additionally, a secure key that is not readable directly by a reader but yet is contained on the card, e.g., a key accessible by the card but not readable by a reader, may allow a reader in communication with the card element to request that the secure key be used to encrypt values otherwise readable from the card or values submitted by the reader to the card (e.g., to use the secure key that is on the card but not directly readable by the reader to perform encryptions on arbitrarily submitted values). For example, a reader may request that the current counter value, the card account number, and the expiration date be concatenated together and encrypted using the secure key. The resultant value may then be used as a token in an out-of-band communication to authenticate a transaction. Since successive calls to this function would increment the read counter contained on the secure card element, the value returned from the above request response would vary each time it was issued to the secure card element. A pay network server, aware of all submitted transactions on a card, may in one implementation be able to reject transactions that are submitted otherwise with the correct account number and payment information if the submission contains a value encrypted using the secure key that does not match the appropriate counter number for the secure card element being used.

Similarly, in other embodiments, a consumer's mobile device may take on the role of a secure element on a payment card. For example, a near field communication chip embedded in a mobile device may receive a request from a merchant reader to identify what type of card has been loaded onto the NFC chip. In some embodiments, this request received by the mobile phone NFC chip may generate an out-of-band communication to the EAE server to retrieve a valid card type. This card type may then be returned to the merchant point-of-sale reader. Further requests from the merchant point-of-sale reader may be similarly fielded, such as a request for an account number, a read counter value, and a value encrypted using a secure key. This request, which in other embodiments may be processed directly on a physical card chip, may instead be relayed by an out-of-band connection (e.g., WiFi, cellular, and/or the like) to the EAE server, which may then provide an appropriate counter value, pan number, expiration date, and/or the like. In some embodiments, the EAE server that has provided the data referenced above may then also receive back the data as part of a merchant transaction authentication request. Since in such embodiments the EAE server operates both as the read counter and account number issuer and the read counter and account number verifier, the EAE server may provide dynamically generated values in response to such requests and may thereafter authenticate transactions that are submitted using these dynamically generated values. In so doing, even though adversaries (e.g., hackers, malware, and/or the like) may be able to observe all of the data being transmitted between the entities in such an embodiment, the adversaries would not be able to submit any malicious transactions because once transmitted the values used would no longer be valid. For example, an encryption performed using either the secure element on a card or over-the-air by the EAE server for a given transaction, would not be able to be used for another transaction even should the transaction parameters remain the same because the encrypted value generated using the secure key (e.g., the unreadable secure key on the card element or the secure key contained on the EAE server) would be different after each read or request due to the read counter noted above incrementing either on the card or in the cloud.

Although EAE embodiments described herein may refer to a communication occurring with a merchant server, a secure element, an issuer server, a consumer, and/or the like, it should be appreciated that any server and/or entity herein may assume the role of any other server and/or entity disclosed. For example, secure tokens, e.g. transaction bounding tokens and/or the like, that may be generated in one implementation by a secure element contained on a payment card, may in other embodiments be generated by the user's mobile device in communication with a card issuer server operating over a network connection in communication with the mobile device. Similarly, in other embodiments, transaction authorizations may be performed by merchant servers operating on behalf of issuer servers, pay network servers operating on behalf of merchants or issuers, and/or the like.

Figure 2:
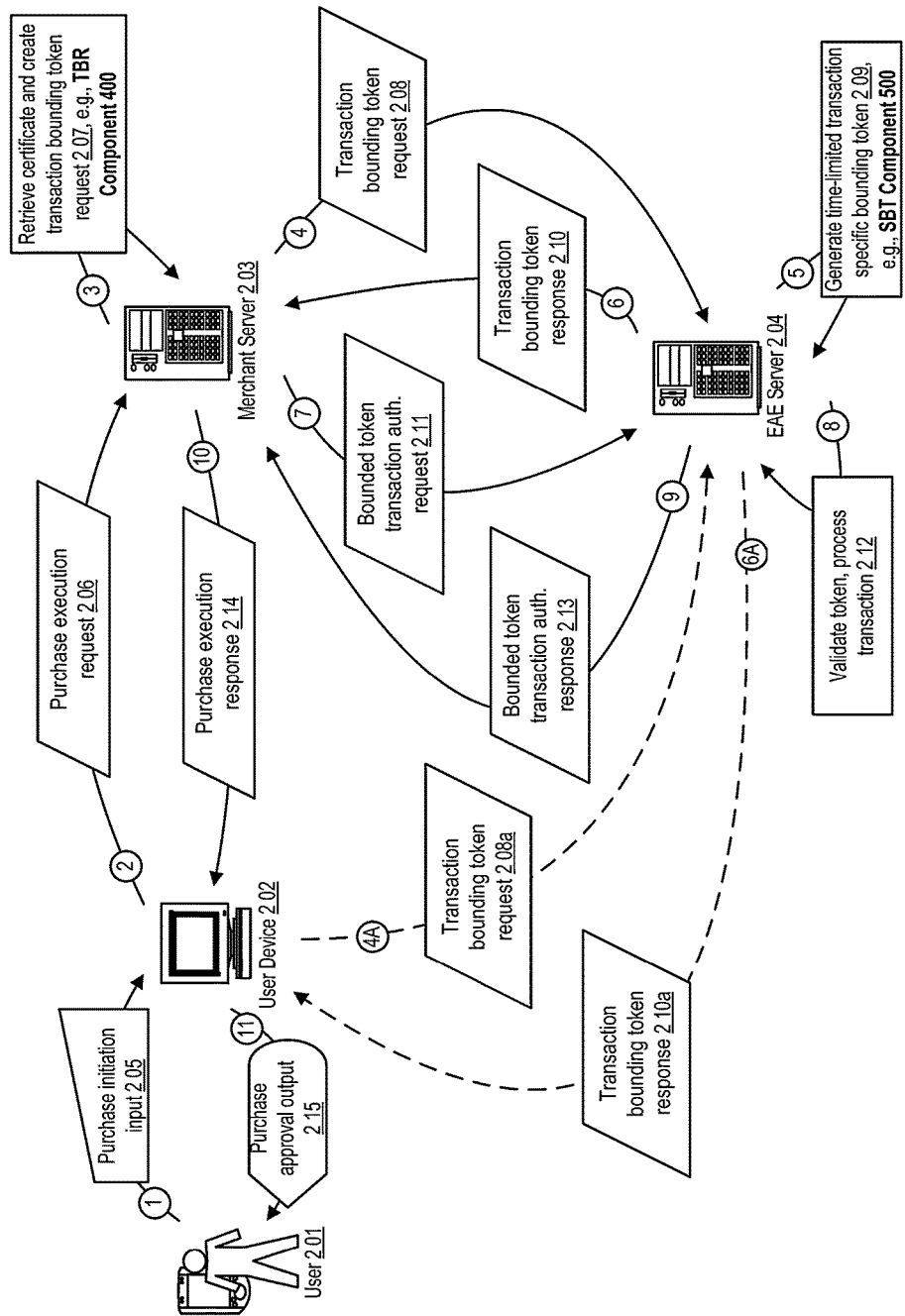
FIG. 2 shows a datagraph diagram illustrating example aspects of remote enhanced transaction identity security element authentication, in one embodiment of the EAE.

FIG. 2 shows a datagraph diagram illustrating example aspects of remote enhanced transaction identity security element authentication, in one embodiment of the EAE. In one embodiment, user 201 may provide a purchase initiation input 205 to a user device. A purchase initiation input may be, in one embodiment, substantially in the form of a payment account authentication request (e.g., a card number, expiration date, magnetic stripe information, and/or the like). In other embodiments, the purchase initiation input may contain more or less data (e.g., purchase item quantities/prices/SKU's, merchant authentication information, consumer privacy preferences, and/or the like). In one embodiment, a purchase execution request 206 may be sent to merchant server 203 containing information substantially similar to the purchase initiation input. In one embodiment, the purchase execution request may additionally contain data stored on a user's mobile device (e.g., contact information, preference information, and/or the like). In one embodiment, merchant server 203 may retrieve a certificate issued by an EAE server (e.g., EAE server and/or the like). A transaction bounding token request may then be generated, e.g., and a transaction bounding token request 208 may be submitted to EAE server 204. In another embodiment, a user device may submit the transaction bounding token request directly to an EAE server 204, e.g., 208a. Further detail with respect to creating a transaction bounding token request may be found herein and particularly with respect to FIG. 4, e.g., TBR Component 400. An example transaction bounding token request 208, substantially in the form of an HTTP(S) POST message including XML-formatted data, is provided below:

```
POST /transaction_bounding_token_request.php HTTP/1.1
Host: www.EAEserver.com
Content-Type: Application/XML
Content-Length: 667
<?XML version = "1.0" encoding = "UTF-8"?>
<transaction_bounding_token_request>
    <timestamp>2020-12-12 15:22:43</timestamp>
    <auth type="merchant">
        <api key="87KJHIUIUYGUY" />
        <certificate>
            &GHJHTYFDRTJDTRTRDTRFD
            *876CFDTRW#E#UYFYUKW#@
            LO*I&TRDFKHDRT$WGFVYIU
        </certificate>
    </auth>
    <token_request>
        <session_id value="SJHGJUYGUYG" />
        <consumer_payment_data>
            <consumer_id value="C876876" />
            <name value="John Consumer" />
            <card_num value="4111 1234 9876 1234" />
            <exp_date value="12-28" />
            <transaction_amount value="139.80" />
            <token_active_time_requested value="600sec" />
        </consumer_payment_data>
        <transaction_data>
            <item qnty="1" sku="E5433"
                cost="19.95">Toaster</item>
            <item qnty="2" sku="E1187"
                cost="39.95">Blender</item>
        </transaction_data>
        <merchant_token_certificate issued_by="EAESERVER">
            KJHBJHJHVHGTJDTRTRDTRFD
            OIJ878767RW#E#UYFYUKW#@
            NIUBNUYBRT$WGFVYIU
        </merchant_token_certificate>
    </token_request>
</transaction_bounding_token_request>
```

In one embodiment, EAE server 204 may receive a transaction bounding token request 208 and generate a time-limited, session specific transaction bounding token. The bounding token may be transmitted to a merchant server (or, in one embodiment, a user device) for use in submitting a transaction authorization request 211. Further detail with respect to creating a time-limited transaction specific bounding token may be found herein and particularly with respect to FIG. 5, e.g., SST Component 500.

In one embodiment, a transaction bounding token response containing the generated bounding token may be sent to the merchant, e.g., a transaction bounding token response 210. In other embodiments, the transaction bounding token response may be sent to a user device, e.g., 210a. An example transaction bounding token response 210, substantially in the form of an HTTP(S) POST message including XML-formatted data, is provided below:

```
POST /transaction_bounding_token_response.php HTTP/1.1
Host: www.merchantserver.com
Content-Type: Application/XML
Content-Length: 667
<?XML version = "1.0" encoding = "UTF-8"?>
<transaction_bounding_token_response>
    <timestamp>2020-12-12 15:22:52</timestamp>
    <auth>
        <api key="LKJOIJYGUY" />
        <certificate>
            987KJBHVJDTRTRDTRFD
            0CFCREXREW#E#UYFYUKW#@
            CTRCTRF$WGFVYIU
        </certificate>
    </auth>
    <bounded_token>
    <token_bounded_to>
        <merchant value="self" />
        <consumer_id value="C876876" />
        <session_id value="SJHGJUYGUYG" />
        <transaction amount="139.80" />
        <payment_account>
            <card_num value="4111 1234 9876 1234" />
            <exp_date value="12-28" />
        </payment_account>
        <time duration="600sec" start="2020-12-12 15:22:52" />
    </token_bounded_to>
    <bounded_token type="secure_key">
        JHVBCFTRDXCTRF
        54YFTUJVH%E$DRTFY
        GCFHFRTDR$DTFYU&GH
    </bounded_token>
</transaction_bounding_token_response>
```

In one embodiment, the merchant may then extract the bounded token for use in submitting the transaction authorization. In one embodiment, the token may be only suitable for authorizing a transaction for a certain length of time, for a certain user, for a certain amount, for certain purchase products, and/or the like. In one embodiment, merchant server 203 may submit a transaction authorization request containing the bounded token, e.g., a bounded token transaction authorization request 211. An example bounded token authorization request 211, substantially in the form of an HTTP(S) POST message including XML-formatted data, is provided below:

```
POST /bounded_token_authorization_request.php HTTP/1.1
Host: www.EAEserver.com
Content-Type: Application/XML
Content-Length: 667
<?XML version = "1.0" encoding = "UTF-8"?>
<bounded_token_authorization_request>
    <timestamp>2020-12-12 15:22:52</timestamp>
    <auth>
        <api key="876DDSSS" />
        <certificate>
            VVFCTRFCDTRRTRDTRFD
            0CFCREXREW#E#UYFYUKW#@
            CTRCTRF$WGFVYIU
        </certificate>
    </auth>
    <transaction_to_authorize>
        <bounded_token type="secure_key">
            JHVBCFTRDXCTRF
            54YFTUJVH%E$DRTFY
            GCFHFRTDR$DTFYU&GH
        </bounded_token>
        <consumer_id value="C876876" />
        <session_id value="SJHGJUYGUYG" />
        <transaction amount="139.80" />
        <payment_account>
            <card_num value="4111 1234 9876 1234" />
            <exp_date value="12-28" />
        </payment_account>
```

```
            </transaction_to_authorize>
            <transaction_to_authorize>
            ...
            </transaction_to_authorize>
        </bounded_token_authorization_request>
```

In one embodiment, EAE server 204 may then validate the token to determine that it is within accepted values 212 (e.g., bounded token is active, not expired, for the appropriate user, transaction amount, and/or the like). In one embodiment, EAE server 204 may query a stored token database containing details regarding previously generated tokens and the validation parameters for each token. If the bounded token is valid for the transaction being submitted, the transaction is then submitted for authorization (e.g., submitted to a pay network). In one embodiment, portions of the bounded token transaction authorization request 211 are processed by a pay network server while other portions are processed on top of or in parallel to a pay network server. In one embodiment, EAE server 204 may generate a bounded token transaction authorization response 213, communicating a transaction status (e.g., approved, declined, and/or the like) to the merchant server 203. In one embodiment, merchant server 203 may then transmit a purchase result (e.g., success message, retry signal, and/or the like) to user device 202, e.g., a purchase execution response 214. User device 202 may render a purchase approval output 215 informing the user of the transaction authorization.

Figure 3:
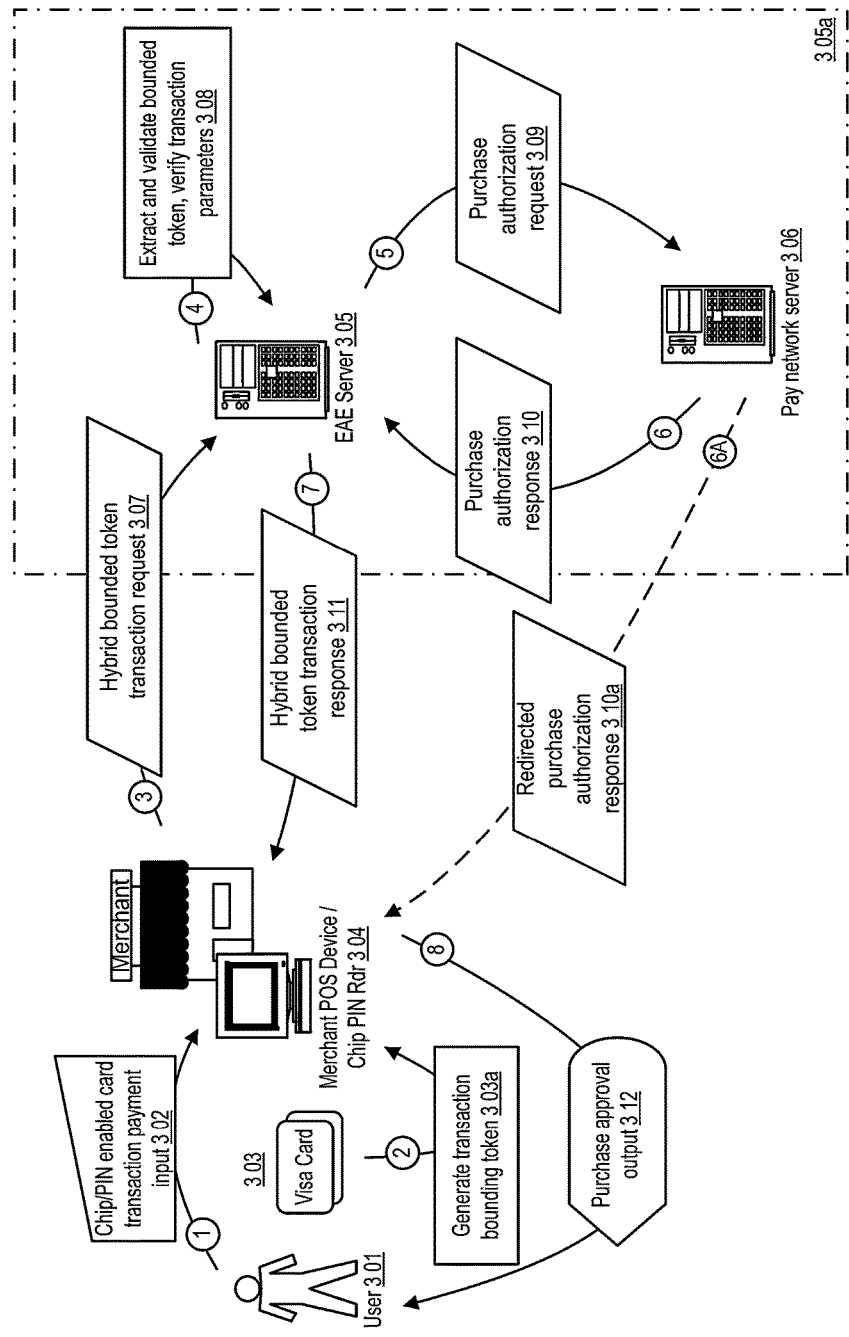
FIG. 3 shows a datagraph diagram illustrating example aspects of in-store enhanced transaction identity security element authentication, in one embodiment of the EAE.

FIG. 3 shows a datagraph diagram illustrating example aspects of in-store enhanced transaction identity security element authentication, in one embodiment of the EAE. In one embodiment, user 301 may initiate a chip/pin enabled card transaction payment input 302 with a merchant 304. A transaction payment input may be presenting an item to a cashier in a store, self-scanning an item at a checkout kiosk, using a self-pay application for a merchant on a user mobile device, and/or the like. In one embodiment, user 301 may present a payment card 303 that contains an integrated chip/pin capability. The user may insert the card into a reader at the merchant point-of-sale device, waive a card over a near-field communication reader, and/or the like. In so doing, a secure transaction bounded token may be generated using the payment card, e.g., 303*a*. In one embodiment, the merchant may query the card for a unique identifier. In one embodiment, the transaction bounded token is generated by executing software instructions contained on non-volatile memory in communication with the consumer payment card 303. In other embodiments, the consumer card 303 may have an integrated battery and software operating system capable of generating the transaction bounded token.

In one embodiment, the merchant point-of-sale device 304 may transmit a request to EAE server 305 containing both a generated transaction bounding token and a transaction authorization request (e.g., consumer credit account number, expiration date, consumer billing address, transaction dollar amount, and/or the like), e.g., a hybrid bounded token transaction request 307. In one embodiment, the EAE server 305 and pay network server 306 are the same server, e.g., 305*a*. In one embodiment, EAE server 305 may validate the token to determine if it is valid for the transaction being presented by the merchant. For example, the amount of the transaction may be checked against a portion of the token (such as by decrypting the token using a public/private key pair mechanism) to determine if the transaction amount is valid. Similarly, other transaction, user, or merchant information may be verified using the token. In one embodiment, the token may be used to query a third-party server (e.g., using the token as a lookup value in a remote database) to determine parameters that are associated with the bounded token, the transaction, the consumer, the merchant, and/or the like so that the transaction may be verified. In one embodiment, if the token is valid a purchase authorization request 309 is sent to a pay network server 306, which may respond with a purchase authorization message 310. In other embodiments, the purchase authorization response may be redirected by the pay network server 306 to the merchant point-of-sale device, a user device, and/or the like, e.g., 310*a*. In one embodiment, the EAE server may transmit a hybrid bounded token transaction response, e.g., 311, indicating the status of the bounded token request 307 (e.g., approved, declined, and/or the like). In one embodiment, the merchant point-of-sale device may indicate to the user or a store clerk a purchase approval output, e.g., 312.

Figure 4:
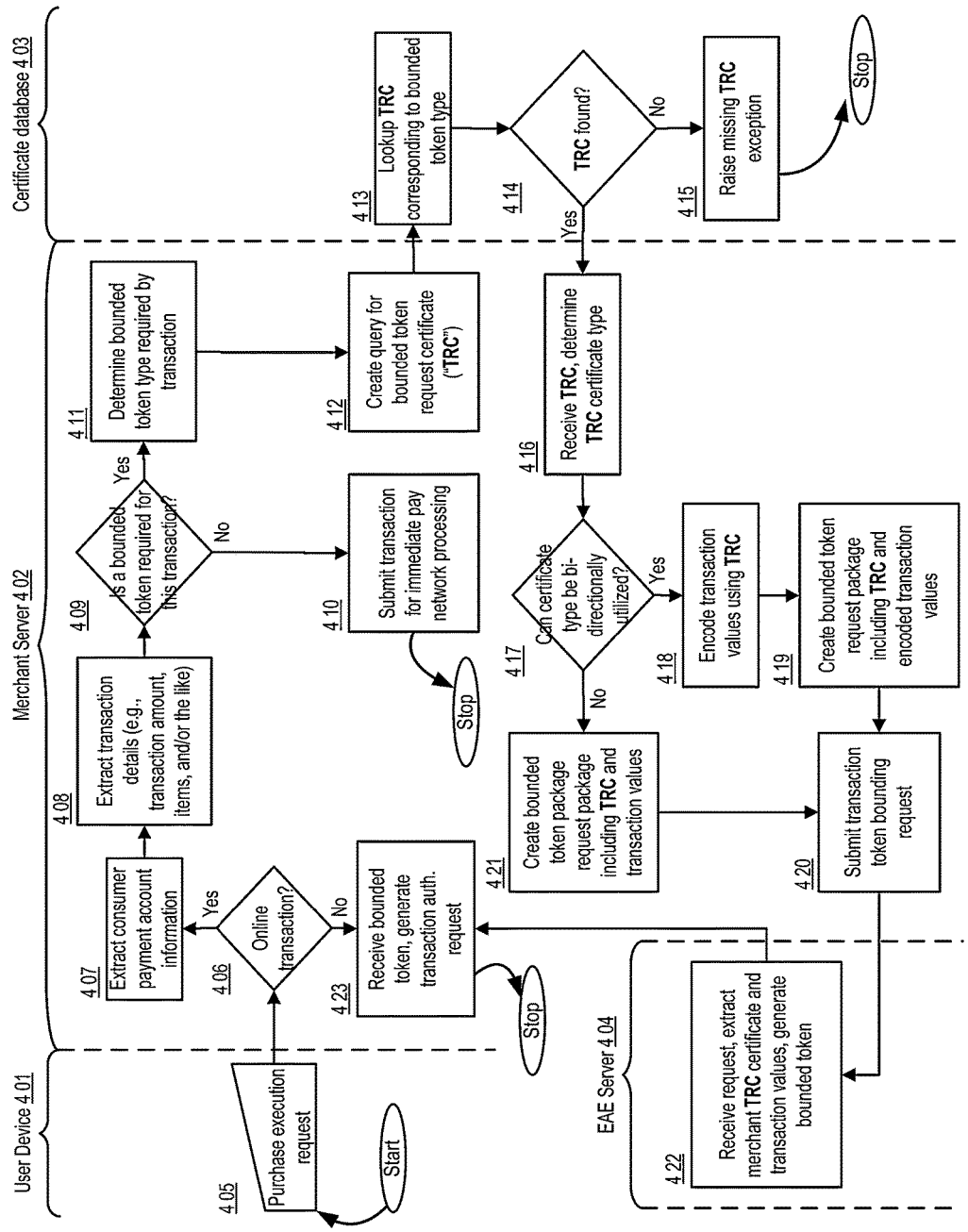
FIG. 4 shows an example logic flow illustrating transaction bounding token creation, e.g., TBR Component 400, in one embodiment of the EAE.

FIG. 4 shows an example logic flow illustrating transaction bounding token creation, e.g., TBR Component 400, in one embodiment of the EAE. In one embodiment, a purchase execution request is received by user device 401, e.g., 405. The user device may transmit the request to merchant server 402. If the transaction is an online transaction, e.g., 406, customer payment account information is extracted from the request, e.g., 407, and traction details are extracted from the request, e.g., 408. If the request is not for a bounded token, e.g., 409, the transaction may be submitted for immediate pay network processing, e.g., 410. In one embodiment, a type of bounded token is determined based on the requirements of the transaction (e.g., a long time token for a long authorization, a user bound token if security is of concern to the user, and/or the like), e.g., 411. In one embodiment, a query for a bounded token request certificate is created, e.g., 412. A token request certificate may be used by a merchant to request tokens. In one embodiment, a certificate database 403 is queried and a lookup is performed, e.g., 413. If a token request certificate record is not found, e.g., 414, an exception may be raised, e.g., 415. Otherwise in one embodiment, the token request certificate may be returned to the merchant server, which may determine a type of the certificate, e.g., 416 (e.g., public key, sha256 hash, and/or the like). In one embodiment, if the certificate can be read bi-directionally (by both merchant and EAE servers, e.g., 417, transaction data may be encoded using the token request certificate, e.g., 418 and a bounded token request package containing the token request certificate and encoded transaction values may be created, e.g., 419. If the certificate can not be read bidirectionally, e.g., 417, a bounded token package containing the token request certificate and unencoded (or, in one embodiment, encoded using a different means like a shared public/private key scheme, and/or the like) transaction data is created, e.g., 421. The bounded token request package is submitted to EAE server 404, e.g., 420, which may extract the token request certificate and transaction values and generate a bounded token, e.g., 422. In one embodiment, the bounded token is then transmitted to the merchant server 402, e.g., 423.

Figure 5:
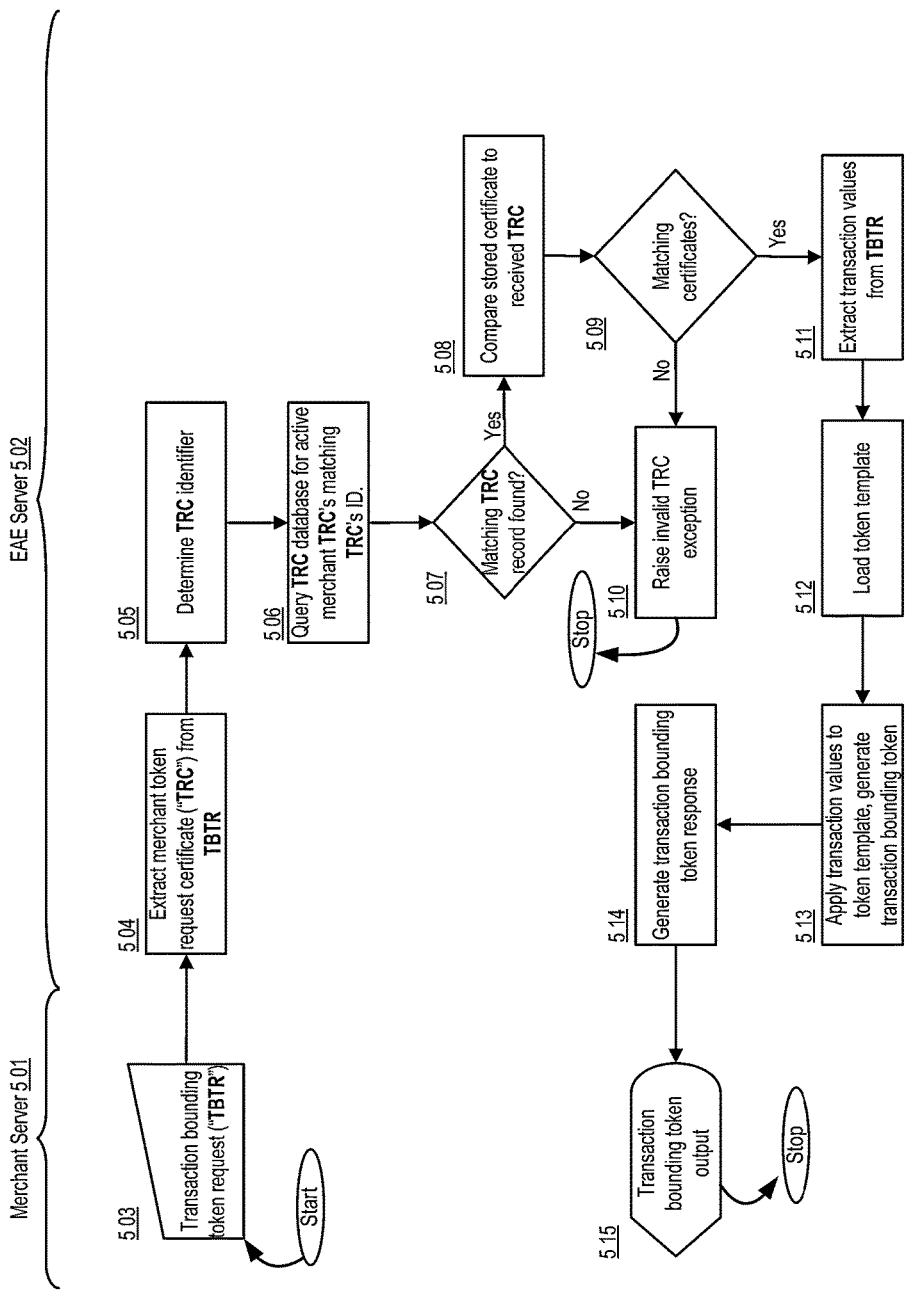
FIG. 5 shows an example logic flow illustrating transaction bounding token creation, e.g., SST Component 500, in one embodiment of the EAE.

FIG. 5 shows an example logic flow illustrating transaction bounding token creation, e.g., SBT Component 500, in one embodiment of the EAE. In one embodiment, merchant server 501 may submit a transaction bounding token request, e.g., 503 to EAE server 502. In one embodiment, a token request certificate (such as that generated with respect to FIG. 4) may be extracted, e.g., 504. A token request certificate identifier may be determined, e.g., 505 (i.e., by looking at the certificate header, and/or the like). In one embodiment, a database of active merchant token request certificates (which may be previously stored in a merchant database or a token database, in one embodiment) is queried for a matching token request template identifier, e.g., 506. In one embodiment, if a matching record is not found, e.g., 507, an invalid token request exception may be raised, e.g., 510. If a match is found, e.g., 507, a stored certificate (i.e., an authoritative record or representation of the certificate) may be compared to the received token request certificate, e.g., 508. If the certificates do not match, e.g., 509, an invalid token request certificate exception may be raised, e.g., 510. In one embodiment, transaction values may be extracted from the transaction bounding token request, e.g., 511, a token template may be loaded, e.g., 512, and transaction values may be applied to the template, e.g., 513. In one embodiment, the transaction values will be fully encoded in the template such that they may be later extractable by the EAE server 502, merchant server 501, and/or the like. In one embodiment, a transaction bounding token response is generated, e.g., 514 and transmitted to merchant server 501, which may later use the transaction bounding token, e.g., 515, to authorize a transaction.

Figure 6A:
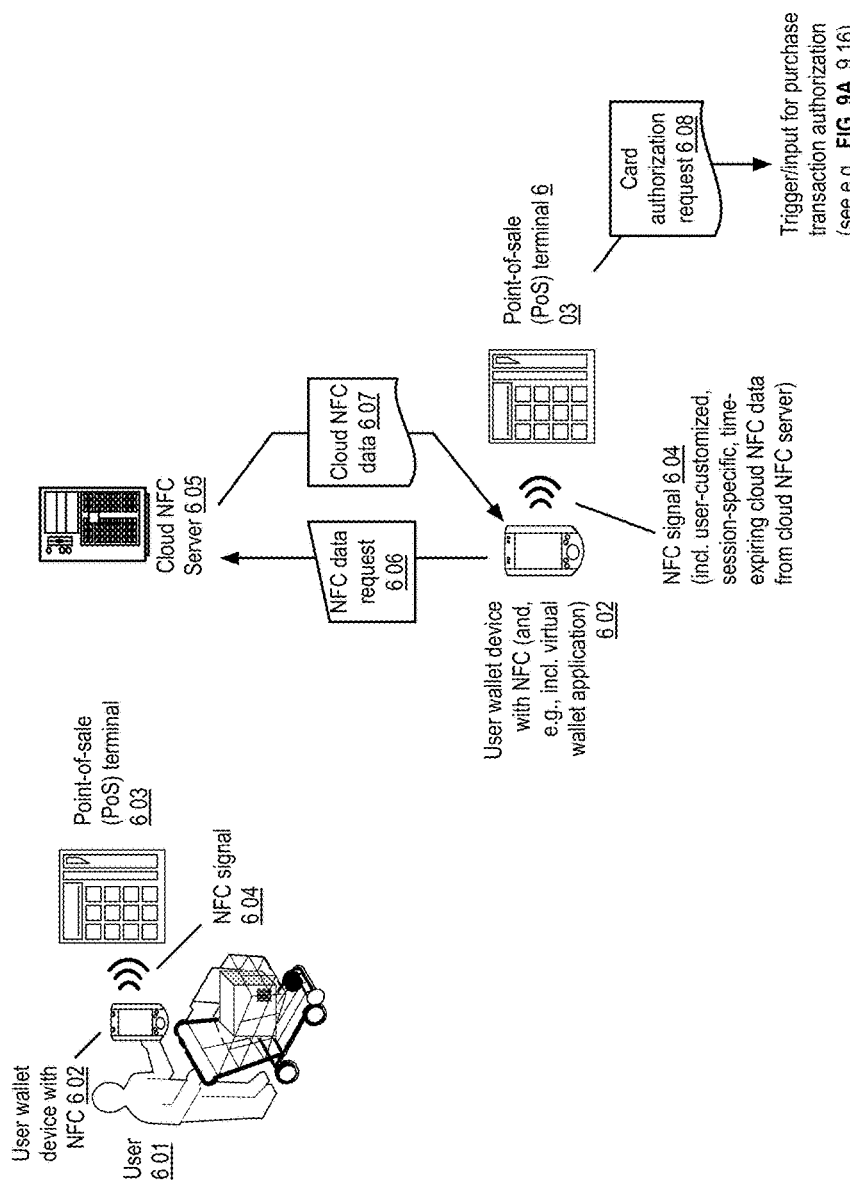
FIGS. 6A-B show block diagrams illustrating example aspects of the EAE.
Figure 6B:
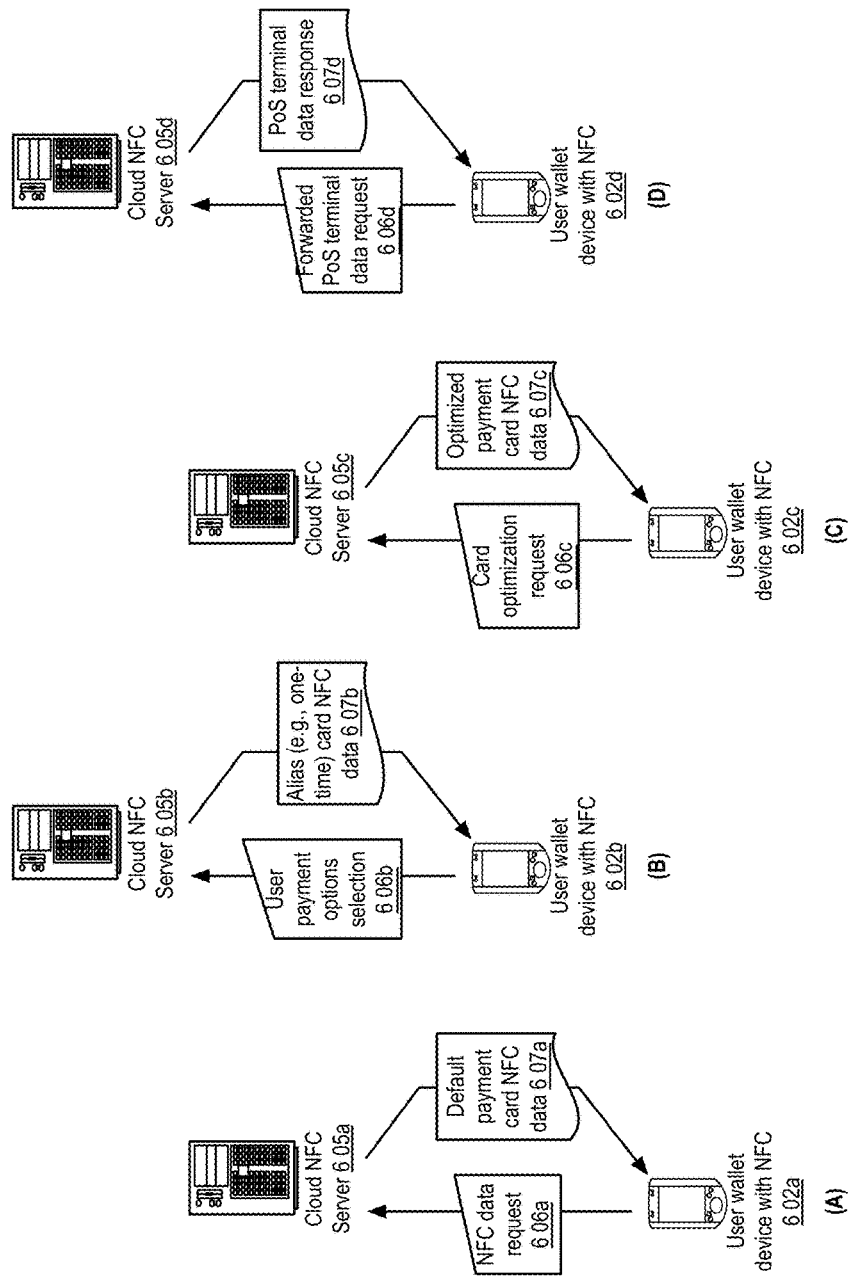

FIGS. 6A-B show block diagrams illustrating example aspects of the EAE. With reference to FIG. 6A, in some embodiments, a user, e.g., 601, may wish to utilize a virtual wallet account to purchase a product, service, offering, and/or the like ("product"), from a merchant via a merchant online site or in the merchant's store. The user may utilize a user wallet device, e.g., 602, to access the user's virtual wallet account. For example, the user wallet device may be a personal/laptop computer, cellular telephone, smartphone, tablet, eBook reader, netbook, gaming console, and/or the like. The user wallet device may be a NFC equipped hardware device (e.g., electronic card having multiple accounts, smartphone, tablet, etc.). In some embodiments, the user wallet device may provide payment data to a point-of-sale (PoS) terminal 603, via a NFC signal 604. In some embodiments, the user wallet device may obtain the payment data to provide the PoS terminal from a cloud NFC server 105 storing the user's virtual wallet account data, user profile, etc. For example, the cloud NFC server may provide a user-customized, shopping session-specific, time-expiring set of payment data, e.g., 607, that the user wallet device may utilize in the payment transaction (see 608), or for responding to a request for data provided by the PoS terminal to the user wallet device.

Such use of cloud NFC data may serve various purposes. As an example, with reference to FIG. 6B, in some embodiments, the cloud NFC data may include a pre-selected default payment card that the user has chosen to perform NFC-based purchase transactions, see e.g., 607*a*. A user wallet device 602*a* may provide a request for cloud NFC data 606*a*, the user may provide authentication information to verify access authorization for the virtual wallet application (e.g., a 4-digit pin, a password, a fingerpint or other biometric identifier, a touchscreen swipe signature/gesture, etc.). In response, the cloud NFC server 605*a* may retrieve and provide a default set of payment data 607*a* (e.g., previously set by the user via a web/mobile interface of the virtual wallet application) as the cloud NFC data 607*a* with which the user wallet device 602*a* may generate the NFC transmission to the PoS terminal for purchase transaction authorization. As another example, the use of cloud NFC data 607*a* from cloud NFC server 605*a* may allow the user to utilize any device 602*a* having an NFC communication peripheral device to securely access their default virtual wallet NFC payment data 607*a*.

As another example, the cloud NFC data may include an alias as a substitute for the user's real payment data, in order to provide anonymity to the user and/or protect the privacy of the user from the merchant operating the PoS terminal, see e.g., 607*b*. A user wallet device 602*b* may provide user payment options selection 106*b*; the user may elect to require secure authorization of the transaction (see, e.g., FIG. 15A, cloak button 1522) to effectively cloak or anonymize some (e.g., pre-configured) or all identifying information such that when the user selects pay button in the virtual wallet application (see, e.g., FIG. 10A, 1521) the transaction authorization is conducted in a secure and anonymous manner. In response, the cloud NFC server 605*b* may generate and provide an alias set of payment data (e.g., a one-time randomly generated payment card) as the cloud NFC data with which the user wallet device 602*b* may generate the NFC transmission to the PoS terminal for purchase transaction authorization. As another example, the cloud NFC data 607*b* may include an alias as a substitute for payment data including a number of payment cards (e.g., wherein the payment is split among a number of cards).

As another example, the cloud NFC server 605*c* may determine the best payment options for the user to utilize for the purchase transaction, and may provide cloud NFC data 607*c* accordingly. Thus, the user may obtain the benefit of the optimized payment card to use via with the user wallet device 602*c*. A user wallet device 602*c* may provide a request for automatic payment card optimization 606*c* (e.g., along with the contents of a virtual shopping cart so that the could NFC server can identify the optimum funding source(s) to use in the purchase transaction). In response, the cloud NFC server 605*c* may generate a recommendation for the optimum payment source(s) to utilize in the purchase transaction, and may provide an alias set of payment data (e.g., a one-time randomly generated payment card) associated with the optimum payment source(s) as the cloud NFC data 607*c* with which the user wallet device 602*c* may generate the NFC transmission to the PoS terminal for purchase transaction authorization.

As another example, the cloud NFC server 605*d* may obtain PoS terminal commands provided by the PoS terminal to the user wallet device 602*d* during a NFC communication session. The user wallet device may forward the PoS terminal (e.g., without any modification) to the cloud NFC server, e.g., 606*d*. In response, the NFC cloud server 605*d* may provide a response to the PoS terminal data request, e.g., 607*d*. The user wallet device may generate a NFC transmission to the PoS terminal using the PoS terminal data response 607*d* provided by the cloud NFC server to the user wallet device. As another example, the use of time-expiry, session-specific, NFC data after authenticating the user may ensure the security (e.g., by preventing hacking attempts, packet sniffing, eavesdropping, etc.) of the user's virtual wallet.

Figure 7:
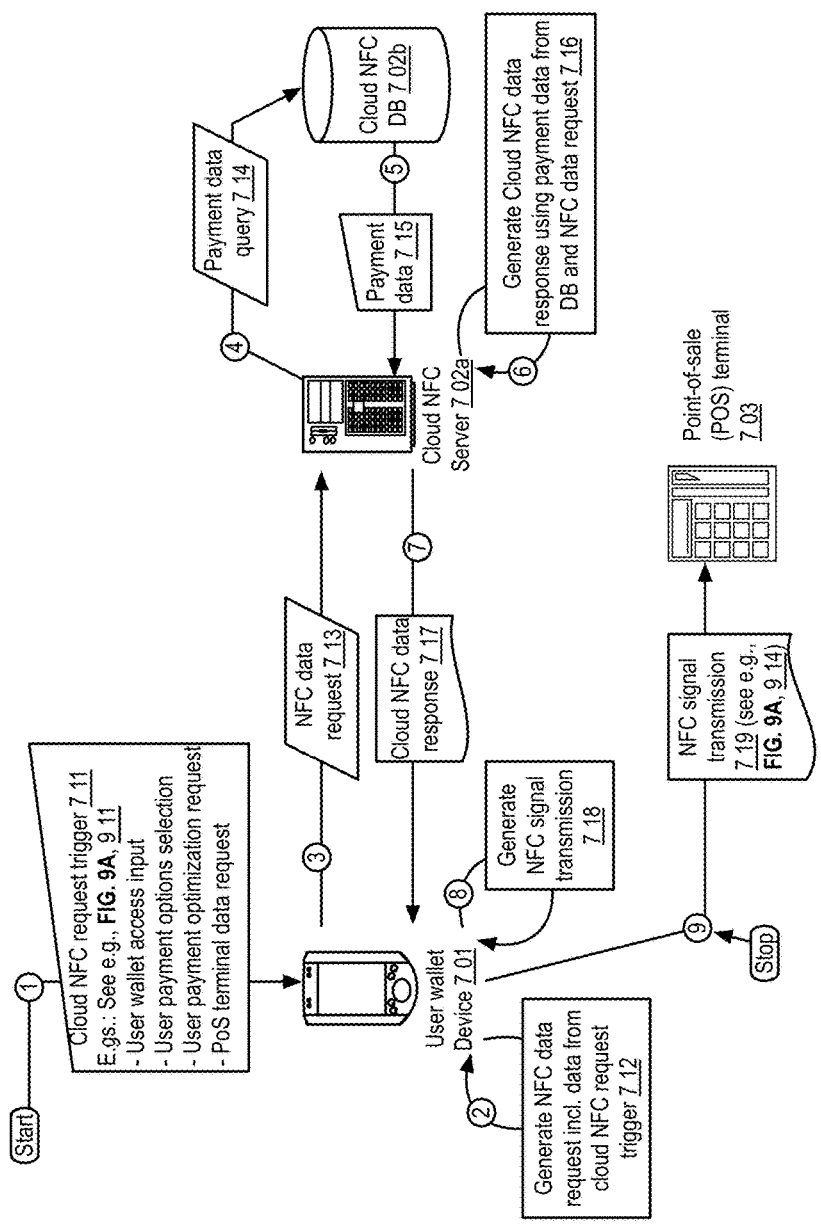
FIG. 7 shows a datagraph diagram illustrating examples of transforming user NFC activation requests via a Cloud-Based Virtual Wallet NFC ("CloudNFC") component into user-customized, session-specific, time-expiring NFC data for purchase transaction authorizations, in one embodiment of the EAE.

FIG. 7 shows a datagraph diagram illustrating examples of transforming user NFC activation requests via a Cloud-Based Virtual Wallet NFC ("CloudNFC") component into user-customized, session-specific, time-expiring NFC data for purchase transaction authorizations. In some embodiments, a user wallet device 701 may obtain a trigger to request cloud NFC data from a cloud NFC server 702*a*. For example, the trigger may include, without limitation: a user wallet access input; a user payment options selection; a user payment optimization request; a PoS terminal data request; and/or the like, e.g., 711. The user wallet device may generate a NFC data request including data from the cloud NFC request trigger, e.g. 712, and provide the NFC data request, e.g., 713, to the cloud NFC server 702a. For example, the user wallet device may provide a NFC data request to the cloud NFC server as a HTTP(S) POST message including XML-formatted data. An example listing of a NFC data request 713, substantially in the form of a HTTP(S) POST message including XML-formatted data, is provided below:

```
POST /NFCdatarequest.php HTTP/1.1
Host: www.cloudNFC.com
Content-Type: Application/XML
Content-Length: 572
<?XML version = "1.0" encoding = "UTF-8"?>
<NFC_data_request>
    <session_ID>KH4L34H8</session_ID>
    <timestamp>2052-01-01 01:01:01</timestamp>
<user_ID>john.q.public<user_ID>
<wallet_ID>KONE47590Y4ER</wallet_ID>
<merchant_URL>http://www.merchant.com/sessions.php?sessionid=</merchant_URL>
    <request_input>
        <default_pay>FALSE</default_pay>
        <card_optimize>TRUE</card_optimize>
        <multi_source>TRUE</multi_source>
        <cloak>TRUE</cloak>
        <time_expiry>ON</time_expiry>
        <PoS_command>NULL</PoS_command>
        <params_req>pay_card time_counter digi_sign md5_hash</parame_req>
</NFC_data_request>
```

In some embodiments, the cloud NFC server may obtain the NFC data request, and may parse the request to extract the request input from the user wallet device. For example, the cloud NFC server may utilize the parsers described below in the description below with reference to FIG. 30. Based on the extracted input, the cloud NFC server may query 714 a cloud database 702b for payment data for providing to the user wallet device. For example, the cloud NFC server may issue PHP/SQL commands to query a database table (such as FIG. 30, Accounts 3019d) for user payment data 715. An example payment data query 714, substantially in the form of PHP/SQL commands, is provided below:

```
<?PHP
header('Content-Type: text/plain');
mysql_connect("254.93.179.112",$DBserver,$password); // access database server
mysql_select_db("EAE_DB.SQL"); // select database table to search
//create query
$query = "SELECT card_num cvv expiry_timestamp alias_name card_name accholder_name bill_address ship_address FROM AccountsTable WHERE user_id LIKE '%' $userID";
$result = mysql_query($query); // perform the search query
mysql_close("EAE_DB.SQL"); // close database access
?>
```

Using the payment data retrieved from the database, the cloud NFC server may generate a cloud NFC data response, e.g., 716, and provide the cloud NFC data response, e.g., 717, to the user wallet device. For example, the cloud NFC server may provide a cloud NFC data response to the user wallet device as a HTTP(S) POST message including XML-formatted data. An example listing of a cloud NFC data response 717, substantially in the form of a HTTP(S) POST message including XML-formatted data, is provided below:

```
POST /NFCdataresponse.php HTTP/1.1
Host: www.walletdevceIP.com
Content-Type: Application/XML
Content-Length: 572
<?XML version = "1.0" encoding = "UTF-8"?>
<NFC_data_response>
    <session_ID>KH4L34H8</session_ID>
    <timestamp>2052-01-01 01:01:03</timestamp>
    <user_ID>john.q.public<user_ID>
    <wallet_ID>KONE47590Y4ER</wallet_ID>
    <merchant_URL>http://www.merchant.com/sessions.php?sessionid=</merchant_URL>
    <request_response>
        <default_pay>FALSE</default_pay>
        <card_optimize>TRUE</card_optimize>
        <multi_source>TRUE</multi_source>
        <cloak>TRUE</cloak>
        <time_expiry>ON</time_expiry>
        <PoS_command>NULL</PoS_command>
        <params_req>pay_card counter digi_sign md5_hash</parame_req>
        <params>
            <pay_card>1234 5678 9012 3456</pay_card>
            <counter>0012</counter>
            <digi_sign>www.cloudNFC.com/ds.php?id=KH4L34H8</digi_sign>
            <md5_hash>451ec72c3bd95576c1bc4e992391b1cc</md5_hash>
        </params>
</NFC_data_response>
```

In another example embodiment, NFC data message structures may include fields such as consumer name, PAN, count, NFC security hash value wherein the hash value is calculated based on NFC chip security key value and other parameters, and/or the like. In further implementations, the NFC data response message may comprise a timestamp, which is optional. Such NFC data messages may be transmitted for one NFC activated component to another NFC equipped device via NFC handshake ISO standards, such as but not limited to EnB ISO 7816 (for contact interface), Visa PayWave Specifications (for contactless interface), ISO 14443 (for contactless interface), and/or the like. Further NFC handshake protocols may include ECMA, ETSI, and/or the like.

The user wallet device may obtain the cloud NFC data response 717, and may parse the request to extract the response data from the cloud NFC server. For example, the user wallet device may utilize the parsers described below in the description below with reference to FIG. 30. Based on the extracted response data, the user wallet device may generate 718 a NFC signal transmission, and provide 719 the NFC signal transmission to the PoS terminal. It is to be understood that the user of NFC is exemplary, and that any wired and/or wireless communication mechanism is contemplated by this disclosure.

Figure 8:
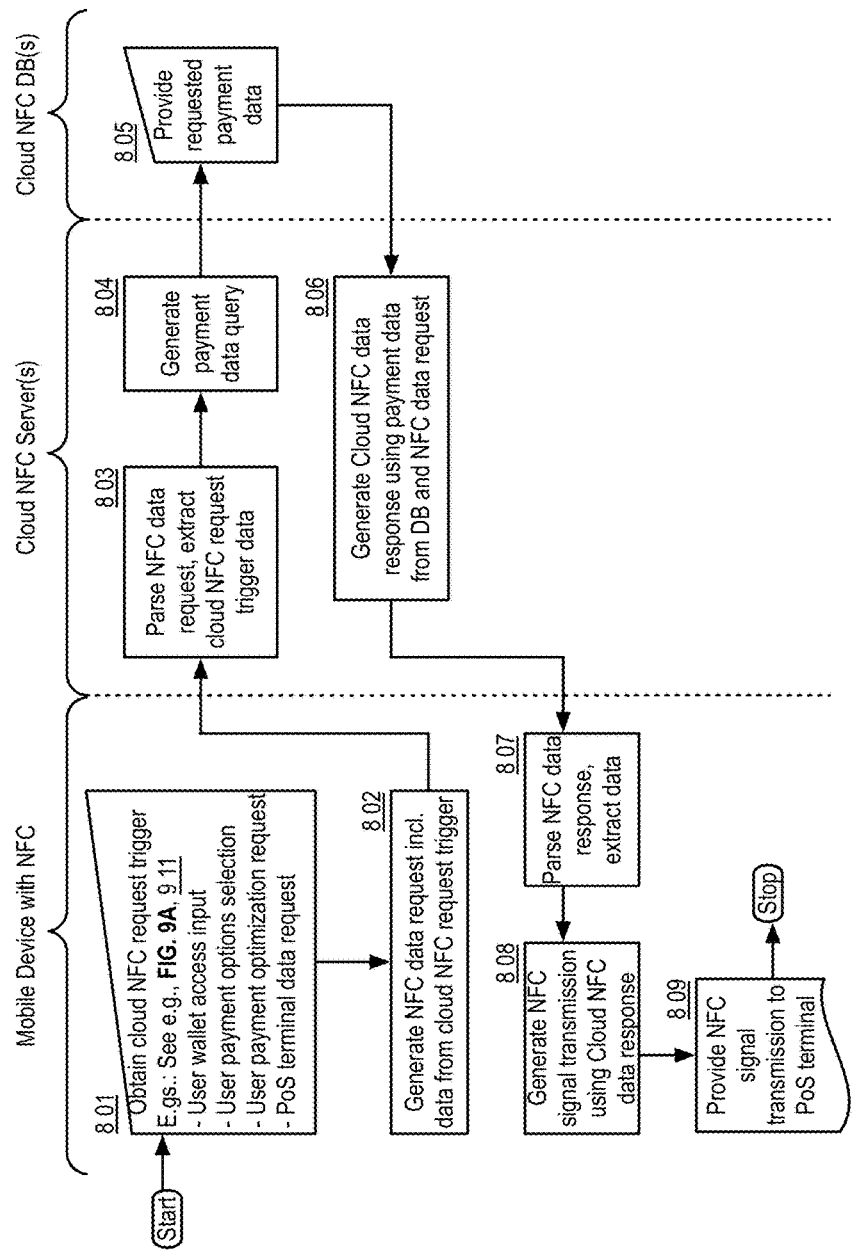
FIG. 8 shows a logic flow diagram illustrating examples of transforming user NFC activation requests via a Cloud-Based Virtual Wallet NFC ("CloudNFC") component into user-customized, session-specific, time-expiring NFC data for purchase transaction authorizations, in one embodiment of the EAE.

FIG. 8 show a logic flow diagrams illustrating examples of transforming user NFC activation requests via a Cloud-Based Virtual Wallet NFC ("CloudNFC") component into user-customized, session-specific, time-expiring NFC data for purchase transaction authorizations. In some embodiments, a user wallet device may obtain a trigger to request cloud NFC data from a cloud NFC server, e.g., 801. For example, the trigger may include, without limitation: a user wallet access input; a user payment options selection; a user payment optimization request; a PoS terminal data request; and/or the like. The user wallet device may generate a NFC data request including data from the cloud NFC request trigger, and provide the NFC data request to the cloud NFC server, e.g., 802. For example, the user wallet device may provide a NFC data request to the cloud NFC server as a HTTP(S) POST message including XML-formatted data. In some embodiments, the cloud NFC server may obtain the NFC data request, and may parse the request to extract the request input from the user wallet device, e.g., 803. For example, the cloud NFC server may utilize the parsers described below in the description below with reference to FIG. 30. Based on the extracted input, the cloud NFC server may query a cloud NFC database for payment data for providing to the user wallet device, e.g., 804-805. For example, the cloud NFC server may issue PHP/SQL commands to query a database table (such as FIG. 30, Accounts 3019*d*) for user payment data. Using the payment data retrieved from the database, the cloud NFC server may generate a cloud NFC data response, and provide the cloud NFC data response to the user wallet device, e.g., 806. For example, the cloud NFC server may provide a cloud NFC data response to the user wallet device as a HTTP(S) POST message including XML-formatted data. The user wallet device may obtain the cloud NFC data response, and may parse the request to extract the response data from the cloud NFC server, e.g., 807. For example, the user wallet device may utilize the parsers described below in the description below with reference to FIG. 30. Based on the extracted response data, the user wallet device may generate a NFC signal transmission, e.g., 808, and provide the NFC signal transmission to the PoS terminal, e.g., 809. It is to be understood that the user of NFC is exemplary, and that any wired and/or wireless communication mechanism is contemplated by this disclosure.

Figure 9A:
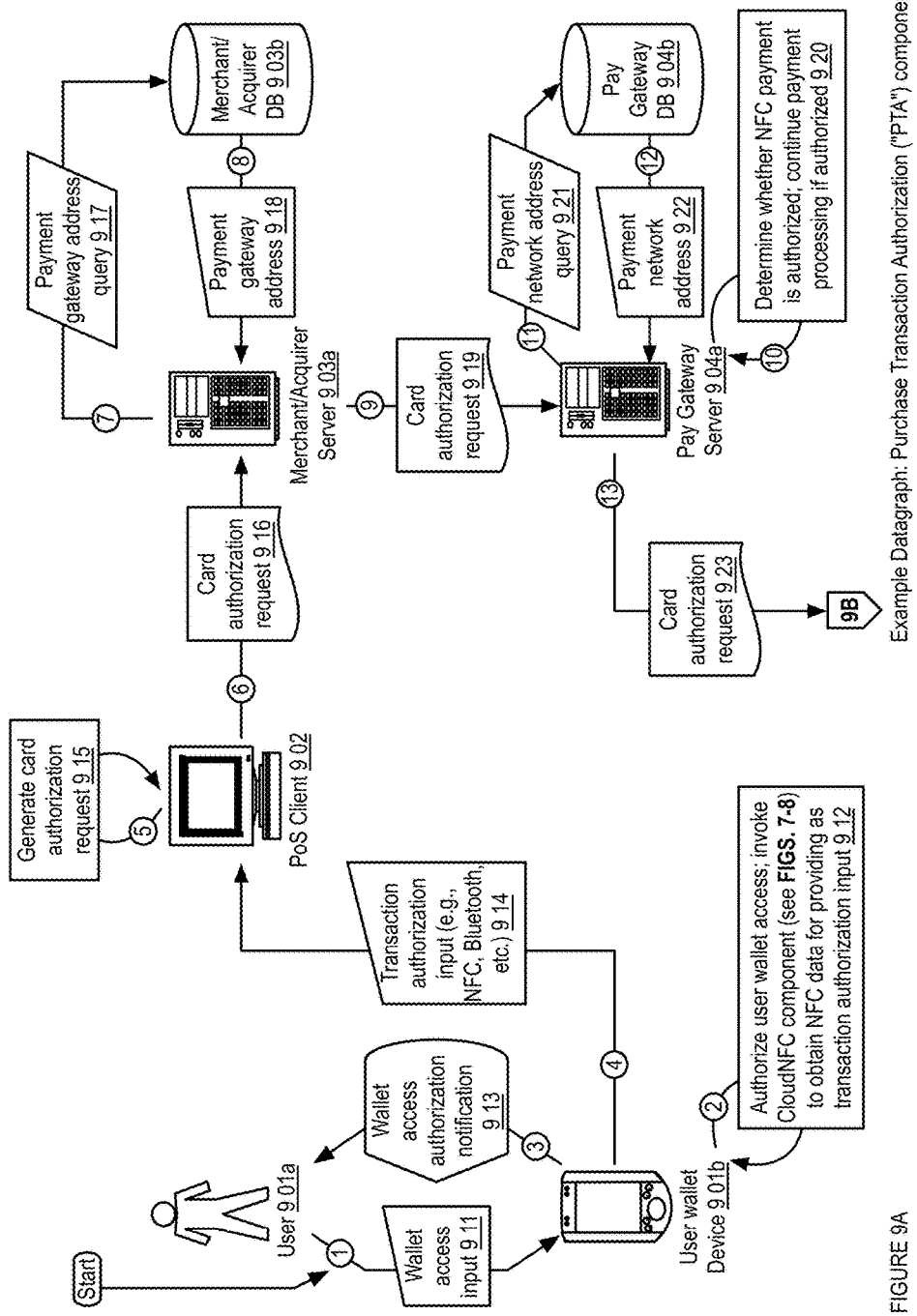
FIGS. 9A-B show datagraph diagrams illustrating example aspects of transforming a user virtual wallet access input via a Purchase Transaction Authorization ("PTA") component into a purchase transaction receipt notification, in one embodiment of the EAE.
Figure 9B:
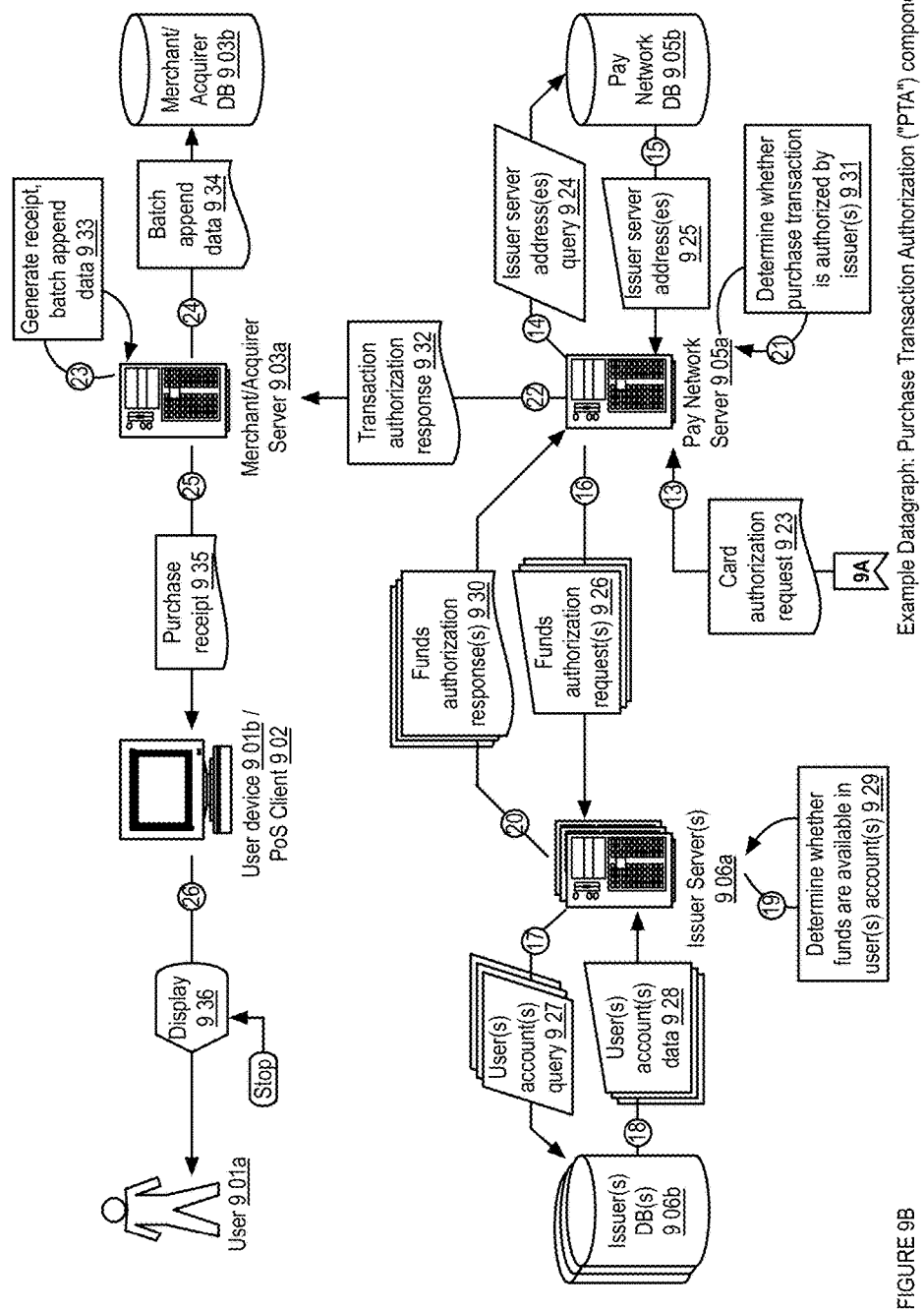

FIGS. 9A-B show datagraph diagrams illustrating example aspects of transforming a user virtual wallet access input via a Purchase Transaction Authorization ("PTA") component into a purchase transaction receipt notification. With reference to FIG. 9A, in some embodiments, a user, e.g., 901*a*, may wish to utilize a virtual wallet account to purchase a product, service, offering, and/or the like ("product"), from a merchant via a merchant online site or in the merchant's store. The user may utilize a physical card, or a user wallet device, e.g., 901*b*, to access the user's virtual wallet account. For example, the user wallet device may be a personal/laptop computer, cellular telephone, smartphone, tablet, eBook reader, netbook, gaming console, and/or the like. The user may provide a wallet access input, e.g., 911 into the user wallet device. In various embodiments, the user input may include, but not be limited to: a single tap (e.g., a one-tap mobile app purchasing embodiment) of a touchscreen interface, keyboard entry, card swipe, activating a RFID/NFC equipped hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user.

In some embodiments, upon authenticating the user for access to virtual wallet features, the user wallet device may provide a transaction authorization input, e.g., 914, to a point-of-sale ("PoS") client, e.g., 902. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. For example, the PoS client may obtain, as transaction authorization input 914, track 1 data from the user's plastic card (e.g., credit card, debit card, prepaid card, charge card, etc.), such as the example track 1 data provided below:

```
%B123456789012345^PUBLIC/J.Q.^99011200000000000000**901******?*
(wherein '123456789012345' is the card number of 'J.Q. Public'
and has a CVV number of 901. '990112' is a service code, and ***
represents decimal digits which change randomly each time the
card is used.)
```

In embodiments where the user utilizes a user wallet device, the user wallet device may provide payment information to the PoS client, formatted according to a data formatting protocol appropriate to the communication mechanism employed in the communication between the user wallet device and the PoS client. An example listing of transaction authorization input 914, substantially in the form of XML-formatted data, is provided below:

```
<?XML version = "1.0" encoding = "UTF-8"?>
<transaction_authorization_input>
    <payment_data>
        <account>
            <charge_priority>1</charge_priority>
            <charge_ratio>40%</charge_ratio>
            <account_type>debit</account_type>
    <value_exchange_symbol>USD</value_exchange_symbol>
    <account_number>123456789012345</account_number>
            <account_name>John Q. Public</account_name>
            <bill_add>987 Green St #456, Chicago, IL
94652</bill_add>
            <ship_add>987 Green St #456, Chicago, IL
94652</ship_add>
            <CVV_type>dynamic<CVV_type>
    <CVV>http://www.paynet.com/dcvv.php?sessionID=4NFU4RG94</CVV>
            <cloak_flag>ON</cloak_flag>
            <alert_rules>tar1 tar4 tar12</alert_rules>
            <mode>NFC</mode>
        </account>
        <account>
            <charge_priority>1</charge_priority>
            <charge_ratio>60%</charge_ratio>
            <account_type>rewards</account_type>
    <value_exchange_symbol>VME</value_exchange_symbol>
    <account_number>234567890123456</account_number>
            <account_name>John Q. Public</account_name>
            <bill_add>987 Green St #456, Chicago, IL
94652</bill_add>
            <ship_add>987 Green St #456, Chicago, IL
94652</ship_add>
            <CVV_type>static<CVV_type>
            <CVV>173</CVV>
            <cloak_flag>ON</cloak_flag>
            <alert_rules>tar1 tar4 tar12</alert_rules>
            <mode>Bluetooth</mode>
        </account>
        <account>
            <charge_priority>2</charge_priority>
            <charge_ratio>100%</charge_ratio>
    <account_number>345678901234567</account_number>
            <account_type>credit</account_type>
    <value_exchange_symbol>USD</value_exchange_symbol>
            <account_name>John Q. Public</account_name>
            <bill_add>987 Green St #456, Chicago, IL
```

```
94652</bill_add>
            <ship_add>987 Green St #456, Chicago, IL
94652</ship_add>
            <CVV_type>static<CVV_type>
            <CVV>173</CVV>
            <cloak_flag>ON</cloak_flag>
            <alert_rules>tar1 tar4 tar12</alert_rules>
            <mode>NFC</mode>
        </account>
    </payment_data>
    <!--optional data-->
    <timestamp>2011-02-22 15:22:43</timestamp>
    <expiry_lapse>00:00:30</expiry_lapse>
    <secure_key>044532907059862348795654332</secure_key>
    <alerts_track_flag>TRUE</alerts_track_flag>
    <device_fingerprint>
        <device_IP>192.168.23.126</device_IP>
        <device_MAC>0123.4567.89ab</device_MAC>
        <device_serial>312456768798765432</device_serial>
        <device_ECID>00000AEBCDF12345</device_ECID>
        <device_identifier>jqp_air</device_identifier>
        <device_UDID>21343e34-14f4-8jn4-7yfe-
124578632134</device_UDID>
        <device_browser>firefox 2.2</device_browser>
        <device_type>smartphone</device_type>
        <device_model>HTC Hero</device_model>
        <OS>Android 2.2</OS>
        <wallet_app_installed_flag>true</wallet_app_installed_fla
g>
    </device_fingerprint>
</transaction_authorization_input>
```

In some embodiments, the PoS client may generate a card authorization request, e.g., 915, using the obtained transaction authorization input from the user wallet device, and/or product/checkout data. An example listing of a card authorization request 915-916, substantially in the form of a HTTP(S) POST message including XML-formatted data, is provided below:

```
POST /authorizationrequests.php HTTP/1.1
Host: www.acquirer.com
Content-Type: Application/XML
Content-Length: 1306
<?XML version = "1.0" encoding = "UTF-8"?>
<card_authorization_request>
    <session_ID>4NFU4RG94</order_ID>
    <!--optional data-->
    <timestamp>2011-02-22 15:22:43</timestamp>
    <expiry>00:00:30</expiry>
    <alerts_URL>www.merchant.com/shopcarts.php?sessionID=AEBB
4356</alerts_URL>
    <user_ID>john.q.public@gmail.com</user_ID>
    <device_fingerprint>
        <device_IP>192.168.23.126</device_IP>
        <device_MAC>0123.4567.89ab</device_MAC>
        <device_serial>312456768798765432</device_serial>
        <device_ECID>00000AEBCDF12345</device_ECID>
        <device_identifier>jqp_air</device_identifier>
        <device_UDID>21343e34-14f4-8jn4-7yfe-
124578632134</device_UDID>
        <device_browser>firefox 2.2</device_browser>
        <device_type>smartphone</device_type>
        <device_model>HTC Hero</device_model>
        <OS>Android 2.2</OS>
        <wallet_app_installed_flag>true</wallet_app_installed_fla
g>
    </device_fingerprint>
    <purchase_details>
        <total_cost>$121.49</total_cost>
        <cart>
            <product>
                <merchant_params>
                    <merchant_id>54TBRELF8</merchant_id>
                    <merchant_name>BARNES,
Inc.</merchant_name>
                    <merchant_auth_key>TMN45GER98</merchant_auth_key>
                </merchant_params>
                <product_type>book</product_type>
                <product_params>
                    <product_title>XML for
dummies</product_title>
                    <ISBN>938-2-14-168710-0</ISBN>
                    <edition>2nd ed.</edition>
                    <cover>hardbound</cover>
                </product_params>
                <quantity>2</quantity>
                <unit_cost>$14.46</unit_cost>
                <coupon_id>AY34567</coupon_id>
            <social_flag>ON</social_flag>
            <social_message>Look what I bought
today!</social_message>
            <social_networks>facebook
twitter</social_networks>
            </product>
            <product>
                <merchant_params>
                    <merchant_id>3FBCR4INC</merchant_id>
                    <merchant_name>Books,
Inc.</merchant_name>
                    <merchant_auth_key>1N484MCP</merchant_auth_key>
                </merchant_params>
                <product_type>book</product_type>
                <product_params>
                    <product_title>Sophie's
World</product_title>
                    <ISBN>955-2-14-112310-0</ISBN>
                    <edition>NULL</edition>
                    <cover>hardbound</cover>
                </product_params>
                <quantity>1</quantity>
                <unit_cost>$34.78</unit_cost>
                <coupon_id>null</coupon_id>
            <social_flag>OFF</social_flag>
            </product>
        </cart>
        <cart>
            <product>
                <merchant_params>
                    <merchant_id>RFH5IB4FT</merchant_id>
                    <merchant_name>Amzn,
Inc.</merchant_name>
                    <merchant_auth_key>44543DSJFG</merchant_auth_key>
                </merchant_params>
                <product_type>book</product_type>
                <product_params>
                    <product_title>XML - a
primer</product_title>
                    <ISBN>938-2-14-1436710-0</ISBN>
                    <edition>2nd ed.</edition>
                    <cover>hardbound</cover>
                </product_params>
                <quantity>1</quantity>
                <unit_cost>$12.93</unit_cost>
                <coupon_id>AY34567</coupon_id>
            <social_flag>ON</social_flag>
            <social_message>Look what I bought
today!</social_message>
            <social_networks>facebook
twitter</social_networks>
            </product>
            <product>
                <merchant_params>
                    <merchant_id>3FBCR4INC</merchant_id>
                    <merchant_name>BestBooks,
Inc.</merchant_name>
                    <merchant_auth_key>1N484MCP</merchant_auth_key>
                </merchant_params>
                <product_type>book</product_type>
                <product_params>
                    <product_title>Sophie's
Choice</product_title>
                    <ISBN>938-2-14-168710-0</ISBN>
                    <edition>1st ed.</edition>
                </product_params>
```

-continued

```
            <quantity>1</quantity>
            <unit_cost>$44.86</unit_cost>
            <coupon_id>null</coupon_id>
          <social_flag>OFF</social_flag>
          </product>
      </cart>
  </purchase_details>
  <account_params>
      <account>
          <charge_priority>1</charge_priority>
          <charge_ratio>40%</charge_ratio>
          <account_type>debit</account_type>
  <value_exchange_symbol>USD</value_exchange_symbol>
  <account_number>123456789012345</account_number>
          <account_name>John Q. Public</account_name>
          <bill_add>987 Green St #456, Chicago, IL
94652</bill_add>
          <ship_add>987 Green St #456, Chicago, IL
94652</ship_add>
          <CVV_type>dynamic<CVV_type>
  <CVV>http://www.paynet.com/dcvv.php?sessionID=4NFU4RG94</
CVV>
          <cloak_flag>ON</cloak_flag>
          <alert_rules>tar1 tar4 tar12</alert_rules>
          <mode>NFC</mode>
      </account>
      <account>
          <charge_priority>1</charge_priority>
          <charge_ratio>60%</charge_ratio>
          <account_type>rewards</account_type>
  <value_exchange_symbol>VME</value_exchange_symbol>
  <account_number>234567890123456</account_number>
          <account_name>John Q. Public</account_name>
          <bill_add>987 Green St #456, Chicago, IL
94652</bill_add>
          <ship_add>987 Green St #456, Chicago, IL
94652</ship_add>
          <CVV_type>static<CVV_type>
          <CVV>173</CVV>
          <cloak_flag>ON</cloak_flag>
          <alert_rules>tar1 tar4 tar12</alert_rules>
          <mode>Bluetooth</mode>
      </account>
      <account>
          <charge_priority>2</charge_priority>
          <charge_ratio>100%</charge_ratio>
  <account_number>345678901234567</account_number>
          <account_type>credit</account_type>
  <value_exchange_symbol>USD</value_exchange_symbol>
          <account_name>John Q. Public</account_name>
          <bill_add>987 Green St #456, Chicago, IL
94652</bill_add>
          <ship_add>987 Green St #456, Chicago, IL
94652</ship_add>
          <CVV_type>static<CVV_type>
          <CVV>173</CVV>
          <cloak_flag>ON</cloak_flag>
          <alert_rules>tar1 tar4 tar12</alert_rules>
          <mode>NFC</mode>
      </account>
  </account_params>
  <shipping_info>
      <shipping_adress>#ref-ANON-123-45-
678</shipping_address>
      <ship_type>expedited</ship_type>
      <ship_carrier>FedEx</ship_carrier>
      <ship_account>ANON-123-45-678</ship_account>
      <tracking_flag>true</tracking_flag>
      <sign_flag>false</sign_flag>
  </shipping_info>
</card_authorization_request>
```

In some embodiments, the card authorization request generated by the user device may include a minimum of information required to process the purchase transaction. For example, this may improve the efficiency of communicating the purchase transaction request, and may also advantageously improve the privacy protections provided to the user and/or merchant. For example, in some embodiments, the card authorization request may include at least a session ID for the user's shopping session with the merchant. The session ID may be utilized by any component and/or entity having the appropriate access authority to access a secure site on the merchant server to obtain alerts, reminders, and/or other data about the transaction(s) within that shopping session between the user and the merchant. In some embodiments, the PoS client may provide the generated card authorization request to the merchant server, e.g., 916. The merchant server may forward the card authorization request to a pay gateway server, e.g., 904a, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., merchant/acquirer database 903b, for a network address of the payment gateway server, for example by using a portion of a user payment card number, or a user ID (such as an email address) as a keyword for the database query. For example, the merchant server may issue PHP/SQL commands to query a database table (such as FIG. 30, Pay Gateways 3019h) for a URL of the pay gateway server. An example payment gateway address query 917, substantially in the form of PHP/SQL commands, is provided below:

```
<?PHP
header('Content-Type: text/plain');
mysql_connect("254.93.179.112",$DBserver,$password); // access
database server
mysql_select_db("EAE_DB.SQL"); // select database table to search
//create query
$query = "SELECT paygate_id paygate_address paygate_URL
paygate_name FROM PayGatewayTable WHERE card_num LIKE '%'
$cardnum";
$result = mysql_query($query); // perform the search query
mysql_close("EAE_DB.SQL"); // close database access
?>
```

In response, the merchant/acquirer database may provide the requested payment gateway address, e.g., 918. The merchant server may forward the card authorization request to the pay gateway server using the provided address, e.g., 919. In some embodiments, upon receiving the card authorization request from the merchant server, the pay gateway server may invoke a component to provide one or more services associated with purchase transaction authorization, e.g., 420. For example, the pay gateway server may invoke components for fraud prevention, loyalty and/or rewards, and/or other services for which the user-merchant combination is authorized. In some implementations, the pay gateway server may be a cloud NFC server such as those described in FIGS. 2-3, and may determine whether the NFC payment is authorized. For example, the server may compare the data in the card authorization request to the data store in a cloud NFC database. If the data from the two sources match, the server may determine that the NFC payment is authorized, and not fraudulent. Under such a scenario, the server may continue the processing of the purchase transaction authorization.

The pay gateway server may forward the card authorization request to a pay network server, e.g., 905a, for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., pay gateway database 904b, for a network address of the payment network server, for example by using a portion of a user payment card number, or a user ID (such as an email address) as a keyword for the database query. For example, the pay gateway server may issue PHP/SQL commands to query a database table (such as FIG. 30, Pay Gateways 3019h) for a URL of the pay network server. An example payment network address query 921, substantially in the form of PHP/SQL commands, is provided below:

```
<?PHP
header('Content-Type: text/plain');
mysql_connect("254.93.179.112",$DBserver,$password); // access
database server
mysql_select_db("EAE_DB.SQL"); // select database table to search
//create query
$query = "SELECT payNET_id payNET_address payNET_URL
payNET_name FROM PayGatewayTable WHERE card_num LIKE '%'
$cardnum";
$result = mysql_query($query); // perform the search query
mysql_close("EAE_DB.SQL"); // close database access
?>
```

In response, the payment gateway database may provide the requested payment network address, e.g., 922. The pay gateway server may forward the card authorization request to the pay network server using the provided address, e.g., 923.

With reference to FIG. 9B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer.

Figure 30:
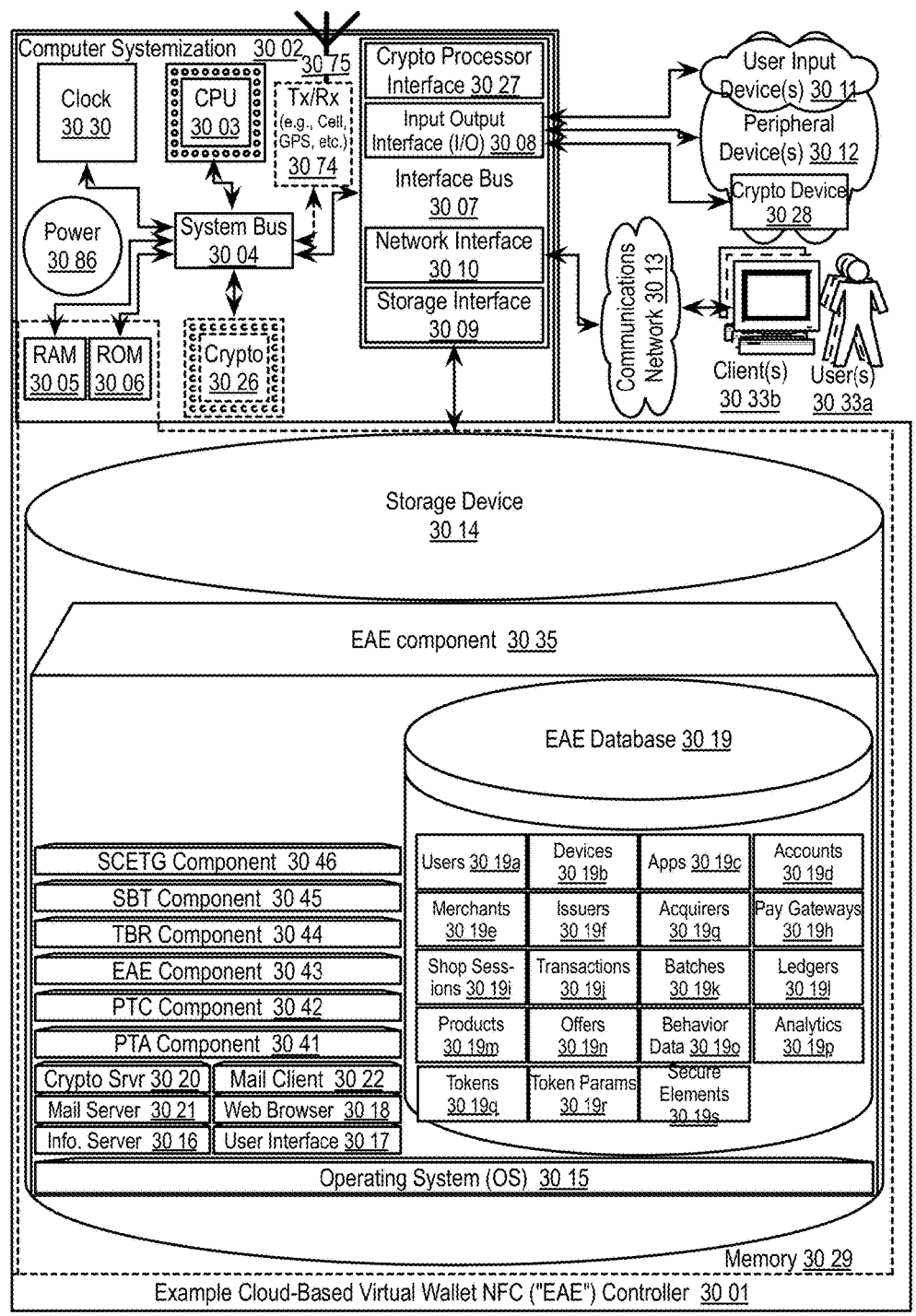
FIG. 30 shows a block diagram illustrating aspects of an exemplary embodiment of a EAE user interface controller, in one implementation of the EAE operation.

In some embodiments, the pay network server may generate a query, e.g., 924, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 906a, of the issuer(s) may maintain details of the user's account(s). In some embodiments, a database, e.g., pay network database 905b, may store details of the issuer server(s) associated with the issuer(s). In some embodiments, the pay network server may query a database, e.g., pay network database 905b, for a network address of the issuer(s) server(s), for example by using a portion of a user payment card number, or a user ID (such as an email address) as a keyword for the database query. For example, the merchant server may issue PHP/SQL commands to query a database table (such as FIG. 30, Issuers 3019f) for network address(es) of the issuer(s) server(s). An example issuer server address(es) query 924, substantially in the form of PHP/SQL commands, is provided below:

```
<?PHP
header('Content-Type: text/plain');
mysql_connect("254.93.179.112",$DBserver,$password); // access
database server
mysql_select_db("EAE_DB.SQL"); // select database table to search
//create query
$query = "SELECT issuer_id issuer_address issuer_URL issuer_name
FROM IssuersTable WHERE card_num LIKE '%' $cardnum";
$result = mysql_query($query); // perform the search query
mysql_close("EAE_DB.SQL"); // close database access
?>
```

In response to obtaining the issuer server query, e.g., 924, the pay network database may provide, e.g., 925, the requested issuer server data to the pay network server. In some embodiments, the pay network server may utilize the issuer server data to generate funds authorization request(s), e.g., 926, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. An example listing of a funds authorization request 926, substantially in the form of a HTTP(S) POST message including XML-formatted data, is provided below:

```
POST /fundsauthorizationrequest.php HTTP/1.1
Host: www.issuer.com
Content-Type: Application/XML
Content-Length: 624
<?XML version = "1.0" encoding = "UTF-8"?>
<funds_authorization_request>
    <request_ID>VNEI39FK</request_ID>
    <timestamp>2011-02-22 15:22:44</timestamp>
    <debit_amount>$72.89</debit_amount>
    <account_params>
        <account>
            <account_type>debit</account_type>
        <value_exchange_symbol>USD</value_exchange_symbol>
        <account_number>123456789012345</account_number>
            <account_name>John Q. Public</account_name>
            <bill_add>987 Green St #456, Chicago, IL
94652</bill_add>
            <ship_add>987 Green St #456, Chicago, IL
94652</ship_add>
            <CVV>1234</CVV>
        </account>
    </account_params>
    <!--optional parameters-->
    <user_device_fingerprint>
        <device_IP>192.168.23.126</device_IP>
        <device_MAC>0123.4567.89ab</device_MAC>
        <device_serial>312456768798765432</device_serial>
        <device_ECID>00000AEBCDF12345</device_ECID>
        <device_identifier>jqp_air</device_identifier>
        <device_UDID>21343e34-14f4-8jn4-7yfe-
124578632134</device_UDID>
        <device_browser>firefox 2.2</device_browser>
        <device_type>smartphone</device_type>
        <device_model>HTC Hero</device_model>
        <OS>Android 2.2</OS>
        <wallet_app_installed_flag>true</wallet_app_installed_flag>
    </user_device_fingerprint>
</funds_authorization_request>
```

In some embodiments, an issuer server may parse the authorization request(s), and based on the request details may query a database, e.g., user profile database 906b, for data associated with an account linked to the user. For example, the merchant server may issue PHP/SQL commands to query a database table (such as FIG. 30, Accounts

3019*d*) for user account(s) data. An example user account(s) query 927, substantially in the form of PHP/SQL commands, is provided below:

```
<?PHP
header('Content-Type: text/plain');
mysql_connect("254.93.179.112",$DBserver,$password); // access
database server
mysql_select_db("EAE_DB.SQL"); // select database table to search
//create query
$query = "SELECT issuer user_id user_name user_balance
account_type FROM AccountsTable WHERE account_num LIKE '%'
$accountnum";
$result = mysql_query($query); // perform the search query
mysql_close("EAE_DB.SQL"); // close database access
?>
```

In some embodiments, on obtaining the user account(s) data, e.g., 928, the issuer server may determine whether the user can pay for the transaction using funds available in the account, 929. For example, the issuer server may determine whether the user has a sufficient balance remaining in the account, sufficient credit associated with the account, and/or the like. Based on the determination, the issuer server(s) may provide a funds authorization response, e.g., 930, to the pay network server. For example, the issuer server(s) may provide a HTTP(S) POST message similar to the examples above. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 931, the pay network server may invoke a component to provide value-add services for the user.

In some embodiments, the pay network server may generate a transaction data record from the authorization request and/or authorization response, and store the details of the transaction and authorization relating to the transaction in a transactions database. For example, the pay network server may issue PHP/SQL commands to store the data to a database table (such as FIG. 30, Transactions 3019*i*). An example transaction store command, substantially in the form of PHP/SQL commands, is provided below:

```
<?PHP
header('Content-Type: text/plain');
mysql_connect("254.92.185.103",$DBserver,$password); // access
database server
mysql_select("EAE_DB.SQL"); // select database to append
mysql_query("INSERT INTO TransactionsTable (PurchasesTable
(timestamp, purchase_summary_list, num_products, product_summary,
product_quantity, transaction_cost, account_params_list,
account_name, account_type, account_num, billing_addres, zipcode,
phone, sign, merchant_params_list, merchant_id, merchant_name,
merchant_auth_key)
```

-continued

```
VALUES (time( ), $purchase_summary_list, $num_products,
$product_summary, $product_quantity, $transaction_cost,
$account_params_list, $account_name, $account_type, $account_num,
$billing_addres, $zipcode, $phone, $sign, $merchant_params_list,
$merchant_id, $merchant_name, $merchant_auth_key)"); // add data
to table in database
mysql_close("EAE_DB.SQL"); // close connection to database
?>
```

In some embodiments, the pay network server may forward a transaction authorization response, e.g., 932, to the user wallet device, PoS client, and/or merchant server. The merchant may obtain the transaction authorization response, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 933, and store the XML data file, e.g., 934, in a database, e.g., merchant database 404. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MCP59CHB27365
        </merchant_auth_key>
    <account_number>123456789</account_number>
</merchant_data>
<transaction_data>
    <transaction 1>
    ...
    </transaction 1>
    <transaction 2>
    ...
    </transaction 2>
    .
    .
    .
    <transaction n>
    ...
    </transaction n>
</transaction_data>
```

In some embodiments, the server may also generate a purchase receipt, e.g., 933, and provide the purchase receipt to the client, e.g., 935. The client may render and display, e.g., 936, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 10A:
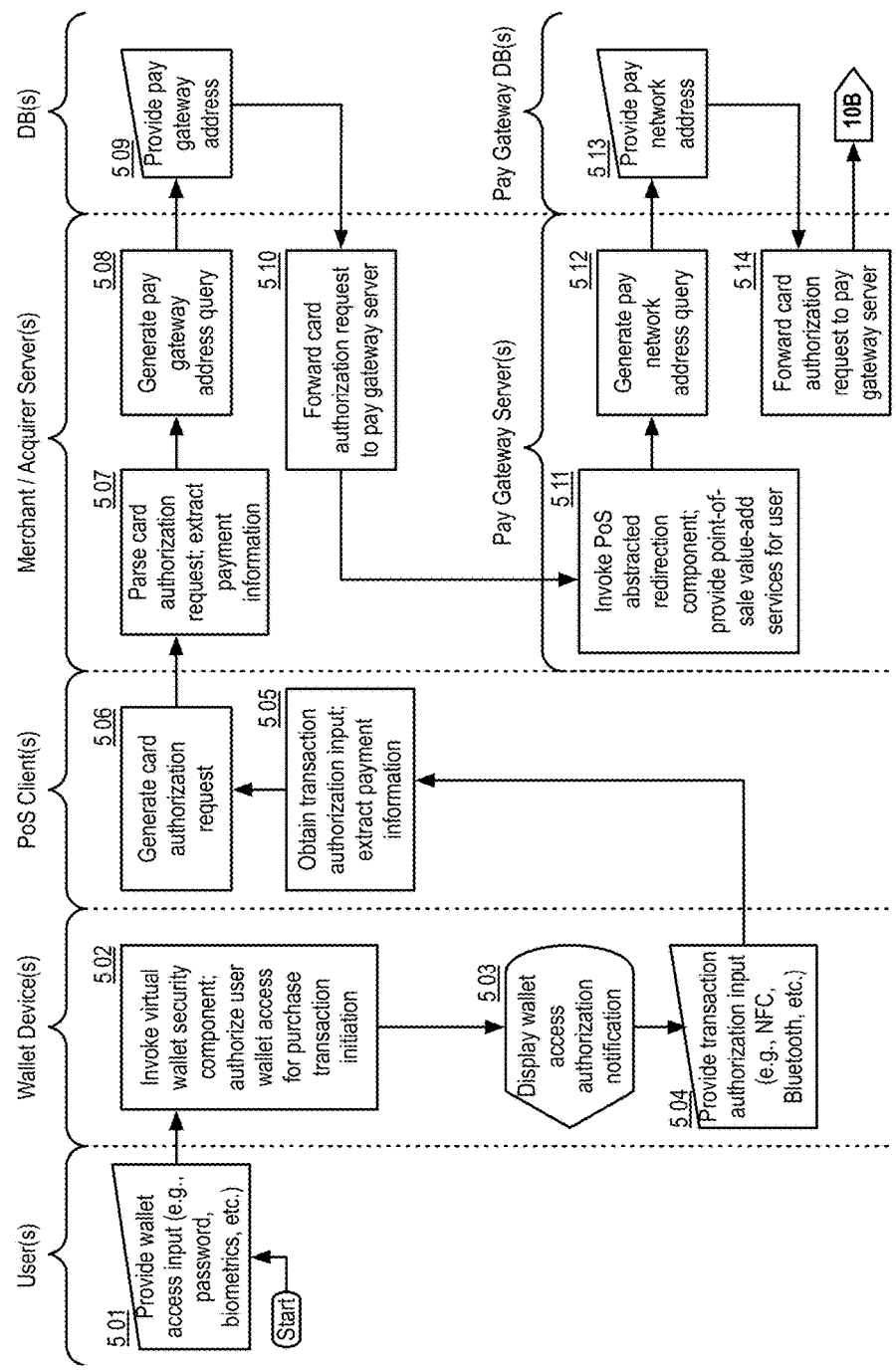
FIGS. 10A-B show logic flow diagrams illustrating example aspects of transforming a user virtual wallet access input via a Purchase Transaction Authorization ("PTA") component into a purchase transaction receipt notification, in one embodiment of the EAE.
Figure 10B:
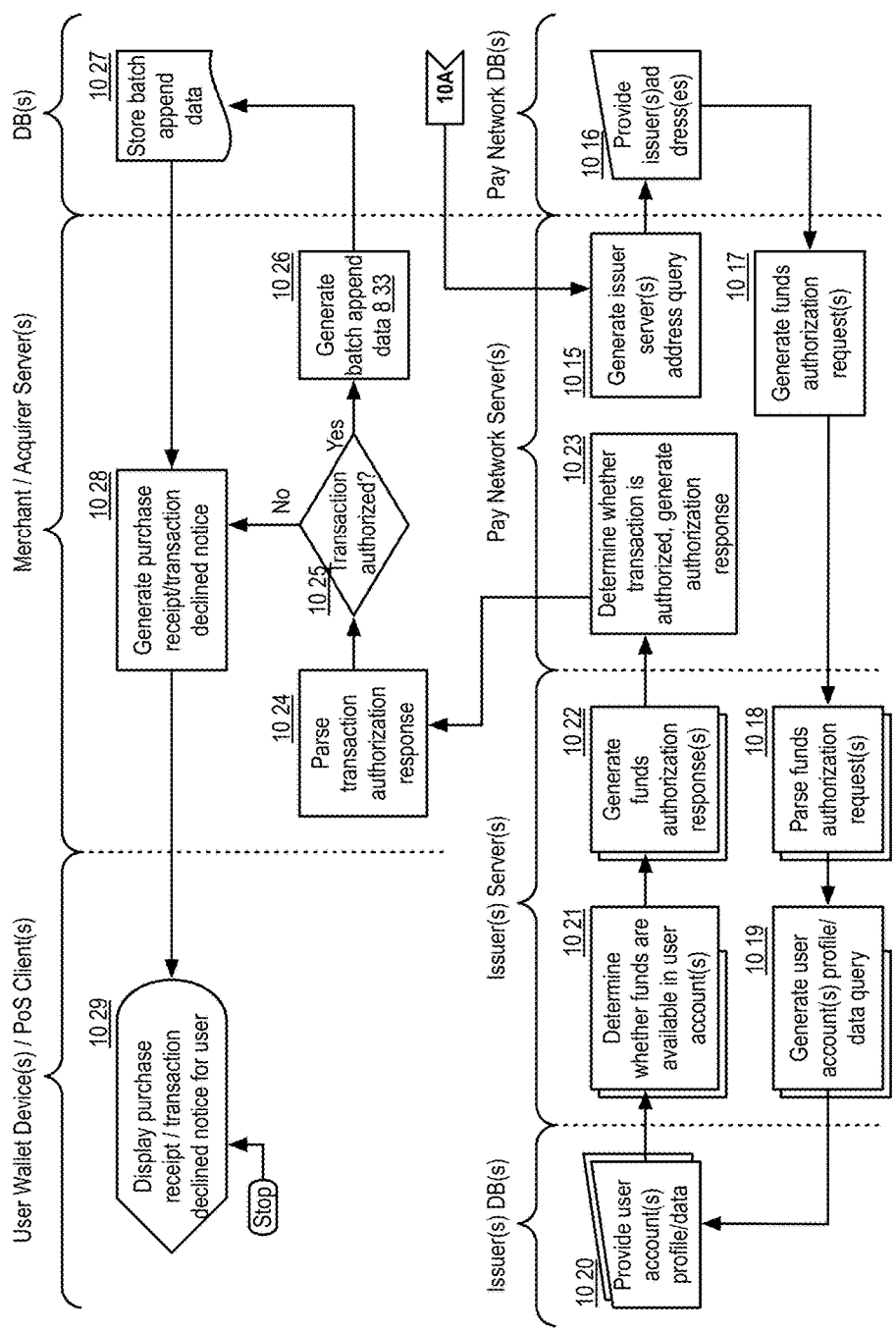

FIGS. 10A-B show logic flow diagrams illustrating example aspects of transforming a user virtual wallet access input via a Purchase Transaction Authorization ("PTA") component into a purchase transaction receipt notification. With reference to FIG. 10A, in some embodiments, a user may wish to utilize a virtual wallet account to purchase a product, service, offering, and/or the like ("product"), from a merchant via a merchant online site or in the merchant's store. The user may utilize a physical card, or a user wallet device to access the user's virtual wallet account. For example, the user wallet device may be a personal/laptop computer, cellular telephone, smartphone, tablet, eBook reader, netbook, gaming console, and/or the like. The user may provide a wallet access input, e.g., 1001, into the user wallet device. In various embodiments, the user input may include, but not be limited to: a single tap (e.g., a one-tap mobile app purchasing embodiment) of a touchscreen interface, keyboard entry, card swipe, activating a RFID/NFC equipped hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user, e.g., 1002-1003.

In some embodiments, upon authenticating the user for access to virtual wallet features, the user wallet device may provide a transaction authorization input, e.g., 1004, to a point-of-sale ("PoS") client. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. In embodiments where the user utilizes a user wallet device, the user wallet device may provide payment information to the PoS client, formatted according to a data formatting protocol appropriate to the communication mechanism employed in the communication between the user wallet device and the PoS client.

In some embodiments, the PoS client may obtain the transaction authorization input, and parse the input to extract payment information from the transaction authorization input, e.g., 1005. For example, the PoS client may utilize a parser, such as the example parsers provided below in the discussion with reference to FIG. 30. The PoS client may generate a card authorization request, e.g., 1006, using the obtained transaction authorization input from the user wallet device, and/or product/checkout data.

In some embodiments, the PoS client may provide the generated card authorization request to the merchant server. The merchant server may forward the card authorization request to a pay gateway server, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., 1008, for a network address of the payment gateway server, for example by using a portion of a user payment card number, or a user ID (such as an email address) as a keyword for the database query. In response, the merchant/acquirer database may provide the requested payment gateway address, e.g., 1010. The merchant server may forward the card authorization request to the pay gateway server using the provided address. In some embodiments, upon receiving the card authorization request from the merchant server, the pay gateway server may invoke a component to provide one or more service associated with purchase transaction authorization, e.g., 1011. For example, the pay gateway server may invoke components for fraud prevention (see e.g., VerifyChat, FIG. 17E), loyalty and/or rewards, and/or other services for which the user-merchant combination is authorized.

The pay gateway server may forward the card authorization request to a pay network server for payment processing, e.g., 1014. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., 1012, for a network address of the payment network server, for example by using a portion of a user payment card number, or a user ID (such as an email address) as a keyword for the database query. In response, the payment gateway database may provide the requested payment network address, e.g., 1013. The pay gateway server may forward the card authorization request to the pay network server using the provided address, e.g., 1014.

With reference to FIG. 10B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer. In some embodiments, the pay network server may generate a query, e.g., 1015, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s) of the issuer(s) may maintain details of the user's account(s). In some embodiments, a database, e.g., a pay network database, may store details of the issuer server(s) associated with the issuer(s). In some embodiments, the pay network server may query a database, e.g., 1015, for a network address of the issuer(s) server(s), for example by using a portion of a user payment card number, or a user ID (such as an email address) as a keyword for the database query.

In response to obtaining the issuer server query, the pay network database may provide, e.g., 1016, the requested issuer server data to the pay network server. In some embodiments, the pay network server may utilize the issuer server data to generate funds authorization request(s), e.g., 1017, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. In some embodiments, an issuer server may parse the authorization request(s), e.g., 1018, and based on the request details may query a database, e.g., 1019, for data associated with an account linked to the user.

In some embodiments, on obtaining the user account(s) data, e.g., 1020, the issuer server may determine whether the user can pay for the transaction using funds available in the account, e.g., 1021. For example, the issuer server may determine whether the user has a sufficient balance remaining in the account, sufficient credit associated with the account, and/or the like. Based on the determination, the issuer server(s) may provide a funds authorization response, e.g., 1022, to the pay network server. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 1023, the pay network server may invoke a component to provide value-add services for the user, e.g., 1023.

In some embodiments, the pay network server may forward a transaction authorization response to the user wallet device, PoS client, and/or merchant server. The merchant may parse, e.g., 1024, the transaction authorization response, and determine from it that the user possesses sufficient funds in the card account to conduct the transaction, e.g., 1025, option "Yes." The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 1026, and store the XML data file, e.g., 1027, in a database. In some embodiments, the server may also generate a purchase receipt, e.g., 1028, and provide the purchase receipt to the client. The client may render and display, e.g., 1029, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 11A:
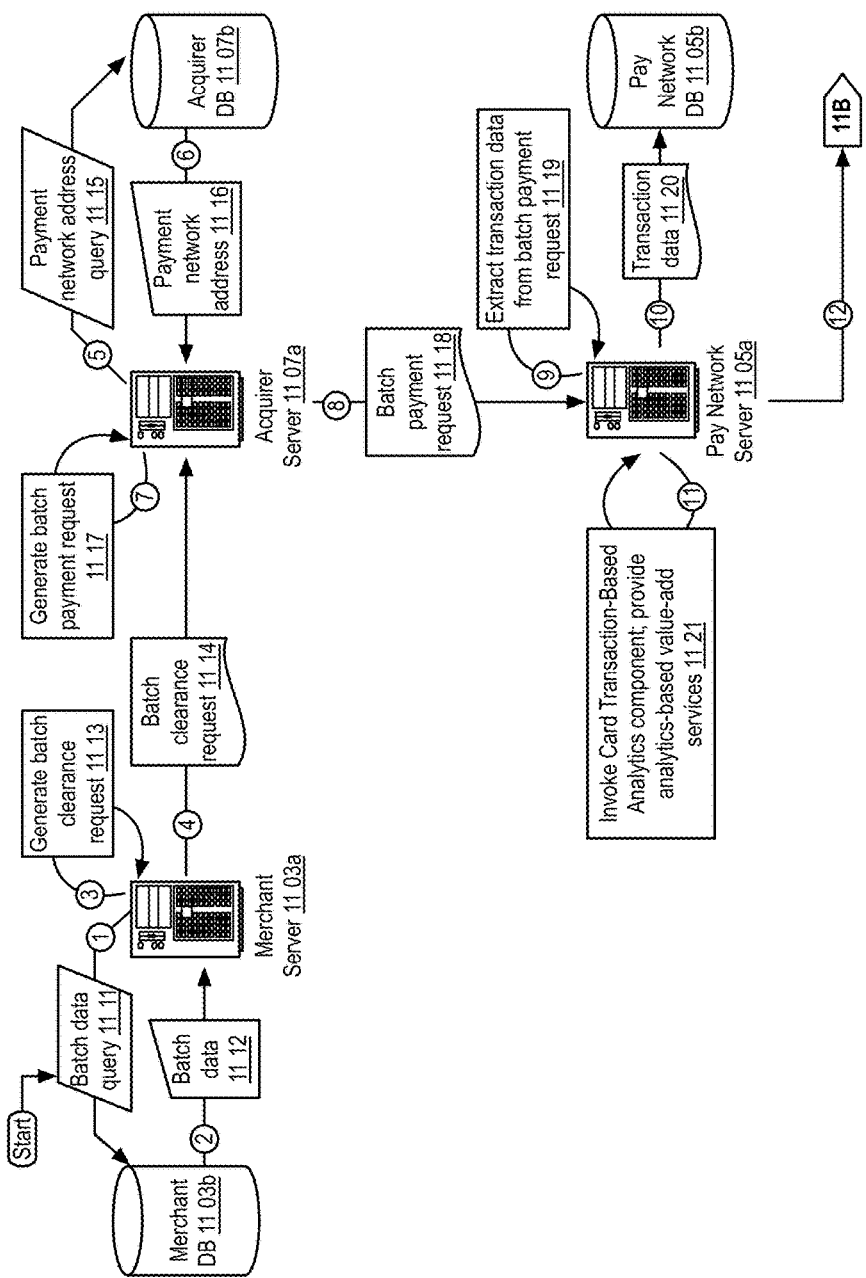
FIGS. 11A-B show datagraph diagrams illustrating example aspects of transforming a merchant transaction batch data query via a Purchase Transaction Clearance ("PTC") component into an updated payment ledger record, in one embodiment of the EAE.
Figure 11B:
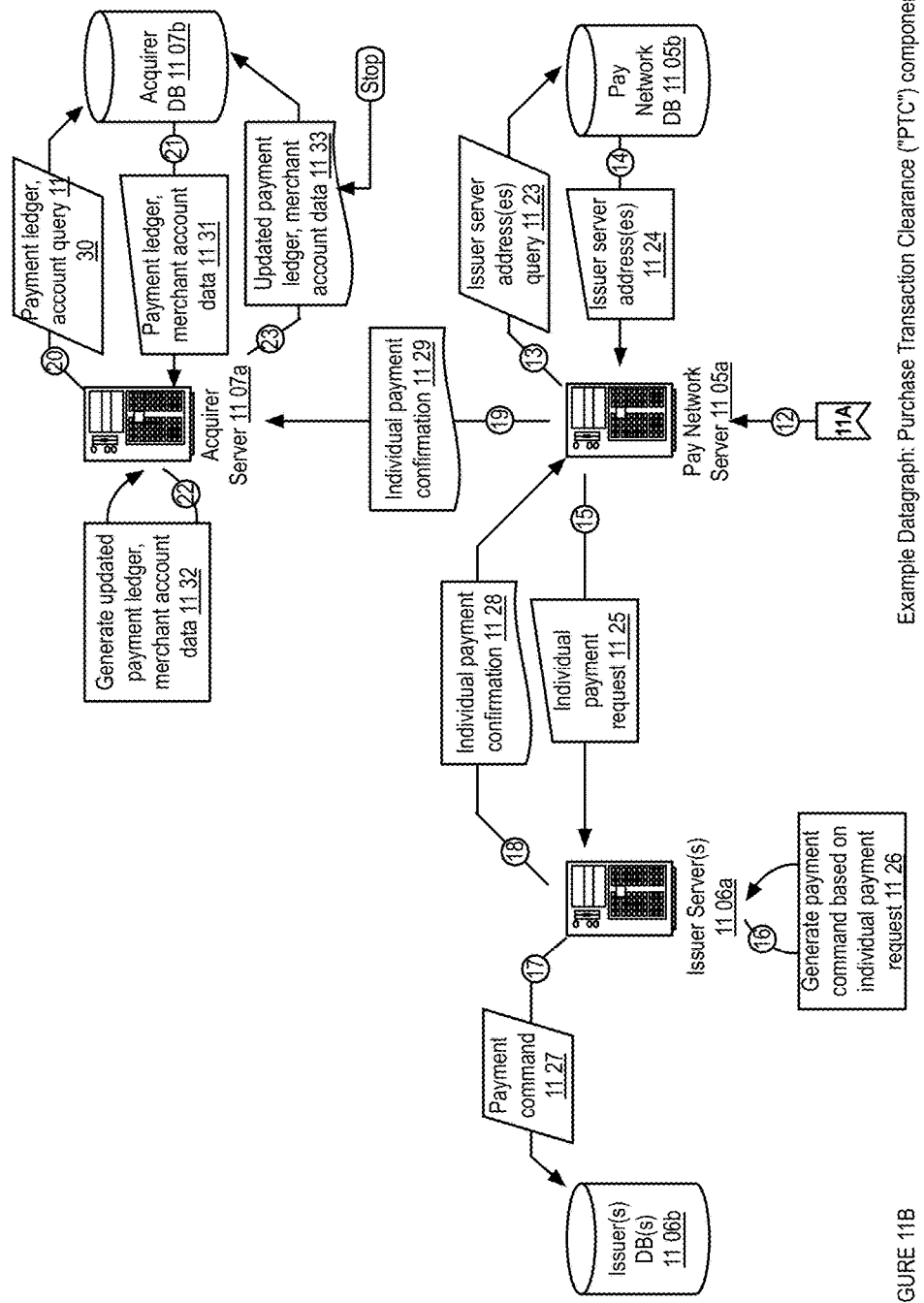

FIGS. 11A-B show data flow diagrams illustrating example aspects of transforming a merchant transaction batch data query via a Purchase Transaction Clearance ("PTC") component into an updated payment ledger record. With reference to FIG. 11A, in some embodiments, a merchant server, e.g., 1103*a*, may initiate clearance of a batch of authorized transactions. For example, the merchant server may generate a batch data request, e.g., 1111, and provide the request, to a merchant database, e.g., 1103*b*. For example, the merchant server may utilize PHP/SQL commands similar to the examples provided above to query a relational database. In response to the batch data request, the database may provide the requested batch data, e.g., 1112. The server may generate a batch clearance request, e.g., 1113, using the batch data obtained from the database, and provide, e.g., 1114, the batch clearance request to an acquirer server, e.g., 1107*a*. For example, the merchant server may provide a HTTP(S) POST message including XML-formatted batch data in the message body for the acquirer server.

The acquirer server may generate, e.g., 1115, a batch payment request using the obtained batch clearance request, and provide, e.g., 1118, the batch payment request to the pay network server, e.g., 1105*a*. The pay network server may parse the batch payment request, and extract the transaction data for each transaction stored in the batch payment request, e.g., 1119. The pay network server may store the transaction data, e.g., 1120, for each transaction in a database, e.g., pay network database 1105*b*. In some embodiments, the pay network server may invoke a component to provide value-add analytics services based on analysis of the transactions of the merchant for whom the EAE is clearing purchase transactions. Thus, in some embodiments, the pay network server may provide analytics-based value-added services for the merchant and/or the merchant's users.

With reference to FIG. 11B, in some embodiments, for each extracted transaction, the pay network server may query, e.g., 1123, a database, e.g., pay network database 1105*b*, for an address of an issuer server. For example, the pay network server may utilize PHP/SQL commands similar to the examples provided above. The pay network server may generate an individual payment request, e.g., 1125, for each transaction for which it has extracted transaction data, and provide the individual payment request, e.g., 1125, to the issuer server, e.g., 1106*a*. For example, the pay network server may provide an individual payment request to the issuer server(s) as a HTTP(S) POST message including XML-formatted data. An example listing of an individual payment request 1125, substantially in the form of a HTTP(S) POST message including XML-formatted data, is provided below:

```
POST /paymentrequest.php HTTP/1.1
Host: www.issuer.com
Content-Type: Application/XML
Content-Length: 788
<?XML version = "1.0" encoding = "UTF-8"?>
<pay_request>
   <request_ID>CNI4ICNW2</request_ID>
   <timestamp>2011-02-22 17:00:01</timestamp>
   <pay_amount>$72.89</pay_amount>
   <account_params>
      <account>
         <account_type>debit</account_type>
         <value_exchange_symbol>USD</value_exchange_symbol>
         <account_number>123456789012345</account_number>
            <account_name>John Q. Public</account_name>
            <bill_add>987 Green St #456, Chicago, IL 94652</bill_add>
            <ship_add>987 Green St #456, Chicago, IL 94652</ship_add>
            <CVV>1234</CVV>
      </account>
   </account_params>
</pay_request>
```

In some embodiments, the issuer server may generate a payment command, e.g., 1127. For example, the issuer server may issue a command to deduct funds from the user's account (or add a charge to the user's credit card account). The issuer server may issue a payment command, e.g., 1127, to a database storing the user's account information, e.g., user profile database 1106*b*. The issuer server may provide an individual payment confirmation, e.g., 1128, to the pay network server, which may forward, e.g., 1129, the funds transfer message to the acquirer server. An example listing of an individual payment confirmation 1128, substantially in the form of a HTTP(S) POST message including XML-formatted data, is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$72.89</deposit_amount>
</deposit_ack>
```

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 1130, an acquirer database 1107b for payment ledger and/or merchant account data, e.g., 1131. The acquirer server may utilize payment ledger and/or merchant account data from the acquirer database, along with the individual payment confirmation, to generate updated payment ledger and/or merchant account data, e.g., 1132. The acquirer server may then store, e.g., 1133, the updated payment ledger and/or merchant account data to the acquire database.

Figure 12A:
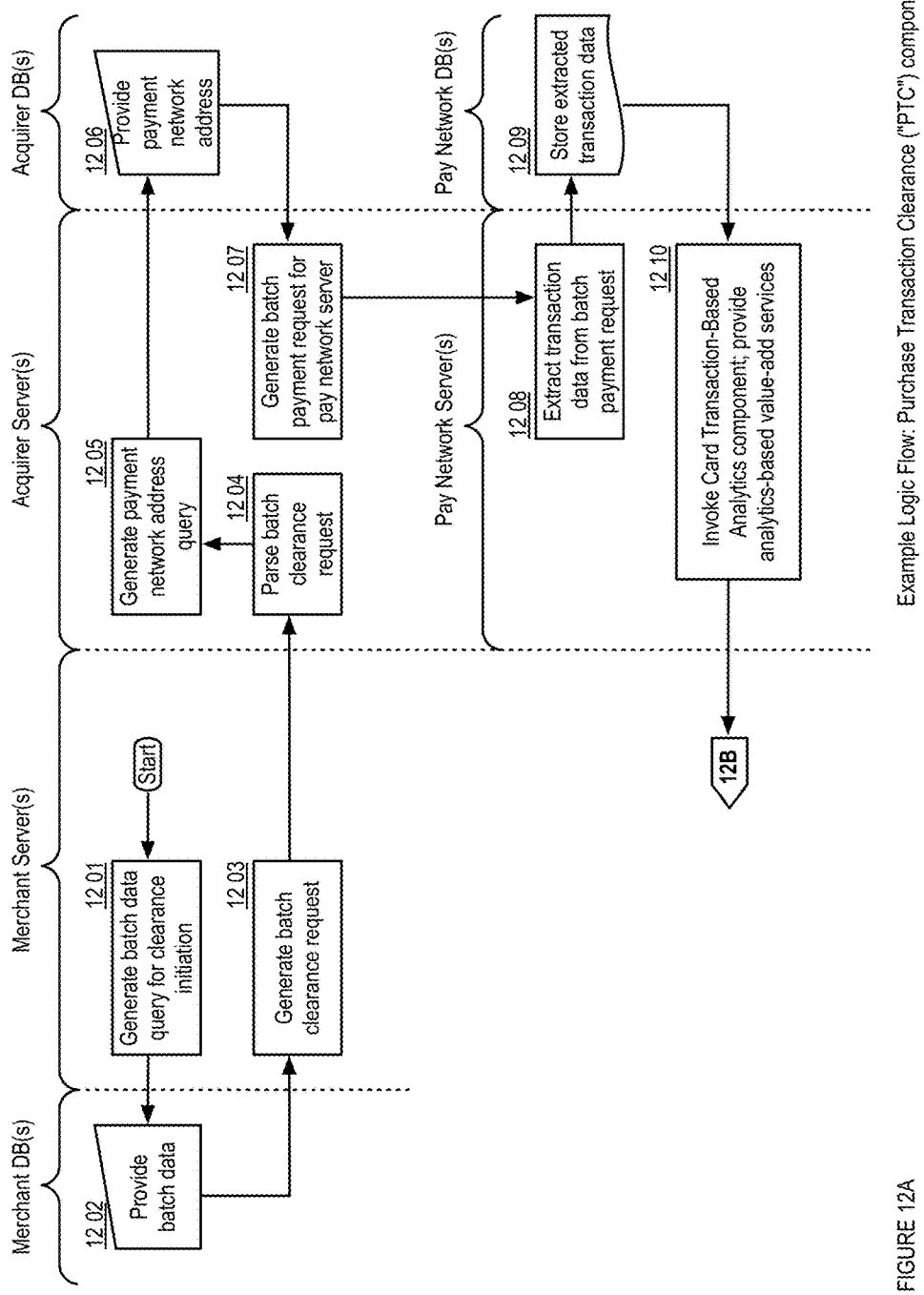
FIGS. 12A-B show logic flow diagrams illustrating example aspects of transforming a merchant transaction batch data query via a Purchase Transaction Clearance ("PTC") component into an updated payment ledger record, in one embodiment of the EAE.
Figure 12B:
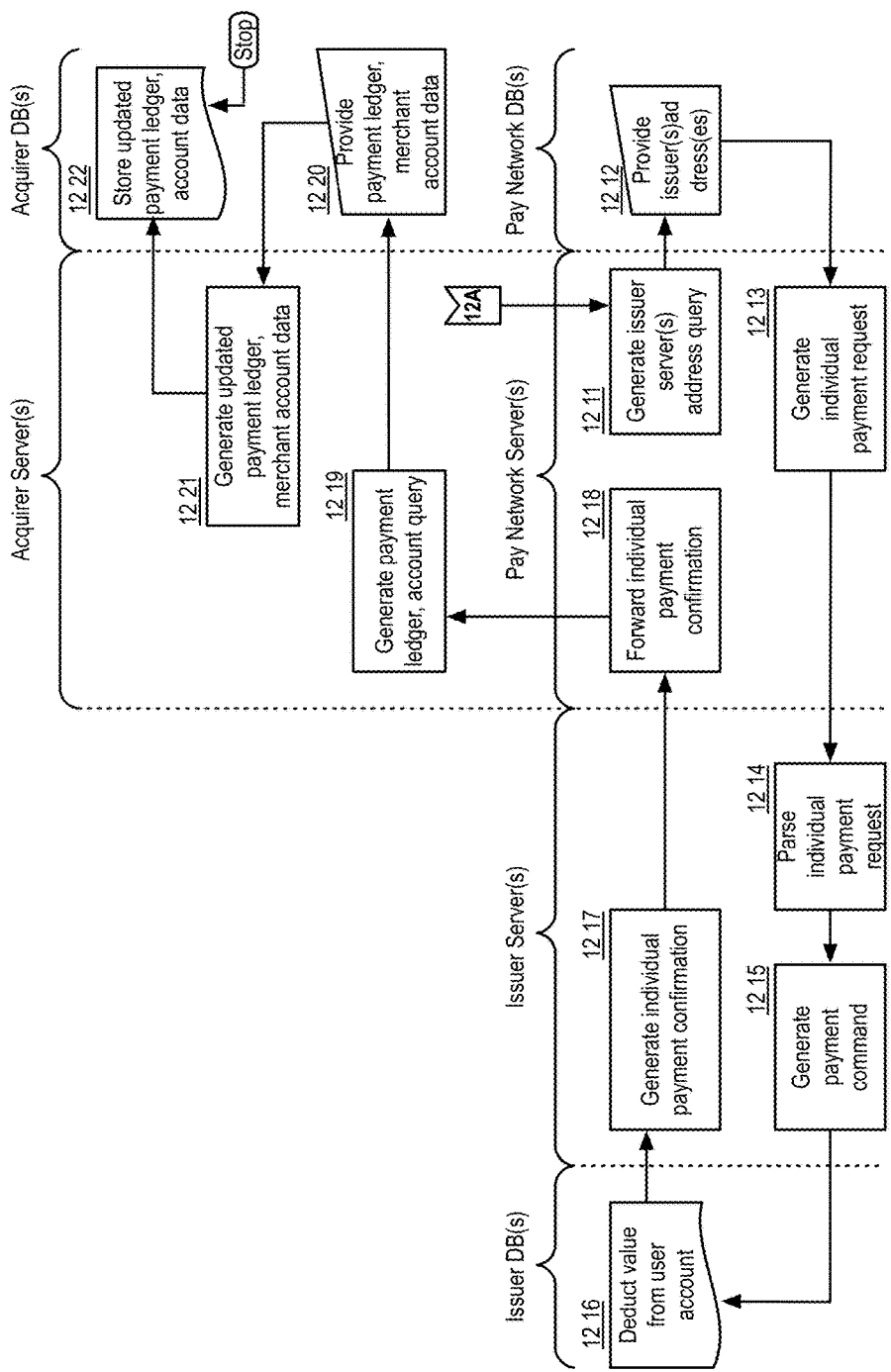

FIGS. 12A-B show logic flow diagrams illustrating example aspects of transforming a merchant transaction batch data query via a Purchase Transaction Clearance ("PTC") component into an updated payment ledger record. With reference to FIG. 12A, in some embodiments, a merchant server may initiate clearance of a batch of authorized transactions. For example, the merchant server may generate a batch data request, e.g., 1201, and provide the request to a merchant database. In response to the batch data request, the database may provide the requested batch data, e.g., 1202. The server may generate a batch clearance request, e.g., 1203, using the batch data obtained from the database, and provide the batch clearance request to an acquirer server. The acquirer server may parse, e.g., 1204, the obtained batch clearance request, and generate, e.g., 1207, a batch payment request using the obtained batch clearance request to provide, the batch payment request to a pay network server. For example, the acquirer server may query, e.g., 1205, an acquirer database for an address of a payment network server, and utilize the obtained address, e.g., 1206, to forward the generated batch payment request to the pay network server.

The pay network server may parse the batch payment request obtained from the acquirer server, and extract the transaction data for each transaction stored in the batch payment request, e.g., 1208. The pay network server may store the transaction data, e.g., 1209, for each transaction in a pay network database. In some embodiments, the pay network server may invoke a component, e.g., 1210, to provide analytics based on the transactions of the merchant for whom purchase transaction are being cleared.

With reference to FIG. 12B, in some embodiments, for each extracted transaction, the pay network server may query, e.g., 1211, a pay network database for an address of an issuer server. The pay network server may generate an individual payment request, e.g., 1213, for each transaction for which it has extracted transaction data, and provide the individual payment request to the issuer server. In some embodiments, the issuer server may parse the individual payment request, e.g., 1214, and generate a payment command, e.g., 1215, based on the parsed individual payment request. For example, the issuer server may issue a command to deduct funds from the user's account (or add a charge to the user's credit card account). The issuer server may issue a payment command, e.g., 1215, to a database storing the user's account information, e.g., a user profile database. The issuer server may provide an individual payment confirmation, e.g., 1217, to the pay network server, which may forward, e.g., 1218, the individual payment confirmation to the acquirer server.

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 1219, an acquirer database for payment ledger and/or merchant account data, e.g., 1220. The acquirer server may utilize payment ledger and/or merchant account data from the acquirer database, along with the individual payment confirmation, to generate updated payment ledger and/or merchant account data, e.g., 1221. The acquirer server may then store, e.g., 1222, the updated payment ledger and/or merchant account data to the acquire database.

Figure 13:
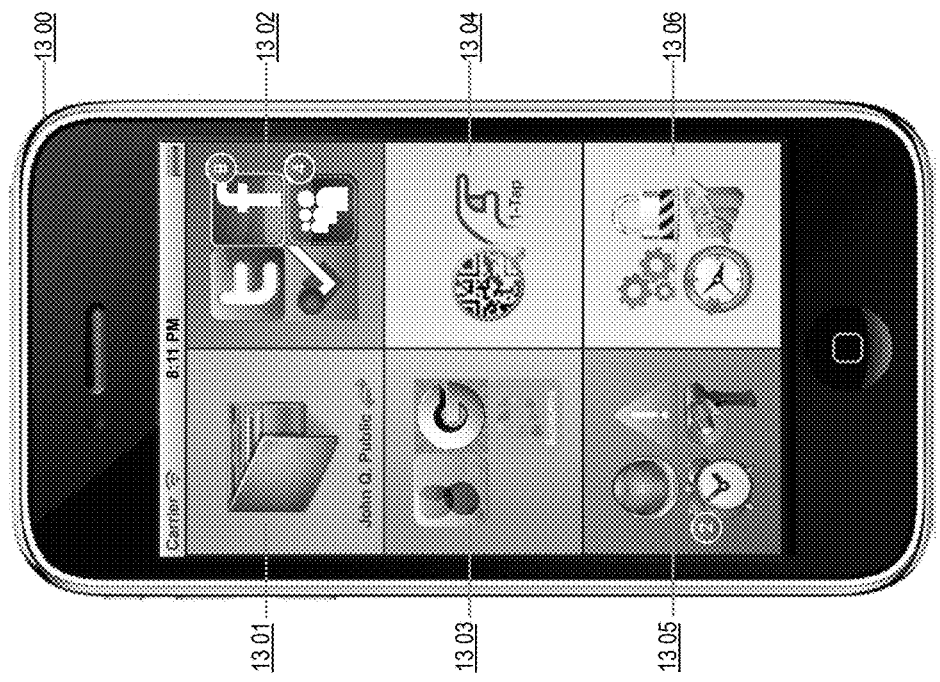
FIG. 13 shows a user interface diagram illustrating an overview of example features of virtual wallet applications, in one embodiment of the EAE.

FIG. 13 shows a user interface diagram illustrating an overview of example features of virtual wallet applications in some embodiments of the EAE. FIG. 13 shows an illustration of various exemplary features of a virtual wallet mobile application 1300. Some of the features displayed include a wallet 1301, social integration via TWITTER, FACEBOOK, etc., offers and loyalty 1303, snap mobile purchase 1304, alerts 1305 and security, setting and analytics 1396. These features are explored in further detail below.

Figure 14A:
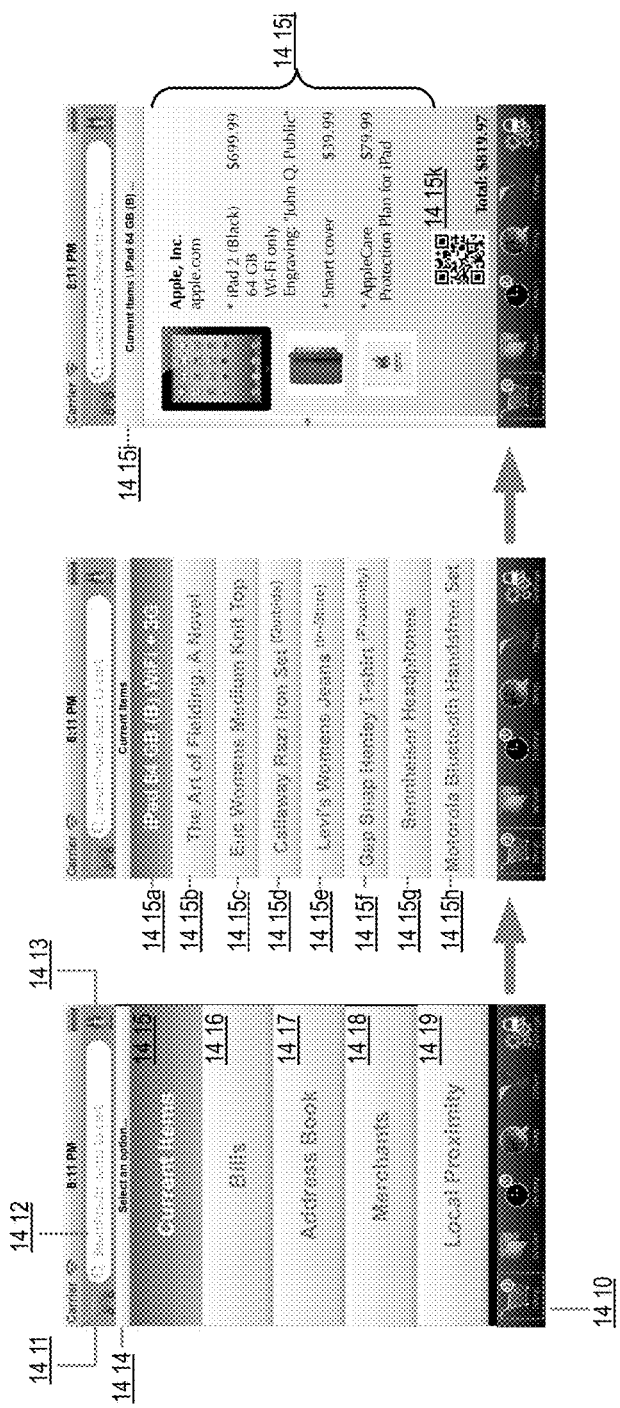
FIGS. 14A-G show user interface diagrams illustrating example features of virtual wallet applications in a shopping mode, in one embodiment of the EAE.

FIGS. 14A-G show user interface diagrams illustrating example features of virtual wallet applications in a shopping mode, in some embodiments of the EAE. With reference to FIG. 14A, some embodiments of the virtual wallet mobile app facilitate and greatly enhance the shopping experience of consumers. A variety of shopping modes, as shown in FIG. 14A, may be available for a consumer to peruse. In one implementation, for example, a user may launch the shopping mode by selecting the shop icon 1410 at the bottom of the user interface. A user may type in an item in the search field 1412 to search and/or add an item to a cart 1411. A user may also use a voice activated shopping mode by saying the name or description of an item to be searched and/or added to the cart into a microphone 1413. In a further implementation, a user may also select other shopping options 1414 such as current items 1415, bills 1416, address book 1417, merchants 1418 and local proximity 1419.

In one embodiment, for example, a user may select the option current items 1415, as shown in the left most user interface of FIG. 14A. When the current items 1415 option is selected, the middle user interface may be displayed. As shown, the middle user interface may provide a current list of items 1415a-h in a user's shopping cart 1411. A user may select an item, for example item 1415a, to view product description 1415j of the selected item and/or other items from the same merchant. The price and total payable information may also be displayed, along with a QR code 1415k that captures the information necessary to effect a snap mobile purchase transaction.

Figure 14B:
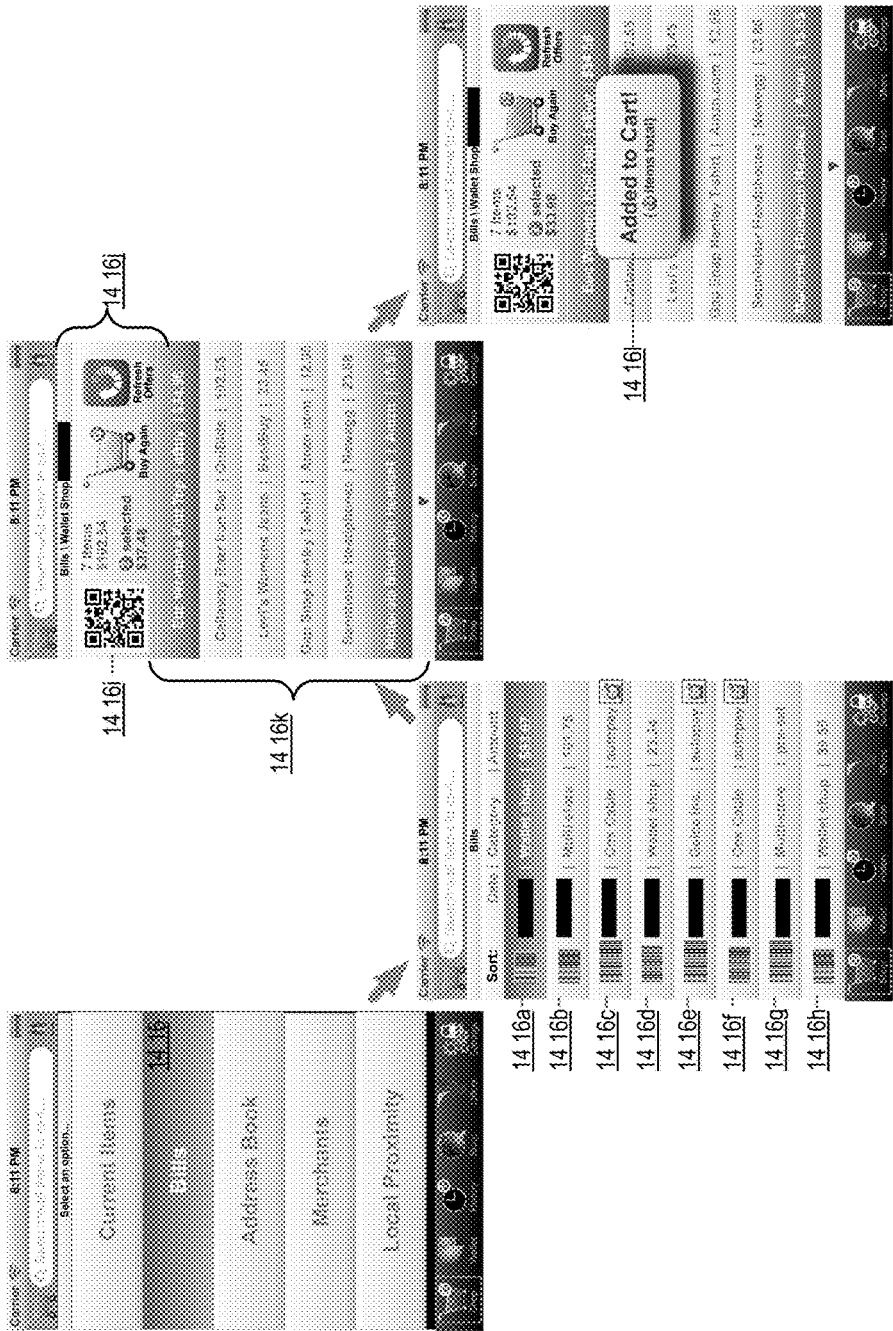

With reference to FIG. 14B, in another embodiment, a user may select the bills 1416 option. Upon selecting the bills 1416 option, the user interface may display a list of bills and/or receipts 1416a-h from one or more merchants. Next to each of the bills, additional information such as date of visit, whether items from multiple stores are present, last bill payment date, auto-payment, number of items, and/or the like may be displayed. In one example, the wallet shop bill 1416*a* dated Jan. 20, 2011 may be selected. The wallet shop bill selection may display a user interface that provides a variety of information regarding the selected bill. For example, the user interface may display a list of items 1416*k* purchased, <<1416*i*>>, a total number of items and the corresponding value. For example, 7 items worth $102.54 were in the selected wallet shop bill. A user may now select any of the items and select buy again to add purchase the items. The user may also refresh offers 1416*j* to clear any invalid offers from last time and/or search for new offers that may be applicable for the current purchase. As shown in FIG. 14B, a user may select two items for repeat purchase. Upon addition, a message 1416*l* may be displayed to confirm the addition of the two items, which makes the total number of items in the cart 14.

Figure 14C:
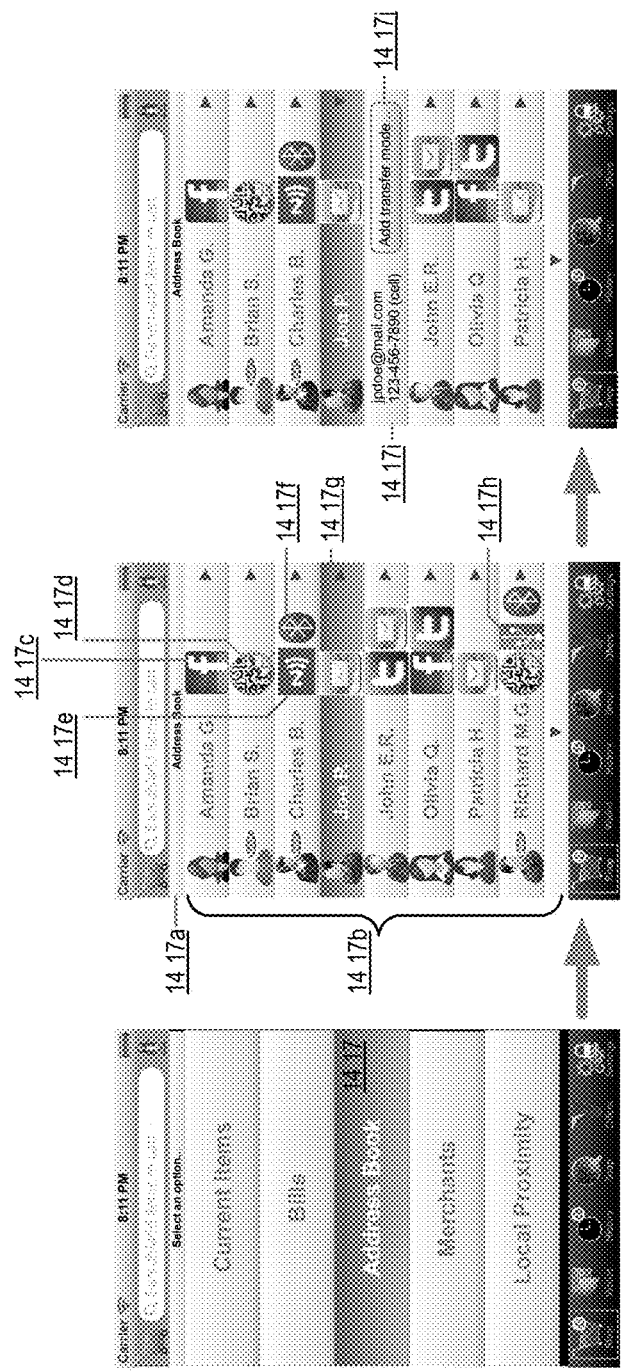

With reference to FIG. 14C, in yet another embodiment, a user may select the address book option 1417 to view the address book 1417*a* which includes a list of contacts 1417*b* and make any money transfers or payments. In one embodiment, the address book may identify each contact using their names and available and/or preferred modes of payment. For example, a contact Amanda G. may be paid via social pay (e.g., via FACEBOOK) as indicated by the icon 1417*c*. In another example, money may be transferred to Brian S. via QR code as indicated by the QR code icon 1417*d*. In yet another example, Charles B. may accept payment via near field communication 1417*e*, Bluetooth 1417*f* and email 1417*g*. Payment may also be made via USB 1417*h* (e.g., by physically connecting two mobile devices) as well as other social channels such as TWITTER.

Figure 14D:
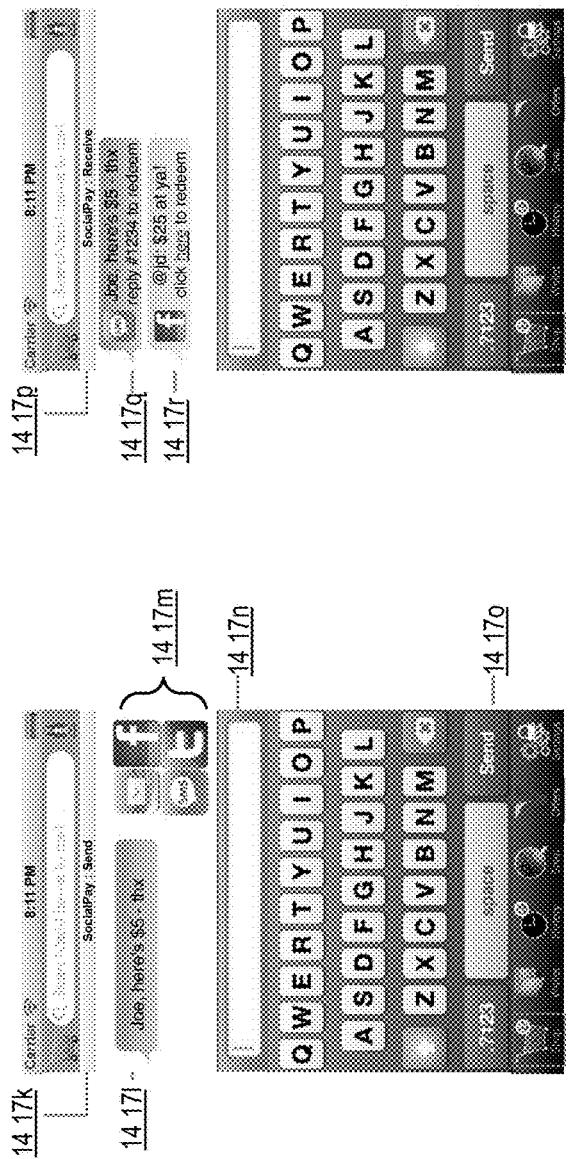

In one implementation, a user may select Joe P. for payment. Joe P., as shown in the user interface, has an email icon 1417*g* next to his name indicating that Joe P. accepts payment via email. When his name is selected, the user interface may display his contact information such as email, phone, etc. If a user wishes to make a payment to Joe P. by a method other than email, the user may add another transfer mode 1417*j* to his contact information and make a payment transfer. With reference to FIG. 14D, the user may be provided with a screen 1417*k* where the user can enter an amount to send Joe, as well as add other text to provide Joe with context for the payment transaction 1417*l*. The user can choose modes (e.g., SMS, email, social networking) via which Joe may be contacted via graphical user interface elements, 1417*m*. As the user types, the text entered may be provided for review within a GUI element 1417*n*. When the user has completed entering in the necessary information, the user can press the send button 1417*o* to send the social message to Joe. If Joe also has a virtual wallet application, Joe may be able to review 1417*p* social pay message within the app, or directly at the website of the social network (e.g., for Twitter™, Facebook®, etc.). Messages may be aggregated from the various social networks and other sources (e.g., SMS, email). The method of redemption appropriate for each messaging mode may be indicated along with the social pay message. In the illustration in FIG. 14D, the SMS 1417*q* Joe received indicates that Joe can redeem the $5 obtained via SMS by replying to the SMS and entering the hash tag value '#1234'. In the same illustration, Joe has also received a message 1417*r* via Facebook®, which includes a URL link that Joe can activate to initiate redemption of the $25 payment.

Figure 14E:

With reference to FIG. 14E, in some other embodiments, a user may select merchants 1418 from the list of options in the shopping mode to view a select list of merchants 1418*a-e*. In one implementation, the merchants in the list may be affiliated to the wallet, or have affinity relationship with the wallet. In another implementation, the merchants may include a list of merchants meeting a user-defined or other criteria. For example, the list may be one that is curated by the user, merchants where the user most frequently shops or spends more than an x amount of sum or shopped for three consecutive months, and/or the like. In one implementation, the user may further select one of the merchants, Amazon 1418*a* for example. The user may then navigate through the merchant's listings to find items of interest such as 1418*f-j*. Directly through the wallet and without visiting the merchant site from a separate page, the user may make a selection of an item 1418*j* from the catalog of Amazon 1418*a*. As shown in the right most user interface of FIG. 14D, the selected item may then be added to cart. The message 1418*k* indicates that the selected item has been added to the cart, and updated number of items in the cart is now 13.

Figure 14F:

With reference to FIG. 14F, in one embodiment, there may be a local proximity option 1419 which may be selected by a user to view a list of merchants that are geographically in close proximity to the user. For example, the list of merchants 1419*a-e* may be the merchants that are located close to the user. In one implementation, the mobile application may further identify when the user in a store based on the user's location. For example, position icon 1419*d* may be displayed next to a store (e.g., Walgreens) when the user is in close proximity to the store. In one implementation, the mobile application may refresh its location periodically in case the user moved away from the store (e.g., Walgreens). In a further implementation, the user may navigate the offerings of the selected Walgreens store through the mobile application. For example, the user may navigate, using the mobile application, to items 1419*f-j* available on aisle 5 of Walgreens. In one implementation, the user may select corn 1419*i* from his or her mobile application to add to cart 1419*k*.

Figure 14G:
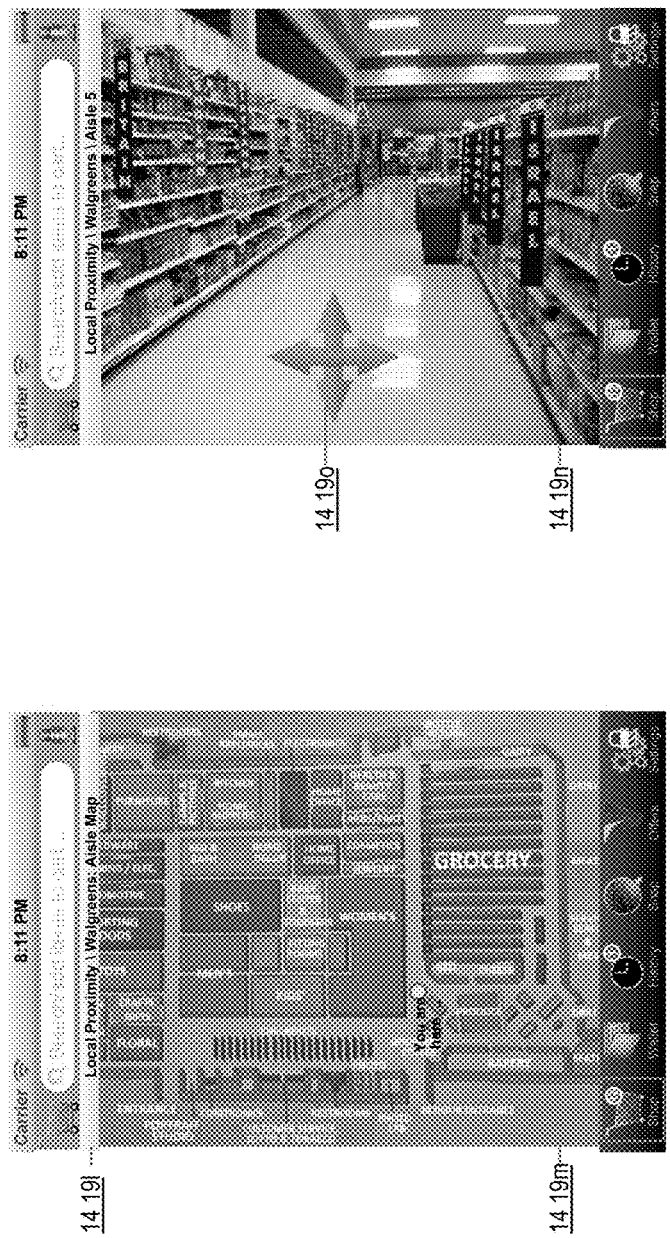
Figure 15A:
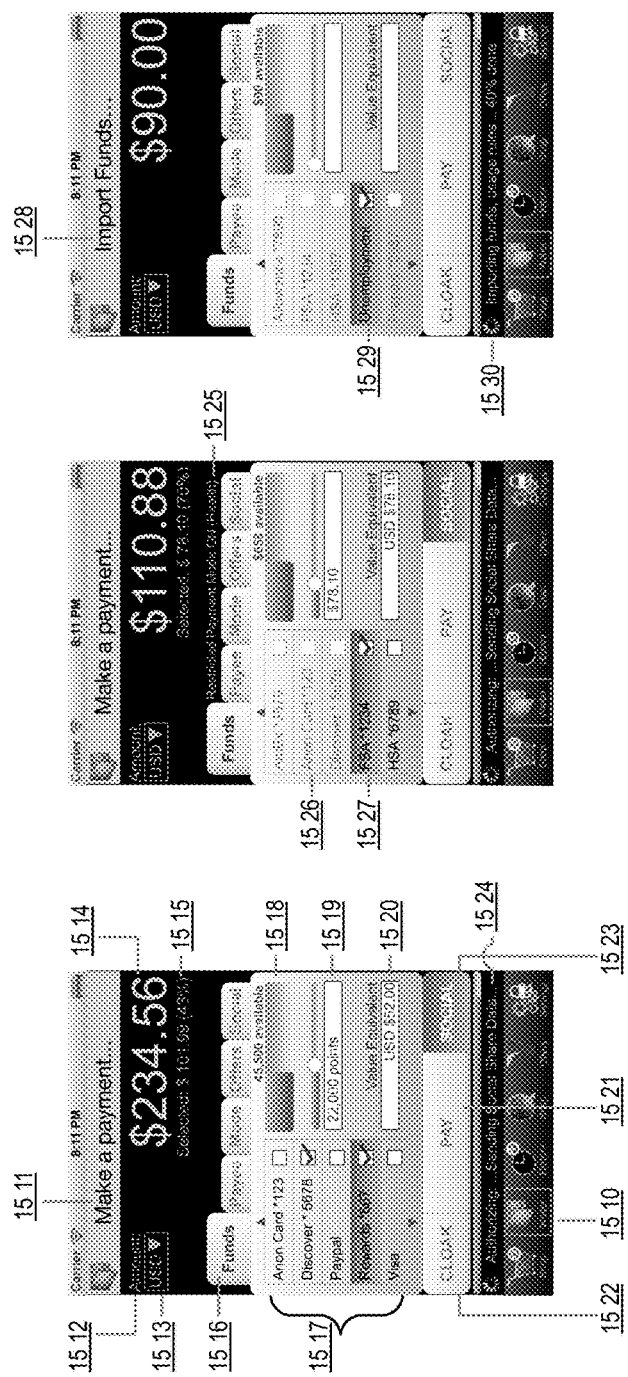
FIGS. 15A-F show user interface diagrams illustrating example features of virtual wallet applications in a payment mode, in one embodiment of the EAE.

With reference to FIG. 14G, in another embodiment, the local proximity option 1419 may include a store map and a real time map features among others. For example, upon selecting the Walgreens store, the user may launch an aisle map 1419*l* which displays a map 1419*m* showing the organization of the store and the position of the user (indicated by a yellow circle). In one implementation, the user may easily configure the map to add one or more other users (e.g., user's kids) to share each other's location within the store. In another implementation, the user may have the option to launch a "store view" similar to street views in maps. The store view 1419*n* may display images/video of the user's surrounding. For example, if the user is about to enter aisle 5, the store view map may show the view of aisle 5. Further the user may manipulate the orientation of the map using the navigation tool 1419*o* to move the store view forwards, backwards, right, left as well clockwise and counterclockwise rotation FIGS. 15A-F show user interface diagrams illustrating example features of virtual wallet applications in a payment mode, in some embodiments of the EAE. With reference to FIG. 15A, in one embodiment, the wallet mobile application may provide a user with a number of options for paying for a transaction via the wallet mode 1510. In one implementation, an example user interface 1511 for making a payment is shown. The user interface may clearly identify the amount 1512 and the currency 1513 for the transaction. The amount may be the amount payable and the currency may include real currencies such as dollars and euros, as well as virtual currencies such as reward points. The amount of the transaction 1514 may also be prominently displayed on the user interface. The user may select the funds tab 1516 to select one or more forms of payment 1517, which may include various credit, debit, gift, rewards and/or prepaid cards. The user may also have the option of paying, wholly or in part, with reward points. For example, the graphical indicator 1518 on the user interface shows the number of points available, the graphical indicator 1519 shows the number of points to be used towards the amount due 234.56 and the equivalent 1520 of the number of points in a selected currency (USD, for example).

In one implementation, the user may combine funds from multiple sources to pay for the transaction. The amount 1515 displayed on the user interface may provide an indication of the amount of total funds covered so far by the selected forms of payment (e.g., Discover card and rewards points). The user may choose another form of payment or adjust the amount to be debited from one or more forms of payment until the amount 1515 matches the amount payable 1514. Once the amounts to be debited from one or more forms of payment are finalized by the user, payment authorization may begin.

In one implementation, the user may select a secure authorization of the transaction by selecting the cloak button 1522 to effectively cloak or anonymize some (e.g., preconfigured) or all identifying information such that when the user selects pay button 1521, the transaction authorization is conducted in a secure and anonymous manner. In another implementation, the user may select the pay button 1521 which may use standard authorization techniques for transaction processing. In yet another implementation, when the user selects the social button 1523, a message regarding the transaction may be communicated to one of more social networks (set up by the user) which may post or announce the purchase transaction in a social forum such as a wall post or a tweet. In one implementation, the user may select a social payment processing option 1523. The indicator 1524 may show the authorizing and sending social share data in progress.

In another implementation, a restricted payment mode 1525 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 1526 under the funds tab to select specialized accounts such as a flexible spending account (FSA) 1527, health savings account (HAS), and/or the like and amounts to be debited to the selected accounts. In one implementation, such restricted payment mode 1525 processing may disable social sharing of purchase information.

In one embodiment, the wallet mobile application may facilitate importing of funds via the import funds user interface 1528. For example, a user who is unemployed may obtain unemployment benefit fund 1529 via the wallet mobile application. In one implementation, the entity providing the funds may also configure rules for using the fund as shown by the processing indicator message 1530. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 15B:
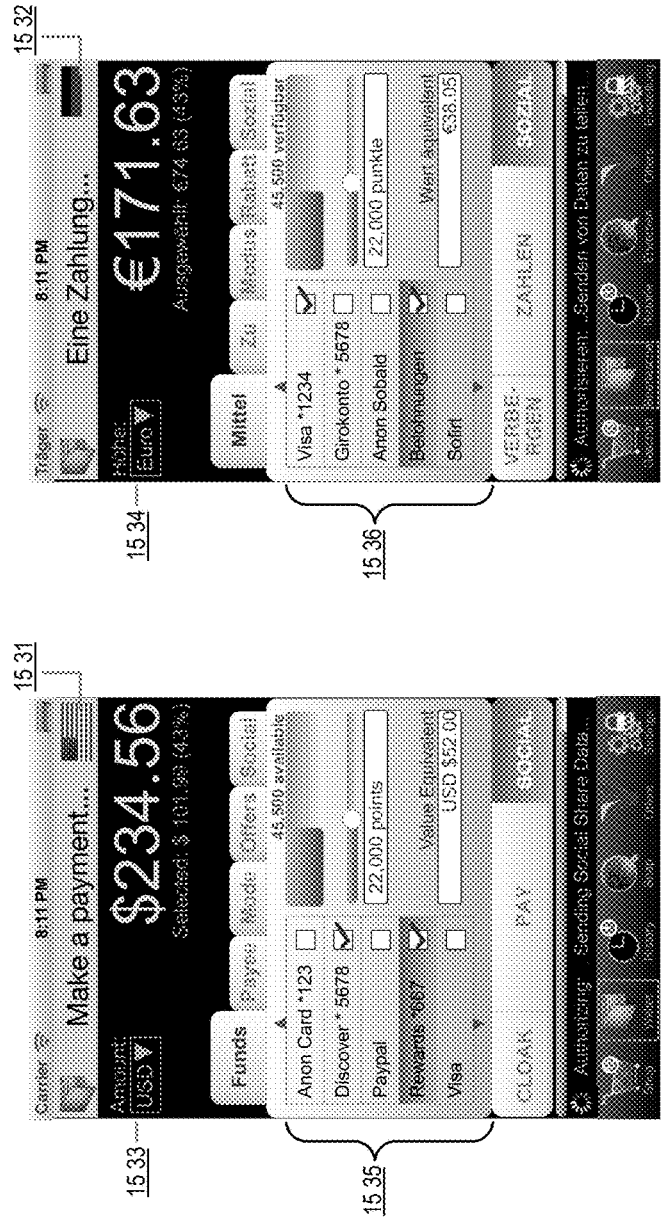

With reference to FIG. 15B, in one embodiment, the wallet mobile application may facilitate dynamic payment optimization based on factors such as user location, preferences and currency value preferences among others. For example, when a user is in the United States, the country indicator 1531 may display a flag of the United States and may set the currency 1533 to the United States. In a further implementation, the wallet mobile application may automatically rearrange the order in which the forms of payments 1535 are listed to reflect the popularity or acceptability of various forms of payment. In one implementation, the arrangement may reflect the user's preference, which may not be changed by the wallet mobile application.

Similarly, when a German user operates a wallet in Germany, the mobile wallet application user interface may be dynamically updated to reflect the country of operation 1532 and the currency 1534. In a further implementation, the wallet application may rearrange the order in which different forms of payment 1536 are listed based on their acceptance level in that country. Of course, the order of these forms of payments may be modified by the user to suit his or her own preferences.

Figure 15C:
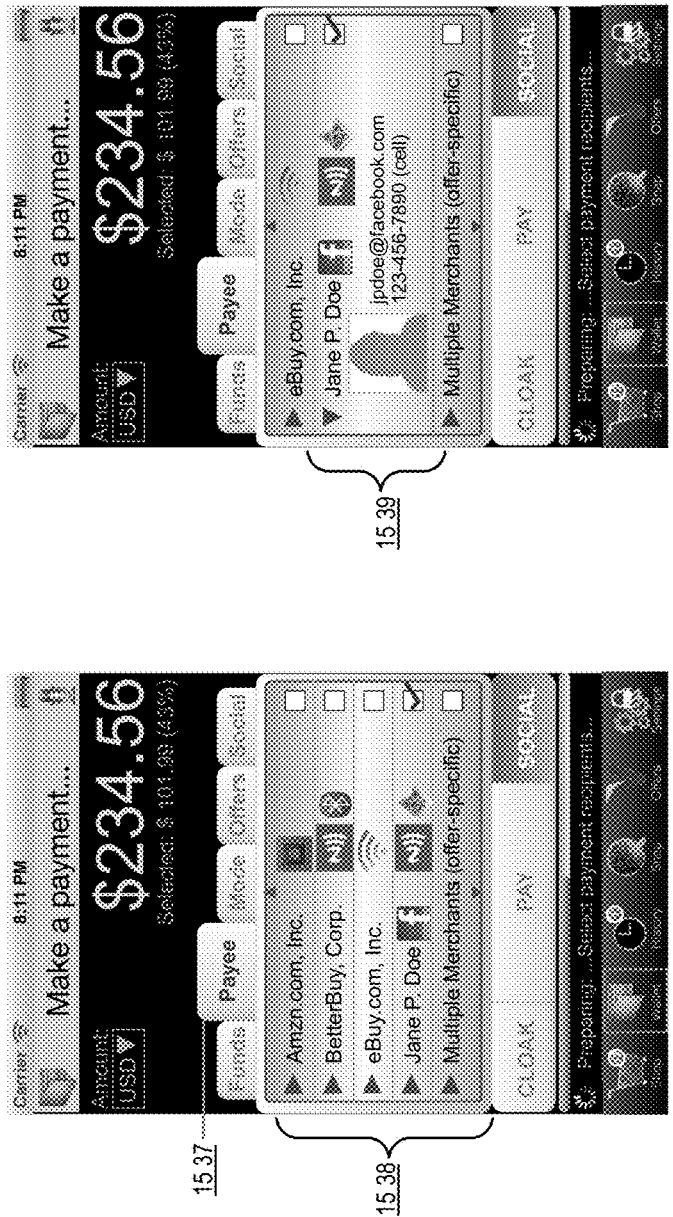

With reference to FIG. 15C, in one embodiment, the payee tab 1537 in the wallet mobile application user interface may facilitate user selection of one or more payees receiving the funds selected in the funds tab. In one implementation, the user interface may show a list of all payees 1538 with whom the user has previously transacted or available to transact. The user may then select one or more payees. The payees 1538 may include larger merchants such as Amazon.com Inc., and individuals such as Jane P. Doe. Next to each payee name, a list of accepted payment modes for the payee may be displayed. In one implementation, the user may select the payee Jane P. Doe 1539 for receiving payment. Upon selection, the user interface may display additional identifying information relating to the payee.

Figure 15D:
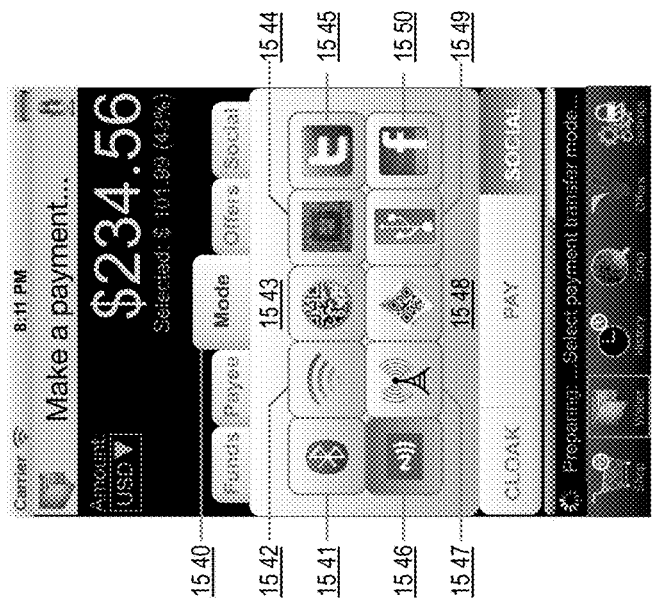

With reference to FIG. 15D, in one embodiment, the mode tab 1540 may facilitate selection of a payment mode accepted by the payee. A number of payment modes may be available for selection. Example modes include, blue tooth 1541, wireless 1542, snap mobile by user-obtained QR code 1543, secure chip 1544, TWITTER 1545, near-field communication (NFC) 1546, cellular 1547, snap mobile by user-provided QR code 1548, USB 1549 and FACEBOOK 1550, among others. In one implementation, only the payment modes that are accepted by the payee may be selectable by the user. Other non-accepted payment modes may be disabled.

Figure 15E:
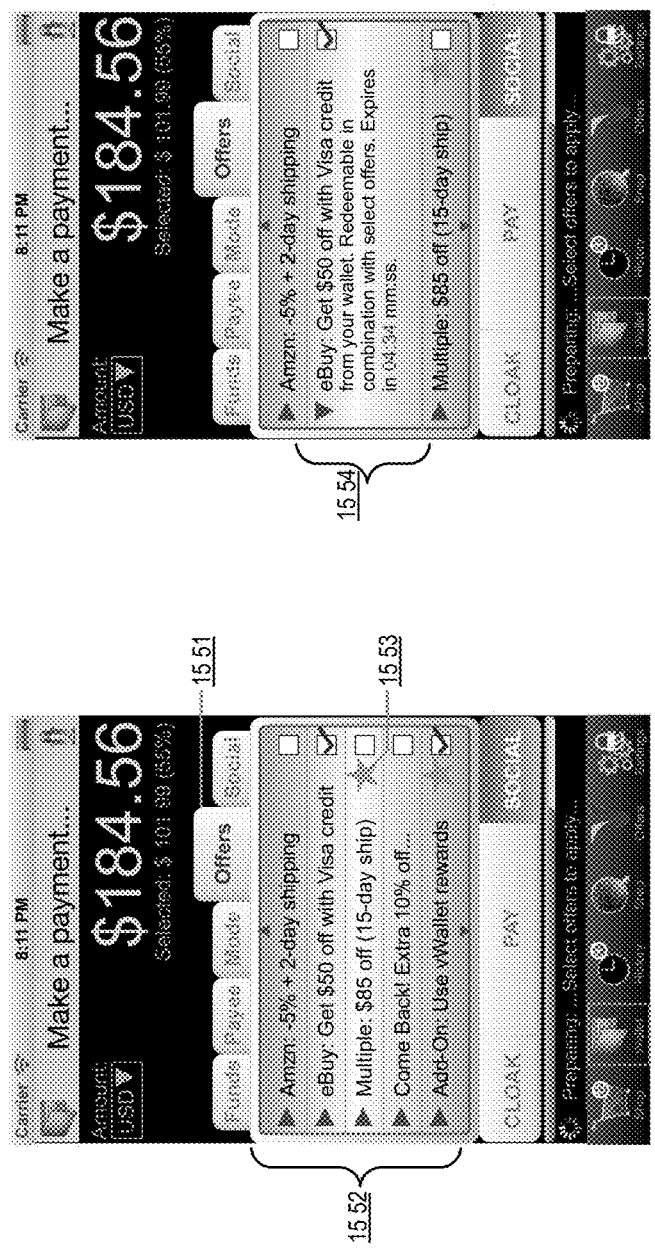

With reference to FIG. 15E, in one embodiment, the offers tab 1551 may provide real-time offers that are relevant to items in a user's cart for selection by the user. The user may select one or more offers from the list of applicable offers 1552 for redemption. In one implementation, some offers may be combined, while others may not. When the user selects an offer that may not be combined with another offer, the unselected offers may be disabled. In a further implementation, offers that are recommended by the wallet application's recommendation engine may be identified by an indicator, such as the one shown by 1553. In a further implementation, the user may read the details of the offer by expanding the offer row as shown by 1554 in the user interface.

Figure 15F:
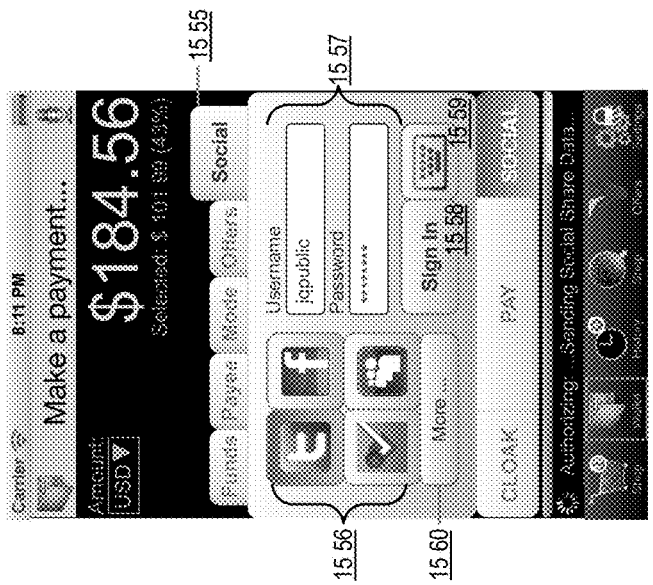

With reference to FIG. 15F, in one embodiment, the social tab 1555 may facilitate integration of the wallet application with social channels 1556. In one implementation, a user may select one or more social channels 1556 and may sign in to the selected social channel from the wallet application by providing to the wallet application the social channel user name and password 1557 and signing in 1558. The user may then use the social button 1559 to send or receive money through the integrated social channels. In a further implementation, the user may send social share data such as purchase information or links through integrated social channels. In another embodiment, the user supplied login credentials may allow EAE to engage in interception parsing.

Figure 16:
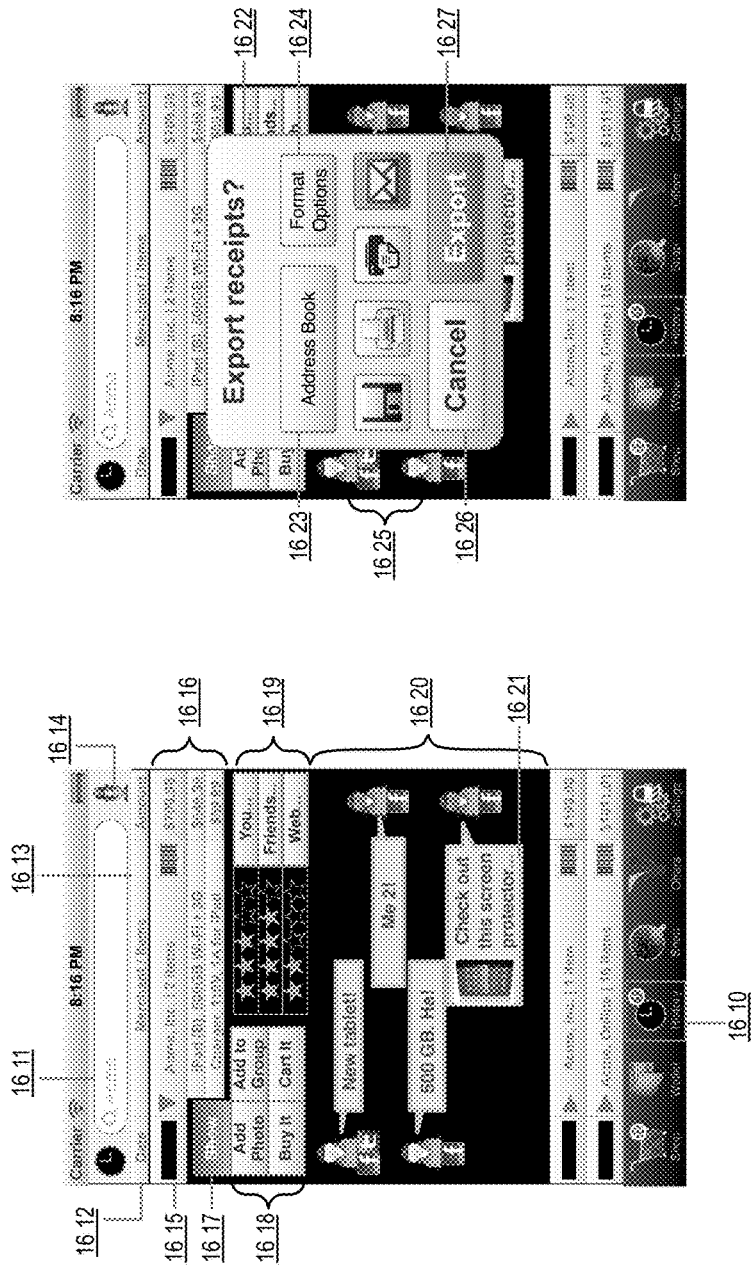
FIG. 16 shows a user interface diagram illustrating example features of virtual wallet applications, in a history mode, in one embodiment of the EAE.

FIG. 16 shows a user interface diagram illustrating example features of virtual wallet applications, in a history mode, in some embodiments of the EAE. In one embodiment, a user may select the history mode 1610 to view a history of prior purchases and perform various actions on those prior purchases. For example, a user may enter a merchant identifying information such as name, product, MCC, and/or the like in the search bar 1611. In another implementation, the user may use voice activated search feature by clicking on the microphone icon 1614. The wallet application may query the storage areas in the mobile device or elsewhere (e.g., one or more databases and/or tables remote from the mobile device) for transactions matching the search keywords. The user interface may then display the results of the query such as transaction 1615. The user interface may also identify the date 1612 of the transaction, the merchants and items 1613 relating to the transaction, a barcode of the receipt confirming that a transaction was made, the amount of the transaction and any other relevant information.

In one implementation, the user may select a transaction, for example transaction 1615, to view the details of the transaction. For example, the user may view the details of the items associated with the transaction and the amounts 1616 of each item. In a further implementation, the user may select the show option 1617 to view actions 1618 that the user may take in regards to the transaction or the items in the transaction. For example, the user may add a photo to the transaction (e.g., a picture of the user and the iPad the user bought). In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 1619 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area 1620 shows FACEBOOK message exchanges between two users. In one implementation, a user may share a link via a message 1621. Selection of such a message having embedded link to a product may allow the user to view a description of the product and/or purchase the product directly from the history mode.

In one embodiment, the history mode may also include facilities for exporting receipts. The export receipts pop up 1622 may provide a number of options for exporting the receipts of transactions in the history. For example, a user may use one or more of the options 1625, which include save (to local mobile memory, to server, to a cloud account, and/or the like), print to a printer, fax, email, and/or the like. The user may utilize his or her address book 1623 to look up email or fax number for exporting. The user may also specify format options 1624 for exporting receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button 1627 to initiate export of receipts.

Figure 17A:
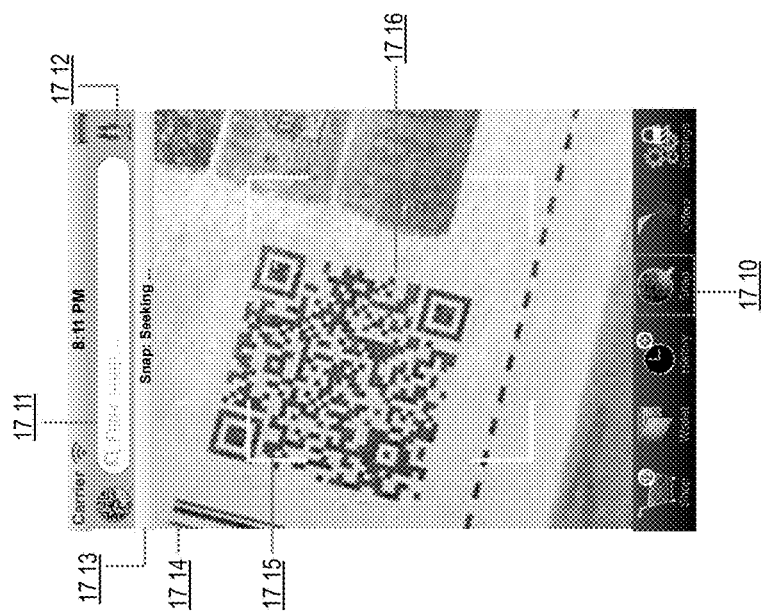
FIGS. 17A-E show user interface diagrams illustrating example features of virtual wallet applications in a snap mode, in one embodiment of the EAE.

FIGS. 17A-E show user interface diagrams illustrating example features of virtual wallet applications in a snap mode, in some embodiments of the EAE. With reference to FIG. 17A, in one embodiment, a user may select the snap mode 2110 to access its snap features. The snap mode may handle any machine-readable representation of data. Examples of such data may include linear and 2D bar codes such as UPC code and QR codes. These codes may be found on receipts, product packaging, and/or the like. The snap mode may also process and handle pictures of receipts, products, offers, credit cards or other payment devices, and/or the like. An example user interface in snap mode is shown in FIG. 17A. A user may use his or her mobile phone to take a picture of a QR code 1715 and/or a barcode 1714. In one implementation, the bar 1713 and snap frame 1715 may assist the user in snapping codes properly. For example, the snap frame 1715, as shown, does not capture the entirety of the code 1716. As such, the code captured in this view may not be resolvable as information in the code may be incomplete. This is indicated by the message on the bar 1713 that indicates that the snap mode is still seeking the code. When the code 1716 is completely framed by the snap frame 1715, the bar message may be updated to, for example, "snap found." Upon finding the code, in one implementation, the user may initiate code capture using the mobile device camera. In another implementation, the snap mode may automatically snap the code using the mobile device camera.

Figure 17B:

With reference to FIG. 17B, in one embodiment, the snap mode may facilitate payment reallocation post transaction. For example, a user may buy grocery and prescription items from a retailer Acme Supermarket. The user may, inadvertently or for ease of checkout for example, use his or her Visa card to pay for both grocery and prescription items. However, the user may have an FSA account that could be used to pay for prescription items, and which would provide the user tax benefits. In such a situation, the user may use the snap mode to initiate transaction reallocation.

As shown, the user may enter a search term (e.g., bills) in the search bar 2121. The user may then identify in the tab 1722 the receipt 1723 the user wants to reallocate. Alternatively, the user may directly snap a picture of a barcode on a receipt, and the snap mode may generate and display a receipt 1723 using information from the barcode. The user may now reallocate 1725. In some implementations, the user may also dispute the transaction 1724 or archive the receipt 1726.

In one implementation, when the reallocate button 1725 is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt 1727 may be generated after the completion of the reallocation process. As discussed, the receipt shows that some charges have been moved from the Visa account to the FSA.

Figure 17C:
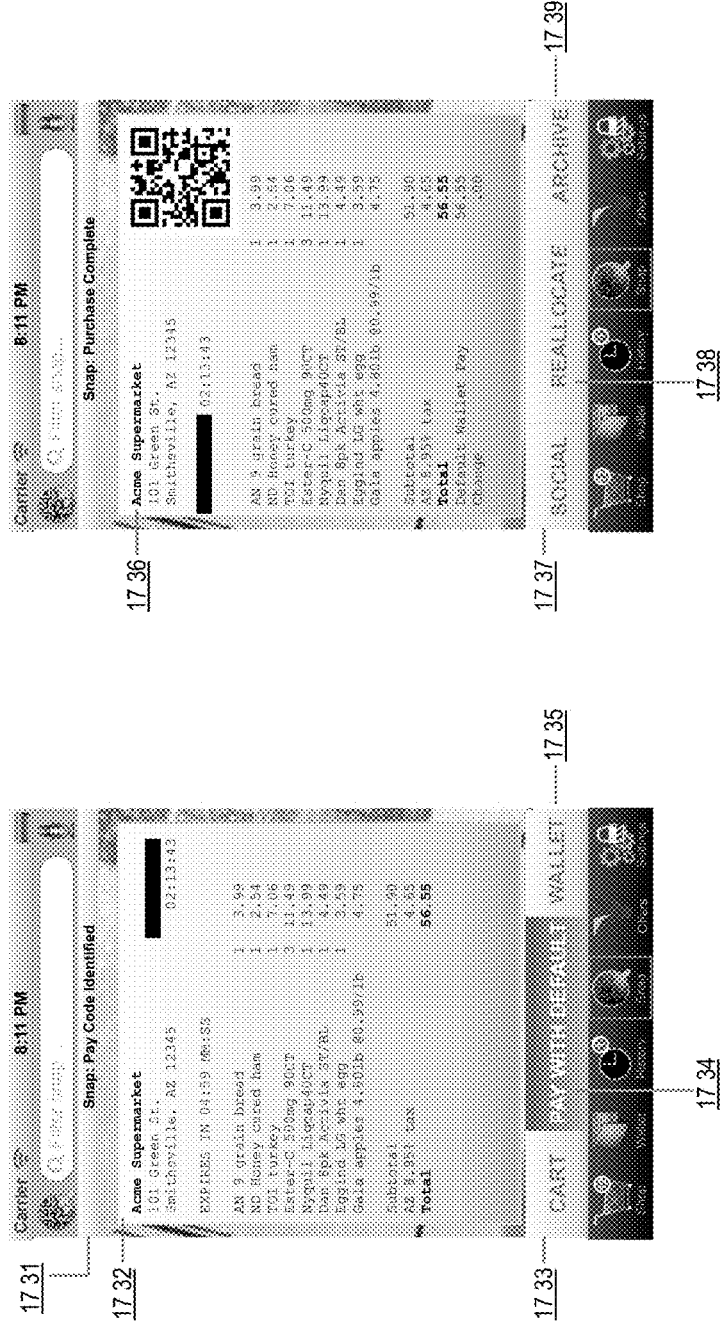

With reference to FIG. 17C, in one embodiment, the snap mode may facilitate payment via pay code such as barcodes or QR codes. For example, a user may snap a QR code of a transaction that is not yet complete. The QR code may be displayed at a merchant POS terminal, a web site, or a web application and may be encoded with information identifying items for purchase, merchant details and other relevant information. When the user snaps such as a QR code, the snap mode may decode the information in the QR code and may use the decoded information to generate a receipt 1732. Once the QR code is identified, the navigation bar 1731 may indicate that the pay code is identified. The user may now have an option to add to cart 1733, pay with a default payment account 1734 or pay with wallet 1735.

In one implementation, the user may decide to pay with default 1734. The wallet application may then use the user's default method of payment, in this example the wallet, to complete the purchase transaction. Upon completion of the transaction, a receipt may be automatically generated for proof of purchase. The user interface may also be updated to provide other options for handling a completed transaction. Example options include social 1737 to share purchase information with others, reallocate 1738 as discussed with regard to FIG. 17B, and archive 1739 to store the receipt.

Figure 17D:
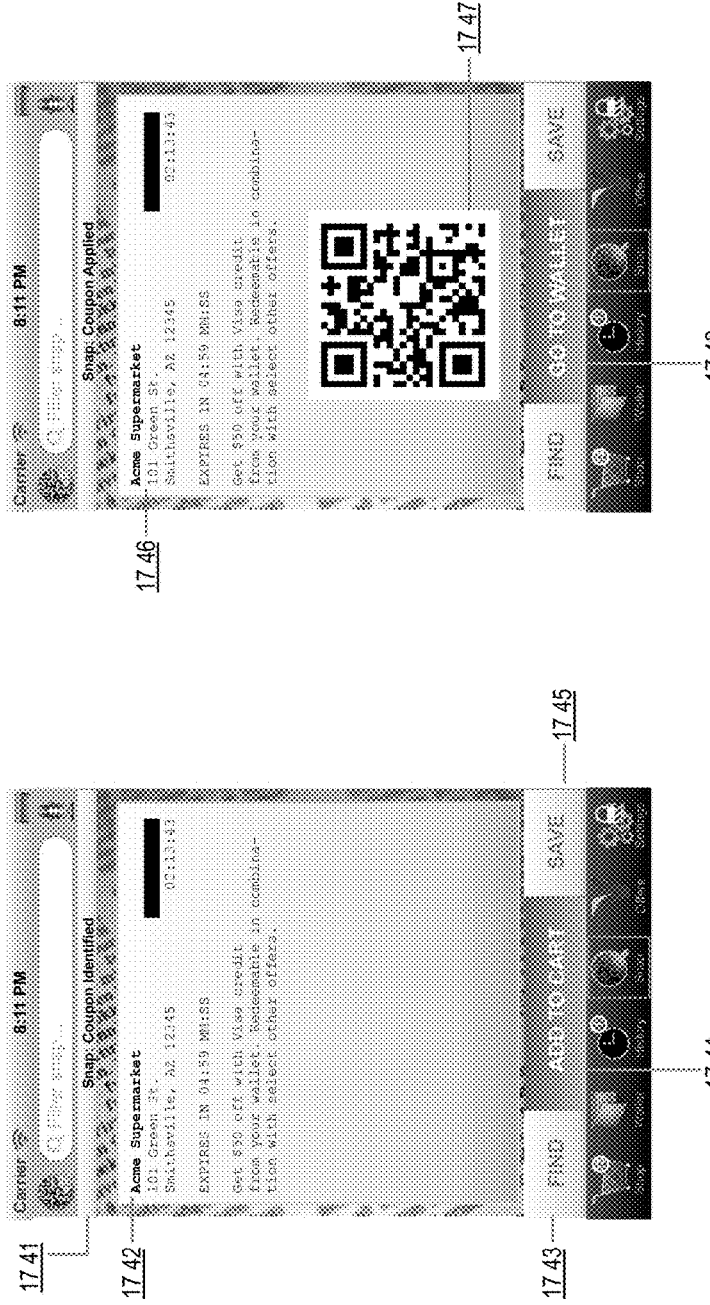

With reference to FIG. 17D, in one embodiment, the snap mode may also facilitate offer identification, application and storage for future use. For example, in one implementation, a user may snap an offer code 1741 (e.g., a bar code, a QR code, and/or the like). The wallet application may then generate an offer text 1742 from the information encoded in the offer code. The user may perform a number of actions on the offer code. For example, the user use the find button 1743 to find all merchants who accept the offer code, merchants in the proximity who accept the offer code, products from merchants that qualify for the offer code, and/or the like. The user may also apply the offer code to items that are currently in the cart using the add to cart button 1744. Furthermore, the user may also save the offer for future use by selecting the save button 1745.

In one implementation, after the offer or coupon 1746 is applied, the user may have the option to find qualifying merchants and/or products using find, the user may go to the wallet using 1748, and the user may also save the offer or coupon 1746 for later use.

Figure 17E:
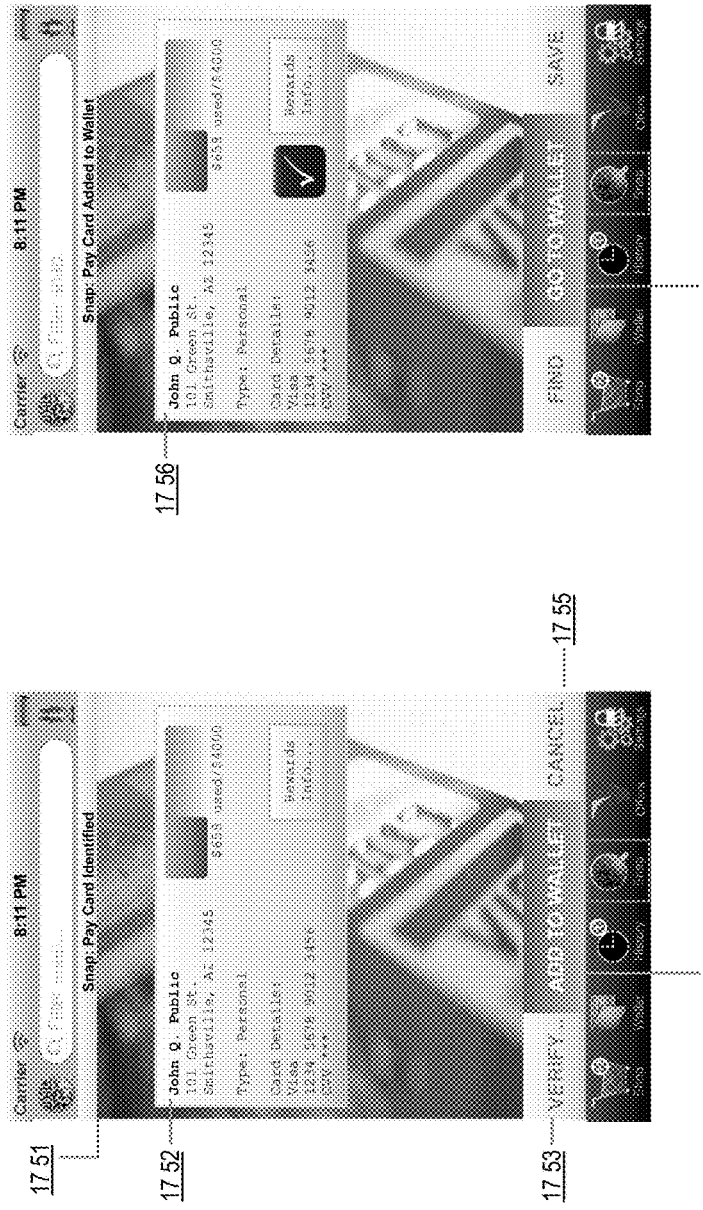

With reference to FIG. 17E, in one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card 1751 and may display the textual information 1752 encoded in the pay card. The user may then perform verification of the information 1752 by selecting the verify button 1753. In one implementation, the verification may include contacting the issuer of the pay card for confirmation of the decoded information 1752 and any other relevant information. In one implementation, the user may add the pay card to the wallet by selecting the 'add to wallet' button 1754. The instruction to add the pay card to the wallet may cause the pay card to appear as one of the forms of payment under the funds tab 1516 discussed in FIG. 15A. The user may also cancel importing of the pay card as a funding source by selecting the cancel button 1755. When the pay card has been added to the wallet, the user interface may be updated to indicate that the importing is complete via the notification display 1756. The user may then access the wallet 1757 to begin using the added pay card as a funding source.

Figure 18:
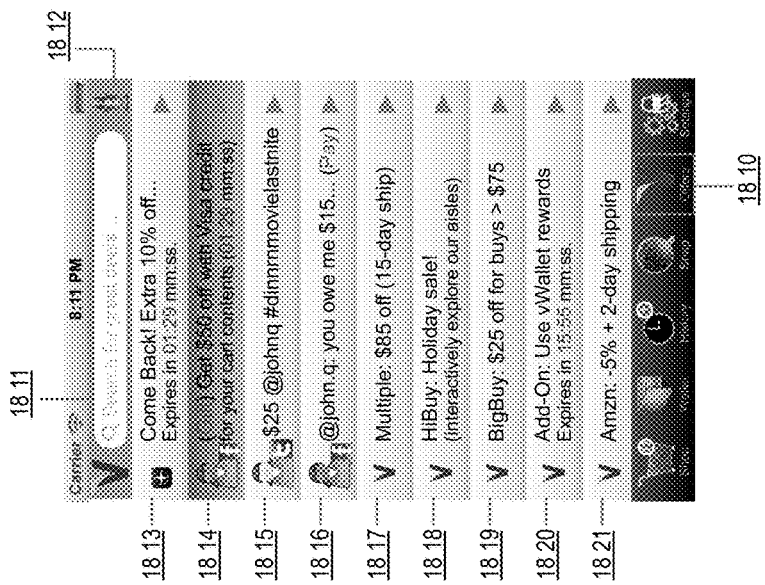
FIG. 18 shows a user interface diagram illustrating example features of virtual wallet applications, in an offers mode, in one embodiment of the EAE.

FIG. 18 shows a user interface diagram illustrating example features of virtual wallet applications, in an offers mode, in some embodiments of the EAE. In some implementations, the EAE may allow a user to search for offers for products and/or services from within the virtual wallet mobile application. For example, the user may enter text into a graphical user interface ("GUI") element 1811, or issue voice commands by activating GUI element 1812 and speaking commands into the device. In some implementations, the EAE may provide offers based on the user's prior behavior, demographics, current location, current cart selection or purchase items, and/or the like. For example, if a user is in a brick-and-mortar store, or an online shopping website, and leaves the (virtual) store, then the merchant associated with the store may desire to provide a sweetener deal to entice the consumer back into the (virtual) store. The merchant may provide such an offer 1813. For example, the offer may provide a discount, and may include an expiry time. In some implementations, other users may provide gifts (e.g., 1814) to the user, which the user may redeem. In some implementations, the offers section may include alerts as to payment of funds outstanding to other users (e.g., 1815). In some implementations, the offers section may include alerts as to requesting receipt of funds from other users (e.g., 1816). For example, such a feature may identify funds receivable from other applications (e.g., mail, calendar, tasks, notes, reminder programs, alarm, etc.), or by a manual entry by the user into the virtual wallet application. In some implementations, the offers section may provide offers from participating merchants in the EAE, e.g., 1817-1819, 1820.

These offers may sometimes be assembled using a combination of participating merchants, e.g., 1817. In some implementations, the EAE itself may provide offers for users contingent on the user utilizing particular payment forms from within the virtual wallet application, e.g., 1820.

Figure 19A:
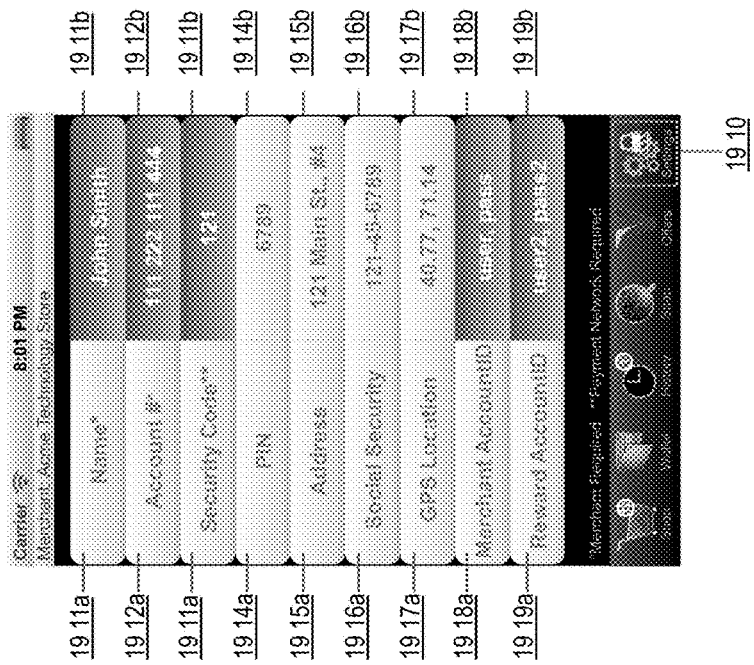
FIGS. 19A-B show user interface diagrams illustrating example features of virtual wallet applications, in a security and privacy mode, in one embodiment of the EAE.
Figure 19B:
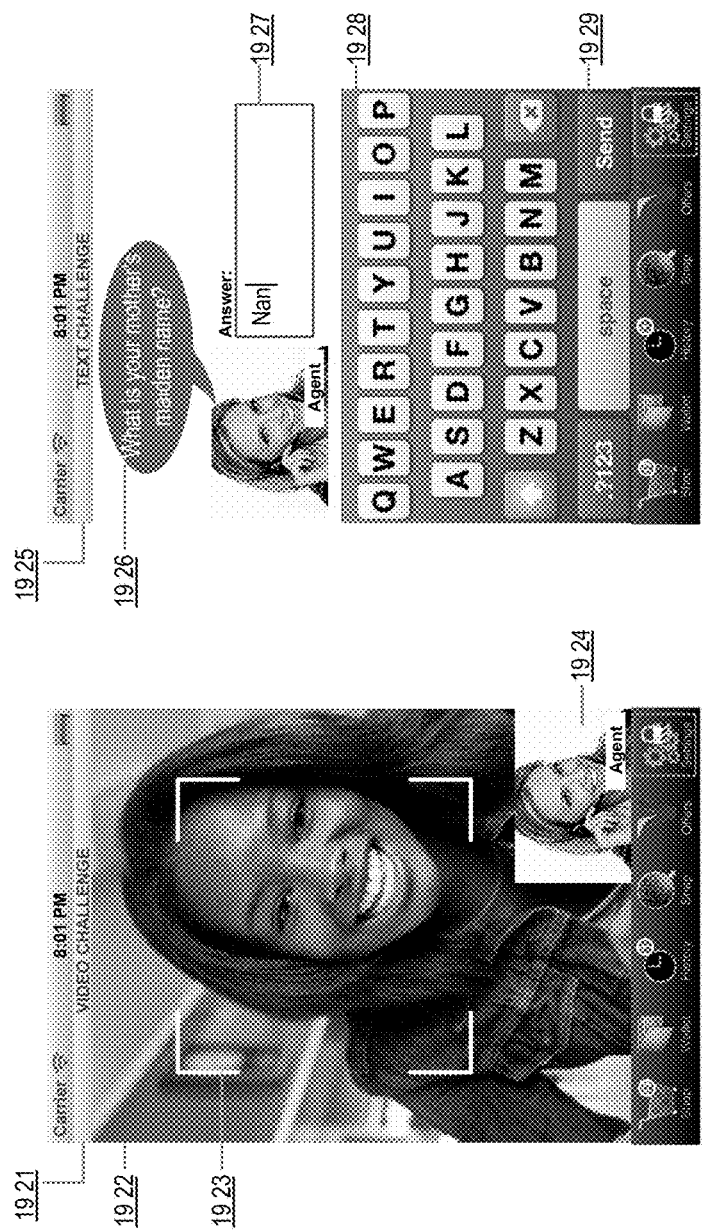

FIGS. 19A-B show user interface diagrams illustrating example features of virtual wallet applications, in a security and privacy mode, in some embodiments of the EAE. With reference to FIG. 19A, in some implementations, the user may be able to view and/or modify the user profile and/or settings of the user, e.g., by activating a user interface element. For example, the user may be able to view/modify a user name (e.g., 1911*a-b*), account number (e.g., 1912*a-b*), user security access code (e.g., 1913*-b*), user pin (e.g., 1914*-b*), user address (e.g., 1915*-b*), social security number associated with the user (e.g., 1916*-b*), current device GPS location (e.g., 1917*-b*), user account of the merchant in whose store the user currently is (e.g., 1918*-b*), the user's rewards accounts (e.g., 1919*-b*), and/or the like. In some implementations, the user may be able to select which of the data fields and their associated values should be transmitted to facilitate the purchase transaction, thus providing enhanced data security for the user. For example, in the example illustration in FIG. 19A, the user has selected the name 1911*a*, account number 1912*a*, security code 1913*a*, merchant account ID 1918*a* and rewards account ID 1919*a* as the fields to be sent as part of the notification to process the purchase transaction. In some implementations, the user may toggle the fields and/or data values that are sent as part of the notification to process the purchase transactions. In some implementations, the app may provide multiple screens of data fields and/or associated values stored for the user to select as part of the purchase order transmission. In some implementations, the app may provide the EAE with the GPS location of the user. Based on the GPS location of the user, the EAE may determine the context of the user (e.g., whether the user is in a store, doctor's office, hospital, postal service office, etc.). Based on the context, the user app may present the appropriate fields to the user, from which the user may select fields and/or field values to send as part of the purchase order transmission.

For example, a user may go to doctor's office and desire to pay the co-pay for doctor's appointment. In addition to basic transactional information such as account number and name, the app may provide the user the ability to select to transfer medical records, health information, which may be provided to the medical provider, insurance company, as well as the transaction processor to reconcile payments between the parties. In some implementations, the records may be sent in a Health Insurance Portability and Accountability Act (HIPAA)-compliant data format and encrypted, and only the recipients who are authorized to view such records may have appropriate decryption keys to decrypt and view the private user information.

With reference to FIG. 19B, in some implementations, the app executing on the user's device may provide a "VerifyChat" feature for fraud prevention. For example, the EAE may detect an unusual and/or suspicious transaction. The EAE may utilize the VerifyChat feature to communicate with the user, and verify the authenticity of the originator of the purchase transaction. In various implementations, the EAE may send electronic mail message, text (SMS) messages, Facebook® messages, Twitter™ tweets, text chat, voice chat, video chat (e.g., Apple FaceTime), and/or the like to communicate with the user. For example, the EAE may initiate a video challenge for the user, e.g., 1921. For example, the user may need to present him/her-self via a video chat, e.g., 1922. In some implementations, a customer service representative, e.g., agent 1924, may manually determine the authenticity of the user using the video of the user. In some implementations, the EAE may utilize face, biometric and/or like recognition (e.g., using pattern classification techniques) to determine the identity of the user. In some implementations, the app may provide reference marker (e.g., cross-hairs, target box, etc.), e.g., 1923, so that the user may the video to facilitate the EAE's automated recognition of the user. In some implementations, the user may not have initiated the transaction, e.g., the transaction is fraudulent. In such implementations, the user may cancel the challenge. The EAE may then cancel the transaction, and/or initiate fraud investigation procedures on behalf of the user.

In some implementations, the EAE may utilize a text challenge procedure to verify the authenticity of the user, e.g., 1925. For example, the EAE may communicate with the user via text chat, SMS messages, electronic mail, Facebook® messages, Twitter™ tweets, and/or the like. The EAE may pose a challenge question, e.g., 1926, for the user. The app may provide a user input interface element(s) (e.g., virtual keyboard 1928) to answer the challenge question posed by the EAE. In some implementations, the challenge question may be randomly selected by the EAE automatically; in some implementations, a customer service representative may manually communicate with the user. In some implementations, the user may not have initiated the transaction, e.g., the transaction is fraudulent. In such implementations, the user may cancel the text challenge. The EAE may cancel the transaction, and/or initiate fraud investigation on behalf of the user.

Figure 20:
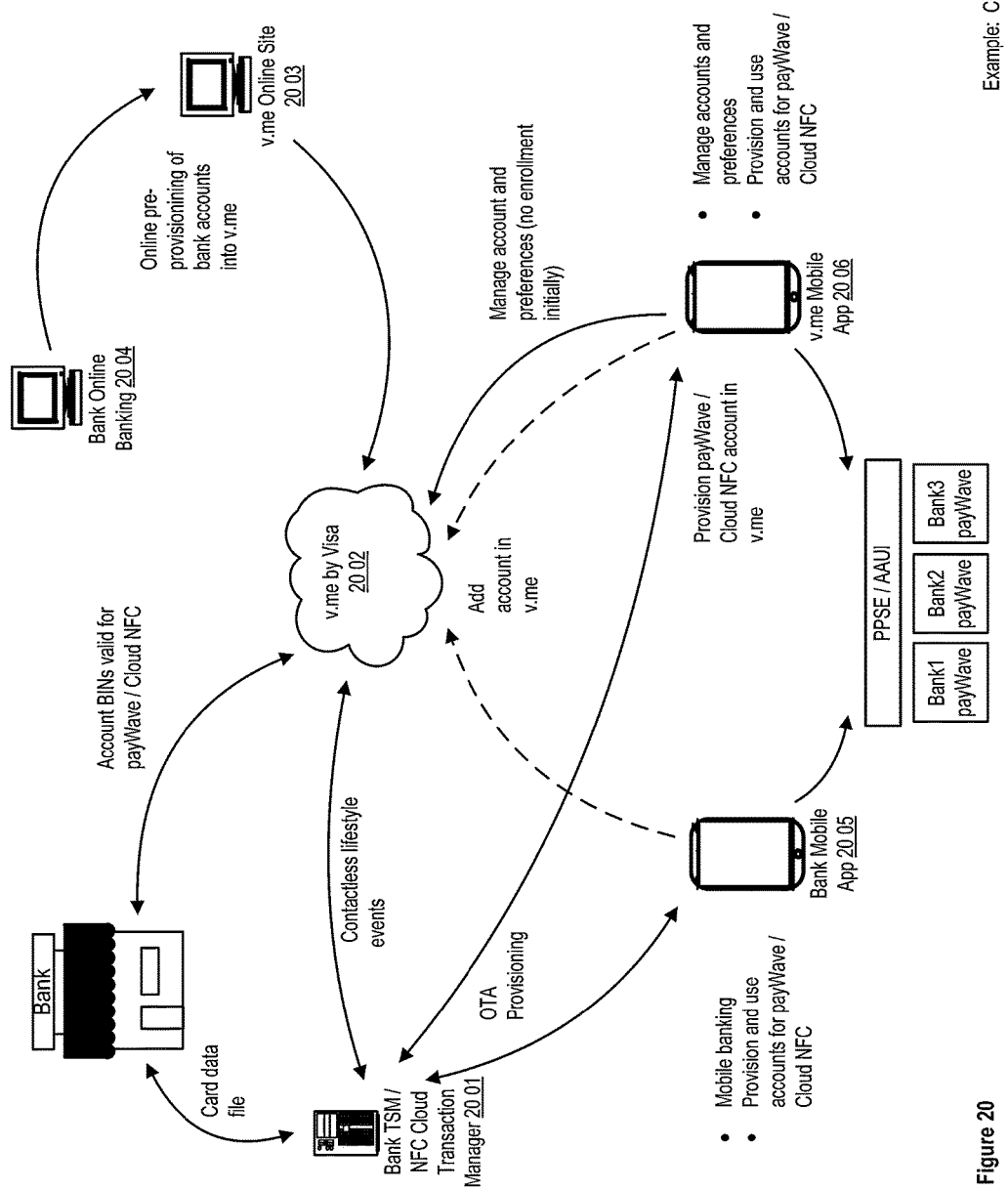
FIG. 20 shows an example block diagram illustrating aspects of Cloud NFC, in one embodiment of the EAE.

FIG. 20 shows an example block diagram illustrating aspects of Cloud NFC, in one embodiment of the EAE. In one embodiment, a bank TSM or NFC cloud transaction manager, 2001, may communicate a card data file to a bank, contactless lifestyle events to a virtual wallet provider, 2002, and/or the like. In some embodiments, online banking services, e.g. 2004, may pre-provision bank accounts into a virtual wallet utilizing services provided by a virtual wallet online site, 2003. In still other embodiments, a mobile application installed on a mobile device, 2005, may provide mobile banking and provisioning use accounts in connection with the EAE. In other embodiments, a virtual wallet application, 2006, may be utilized to manage accounts and preferences and/or provision accounts in connection with the EAE on behalf of one or more bank or issuing institutions.

Figure 21:
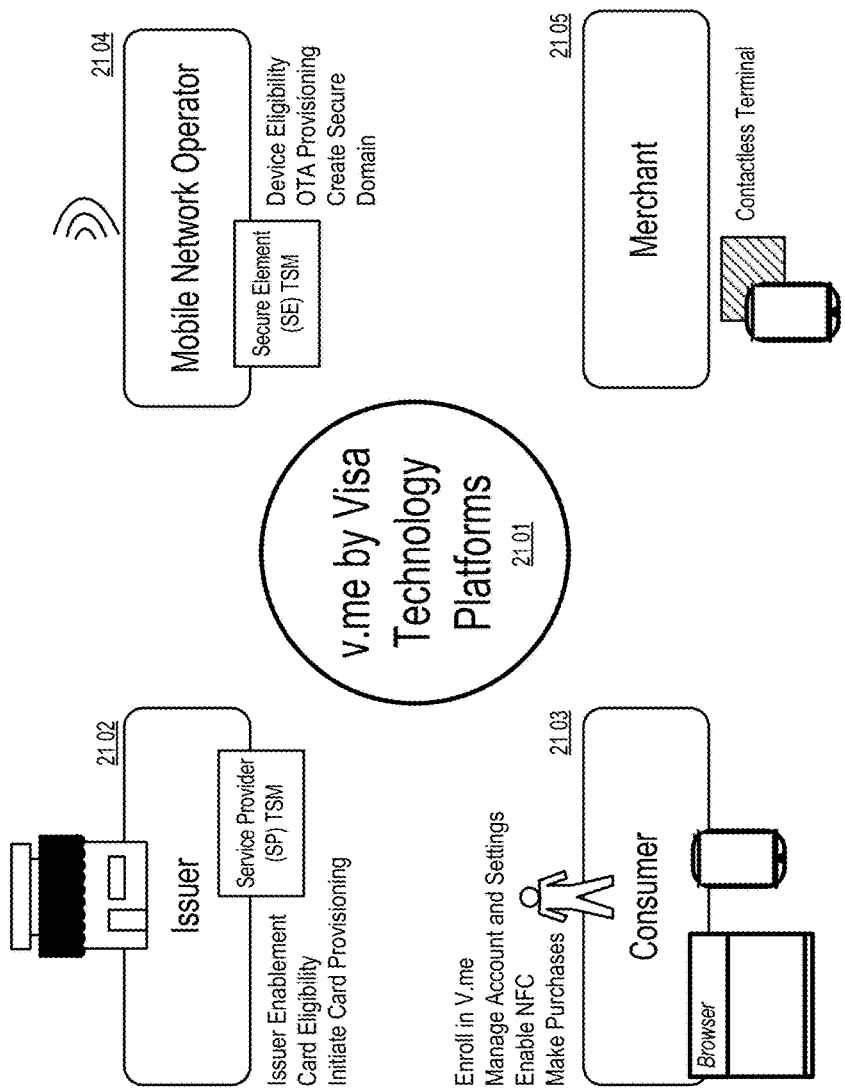
FIG. 21 shows an example block diagram illustrating aspects of a Cloud NFC ecosystem, in one embodiment of the EAE.

FIG. 21 shows an example block diagram illustrating aspects of a Cloud NFC ecosystem, in one embodiment of the EAE. In some embodiments, a technology ecosystem may be provided by a virtual wallet provider, e.g., 2101. For example, issuer services, e.g. 2102, may include issuer enablement, card eligibility determinations, and card provisioning, in connection with a service provider. In other embodiments, a consumer operating with a mobile device or via a client browser connection, e.g., 2103, may enroll in a virtual wallet, manage an account and settings, enable near field communication and/or cloud functionality of the EAE, make purchases, and/or the like. In still other embodiments, a mobile network operator, 2104, may determine device eligibility, perform over the air provisioning, and/or create secure domains. In still other embodiments, a merchant 2105 may utilize a contactless terminal to engage devices and/or services within the ecosystem.

FIG. 22 shows example user interfaces for Cloud NFC enrollment, in one embodiment of the EAE. In one embodiment, a user may create a virtual wallet account, e.g. 2201, by providing account information and answering or providing security questions. Upon creation of the virtual wallet account, a payment method may be added to the account, e.g. 2202.

FIG. 23 shows example user interfaces for combined login and enrollment with activity feeds, in one embodiment of the EAE. In one embodiment, a user may log into their virtual wallet using their mobile device, 2301, and view an empty activity feed, 2302, which may be present before the user has engaged in any activity. After the user has perform transactions and/or activity within their virtual wallet, in communication with the EAE, an activity feed may be presented, 2303.

Figure 24:
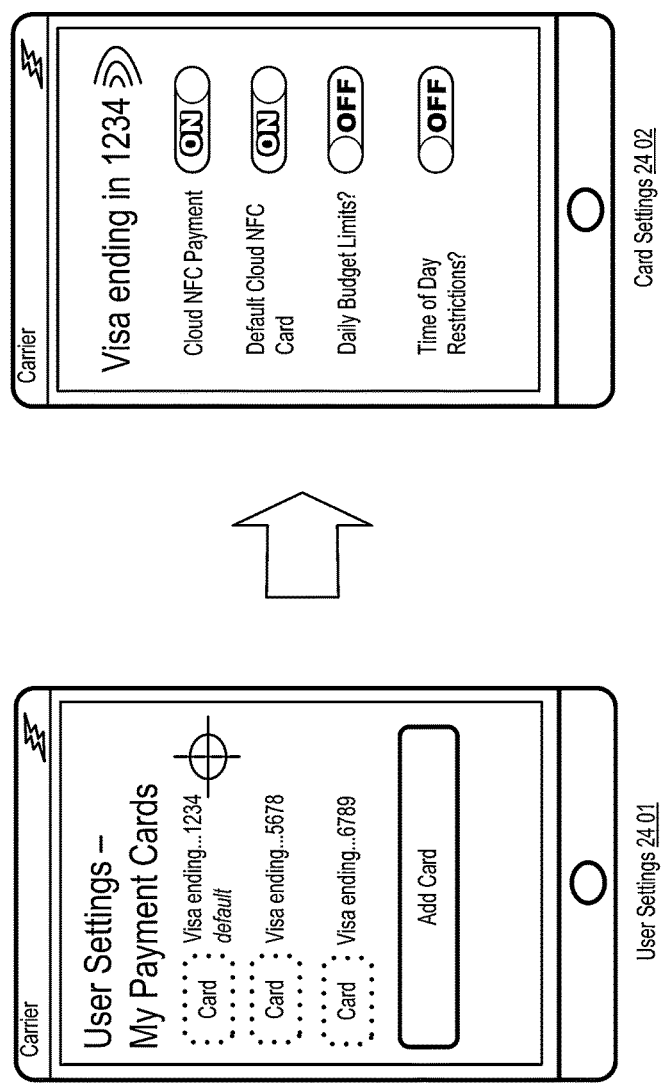
FIG. 24 shows example user interfaces for Cloud NFC payment configuration and pre-provisioning, in one embodiment of the EAE.

FIG. 24 shows example user interfaces for Cloud NFC payment configuration and pre-provisioning, in one embodiment of the EAE. In one embodiment, the user may manage settings associated with payment cards loaded into their virtual wallet, 2401. Card settings, 2402, may include the availability of an account for NFC payments, whether an account is a default payment, daily budgetary limitations, and/or time of day restrictions, and/or the like.

Figure 25A:
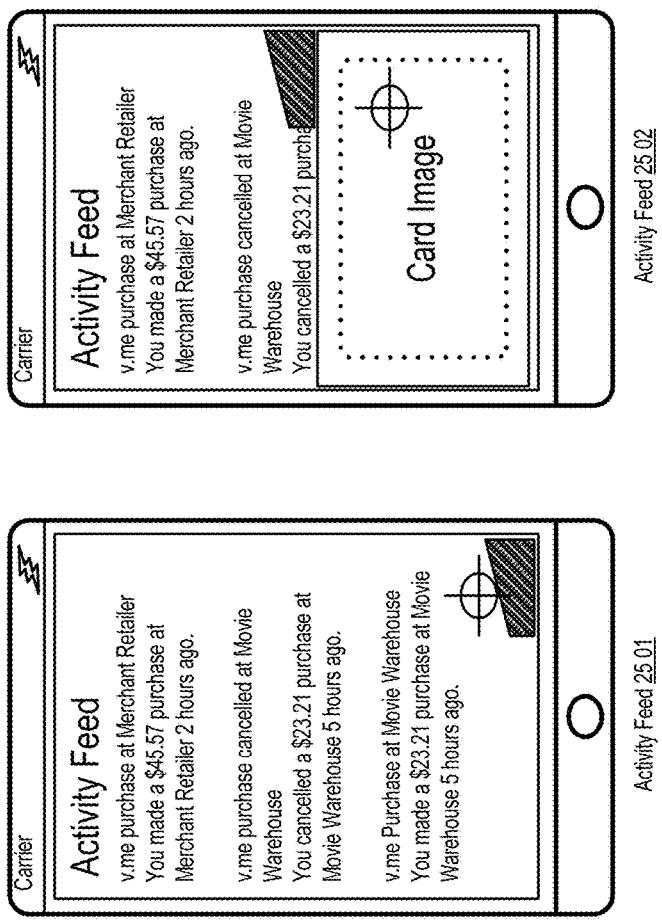
FIGS. 25A-B show example user interfaces for Cloud NFC payment at a merchant point of sale terminal, in one embodiment of the EAE.
Figure 25B:
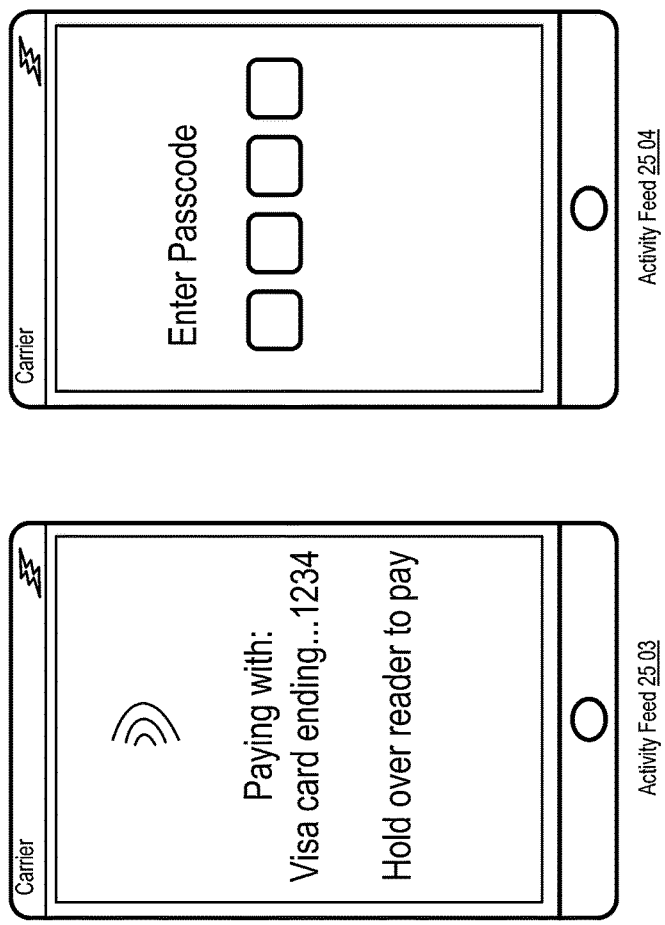

FIGS. 25A-B show example user interfaces for Cloud NFC payment at a merchant point of sale terminal, in one embodiment of the EAE. In one embodiment, a user viewing activity feed 2501 may swipe up to view an image of a payment account card, 2502, with which to initiate a payment. Upon selecting the card displayed, a payment may be initiated, 2503, and or a user may be requested to enter a passcode to initiate or confirm the payment 2504.

Figure 26:
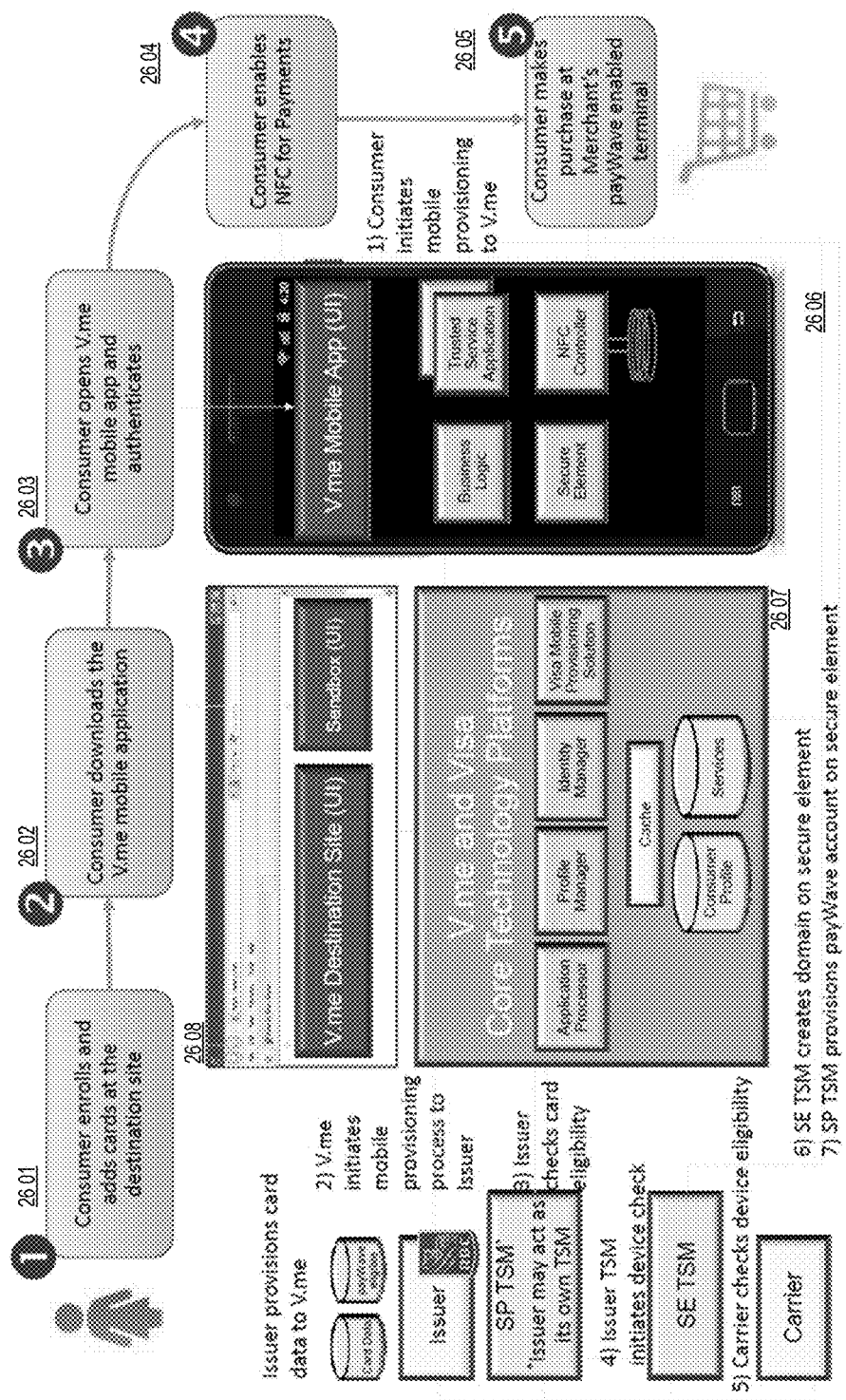
FIG. 26 shows a block diagram illustrating aspects of a Cloud NFC user ecosystem, in one embodiment of the EAE.
Figure 27A:
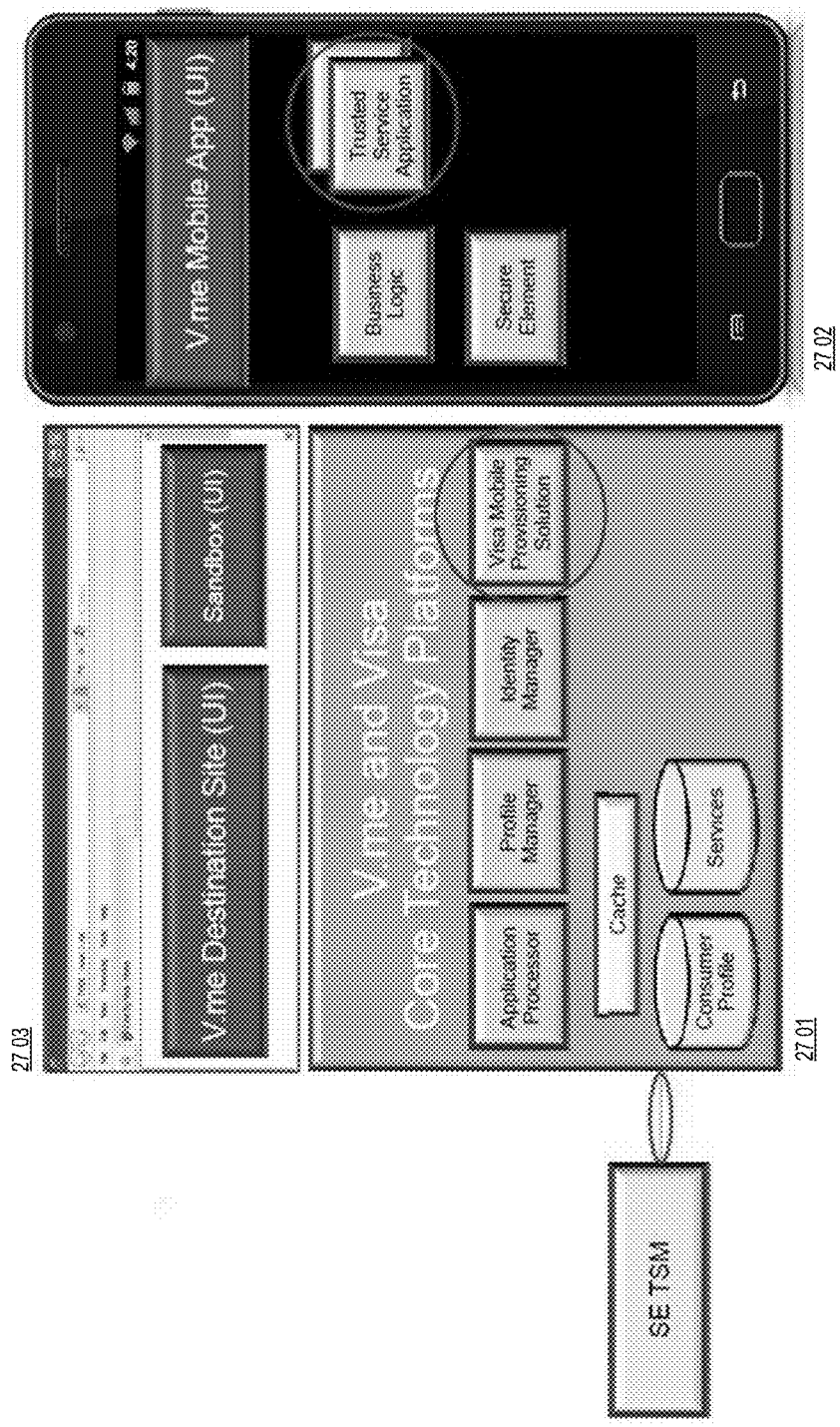
FIG. 27A-D show block diagrams illustrating aspects of a Cloud NFC core platform, in one embodiment of the EAE.
Figure 27B:
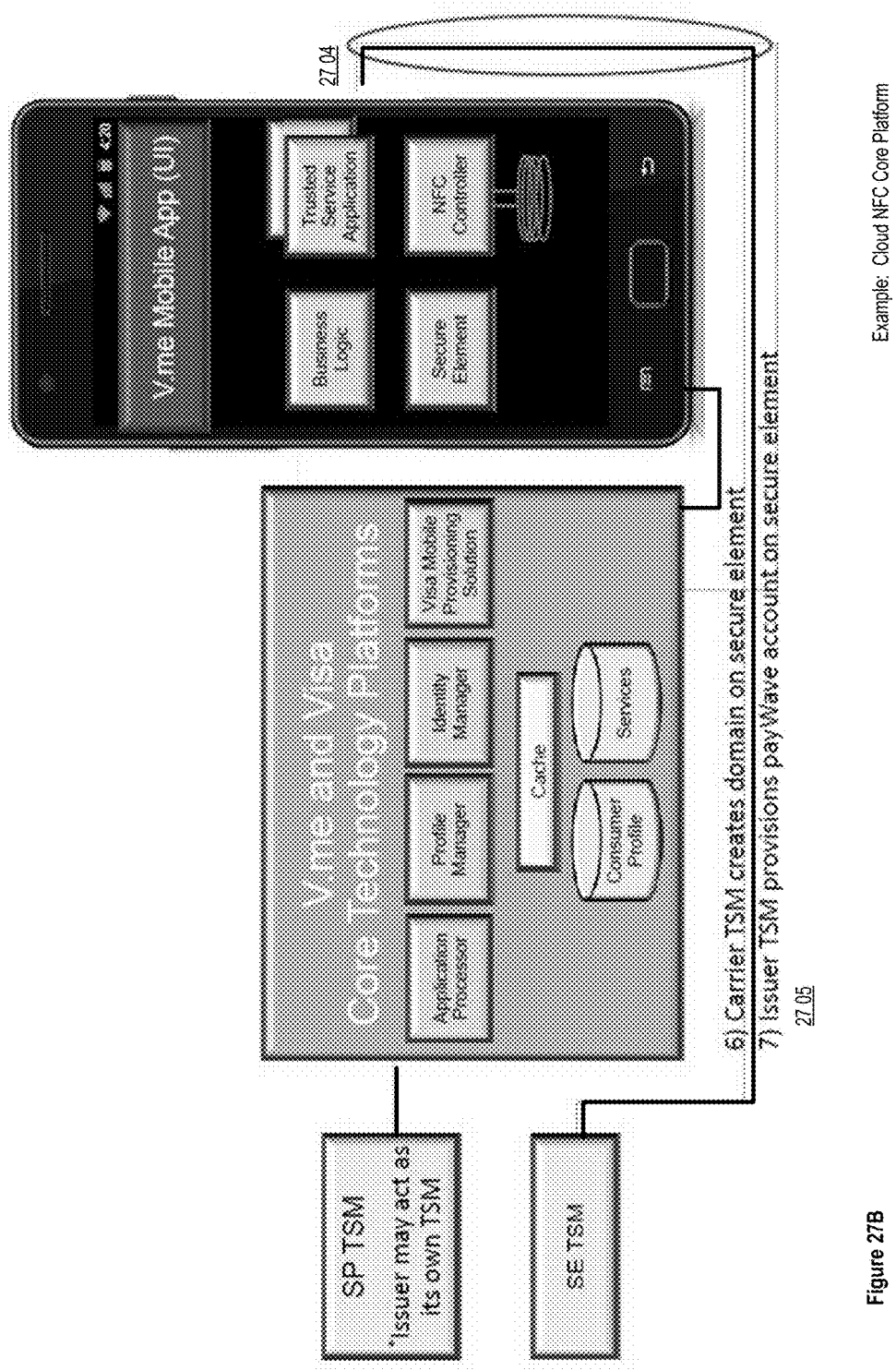
Figure 27C:
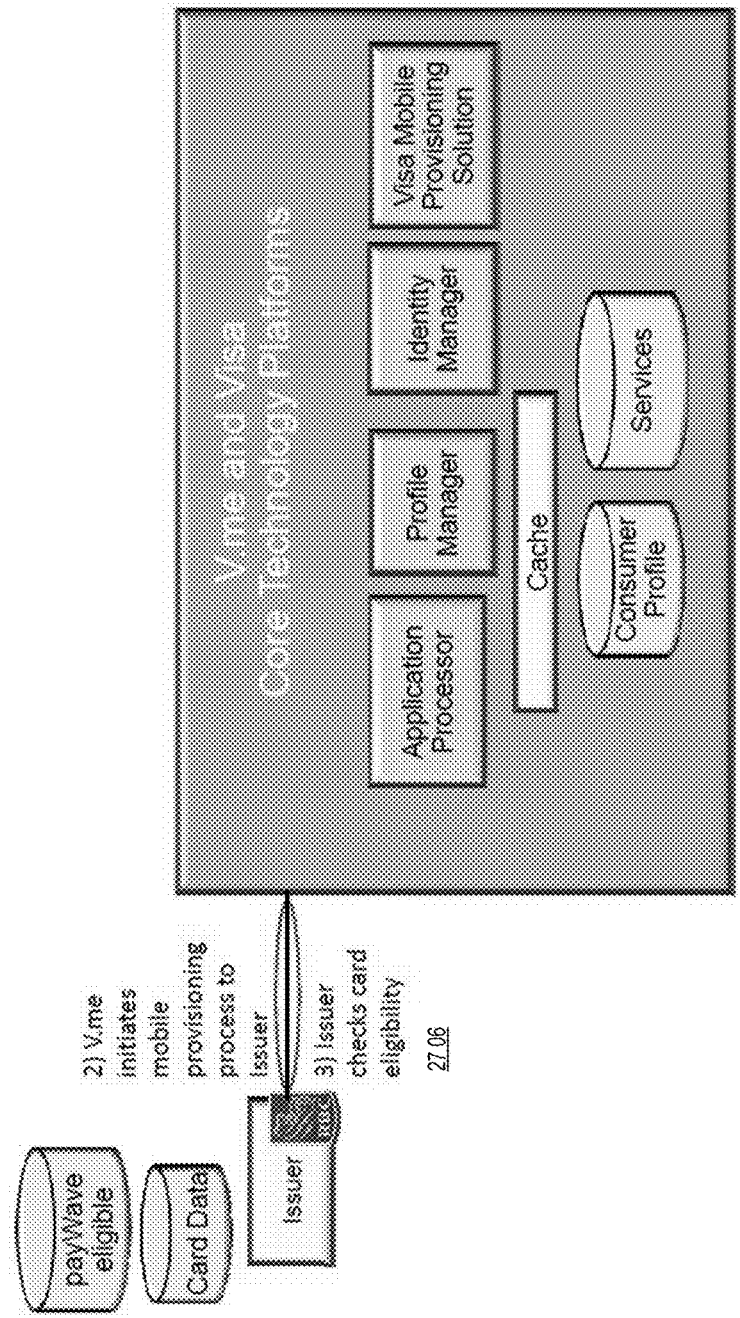
Figure 27D:
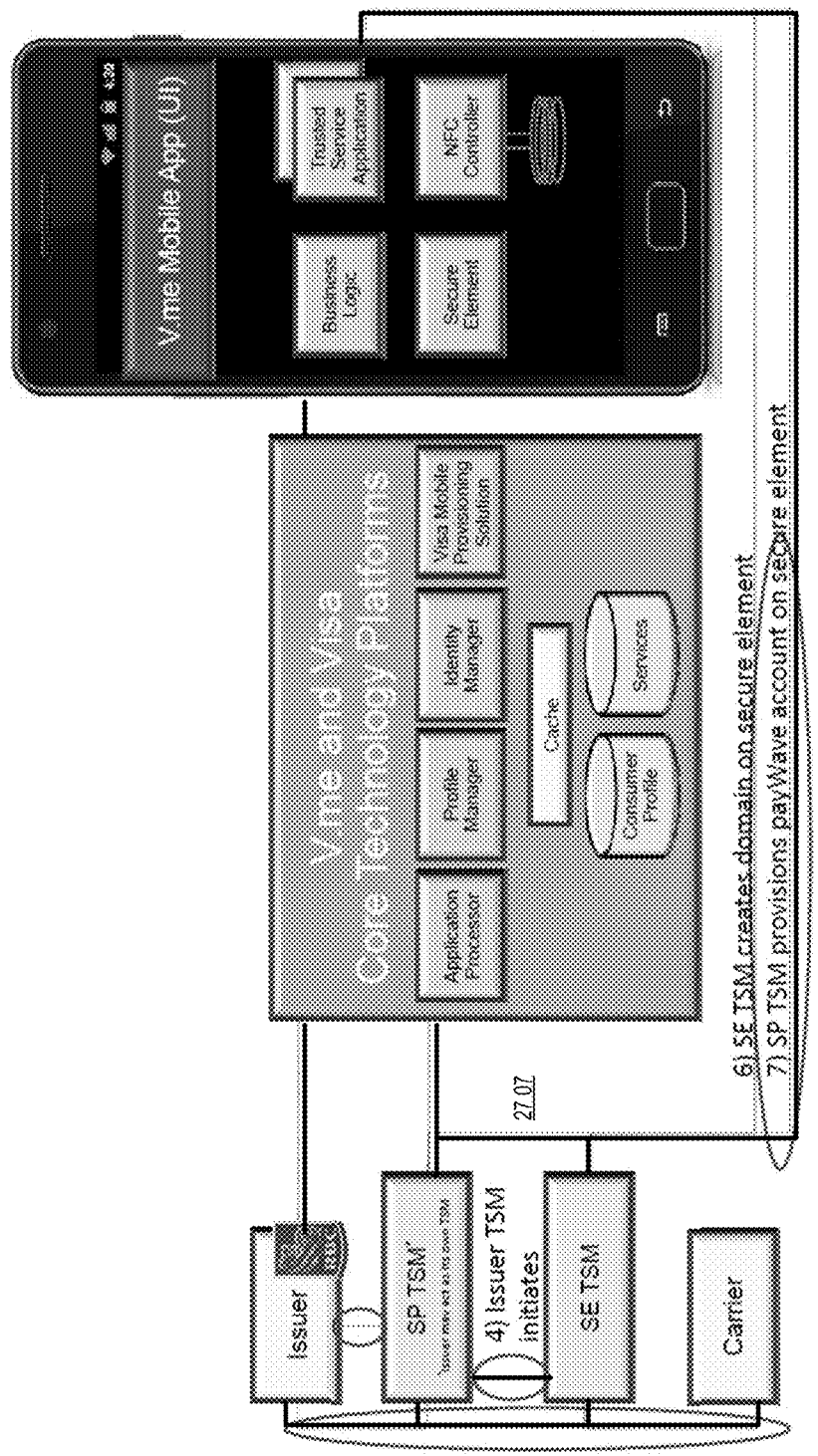

FIG. 26 shows a block diagram illustrating aspects of a Cloud NFC user ecosystem, in one embodiment of the EAE. In one embodiment, a consumer may enroll and add cards at a destination site 2601. The consumer may download a virtual wallet mobile application onto their mobile device 2602. The consumer may then launch the mobile application and authenticate their account with or on the device 2603. In some embodiments, the consumer may enable near field communication for payments 2604. The consumer may then make a purchase at a merchant's terminal configured to accept NFC payments 2605. An application loaded on the consumer's mobile device, 2606, may contain an NFC controller, a secure element, business logic, and a trusted service application. A virtual wallet core technology platform may contain, e.g. 2607, an application processor, a profile manager, an identity manager, a mobile provisioning solution, a cache, a consumer profile, related services, and/or the like. Such services may be used to provide, e.g. 2608, a destination site including a user interface, and/or a sandbox including a user interface.

FIG. 27A-D show block diagrams illustrating aspects of a Cloud NFC core platform, in one embodiment of the EAE. In some embodiments, a virtual wallet core technology platform, 2701, may contain a mobile provisioning solution that is in contact with a secure element TSM. A mobile application may use a trusted service application, 2702. A browser may be configured to utilize a mobile wallet destination site user interface and/or a sandbox user interface, 2703. In some embodiments, a mobile application 2704 may communicate directly with a secure element TSM, e.g. 2705. In other embodiments, a virtual wallet core technology platform may be in communication with an issuer containing card data and eligibility data sources to check the eligibility of a card and/or service for provisioning, 2706. In still other embodiments, an issuer TSM may initiate a secure element TSM 2707.

Figure 28:
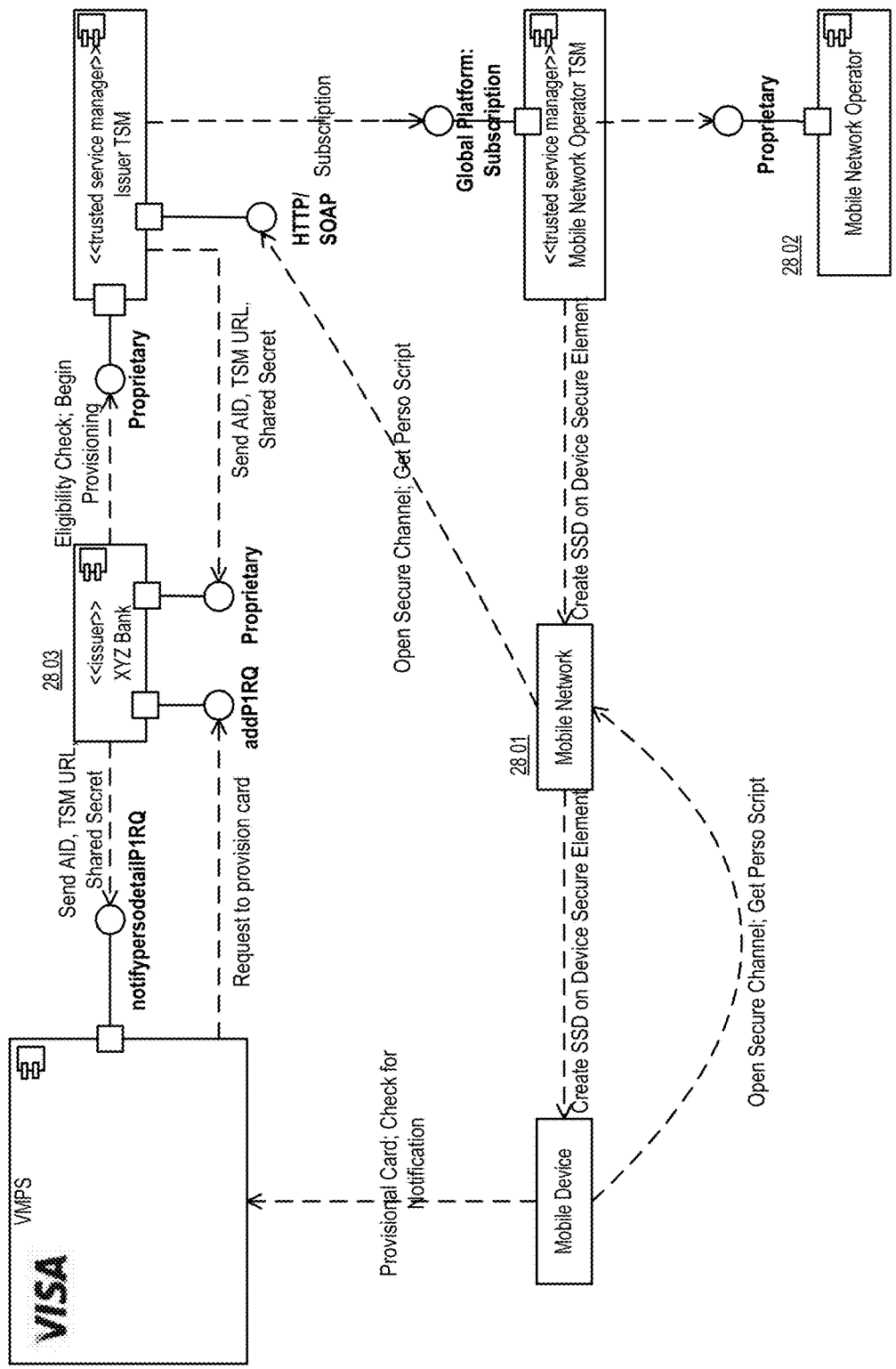
FIG. 28 shows a block diagram illustrating aspects of a Cloud NFC architecture, in one embodiment of the EAE.

FIG. 28 shows a block diagram illustrating aspects of a Cloud NFC architecture, in one embodiment of the EAE. In one implementation, a mobile network 2801 may be used to create an SSD on a device secure element. Similarly, a mobile network operator 2802 may be in communication with a trusted service manager. In some implementations, an issuer bank 2803 may assist in provisioning and/or communication with the trusted service manager.

Figure 29:
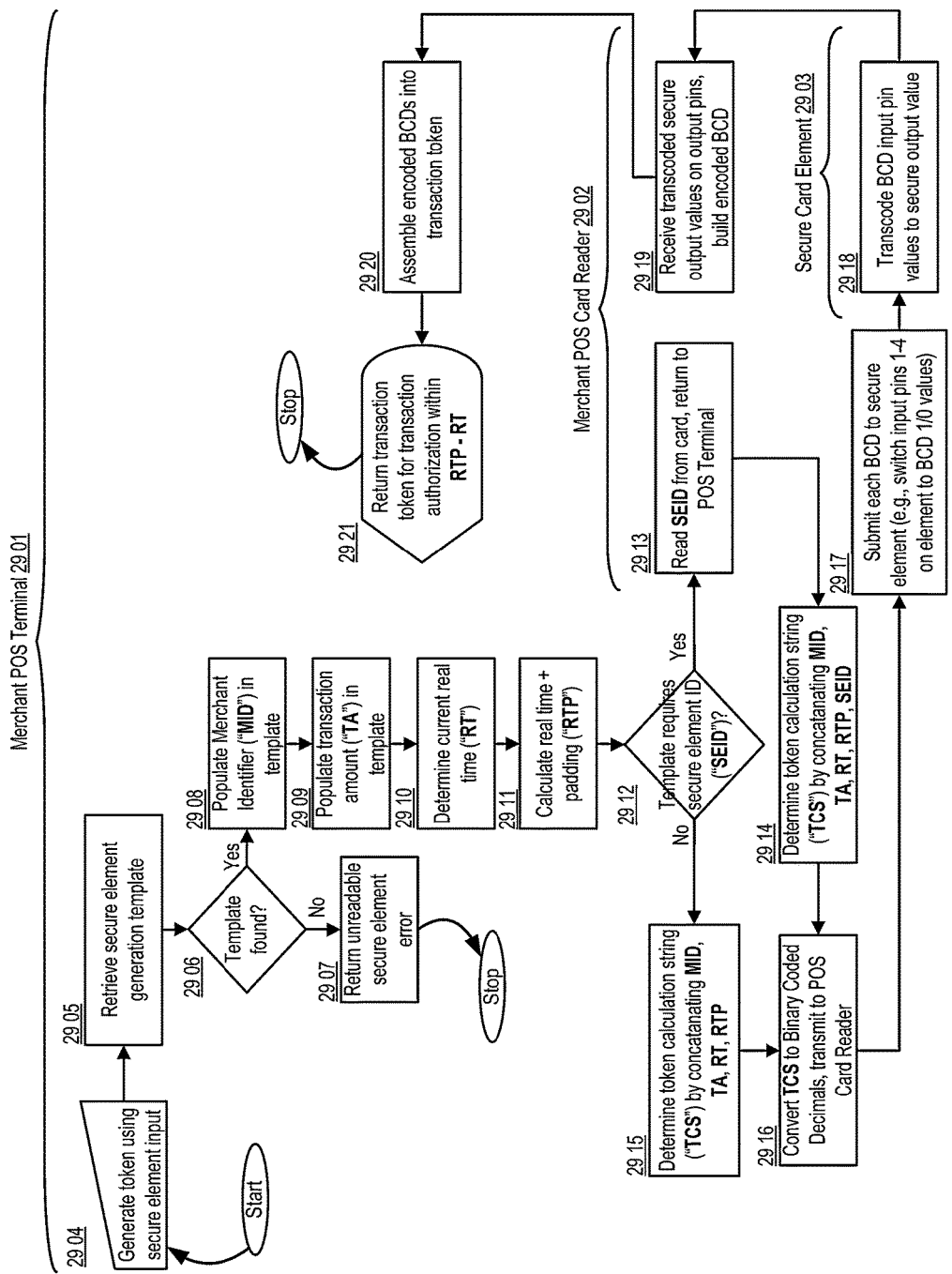
FIG. 29 shows an example logic flow illustrating secure card element transaction token generation, e.g., SCETG Component 2900, in one embodiment of the EAE.

FIG. 29 shows an example logic flow illustrating secure card element transaction token generation, e.g., SCETG Component 2900, in one embodiment of the EAE. In one embodiment, merchant point-of-sale terminal 2901 may initiate a request to generate a token using a secure element 2904. The merchant point-of-sale terminal may retrieve a secure element generation template 2905. If the template is not found 2906, and unreadable secure element error may be returned 2907. If the template is found, a merchant identifier may be populated in the template 2908, a transaction amount may be populated in the template 2909, and/or the like. In one embodiment, a current time is determined 2910, as well as a padding amount which may be a fixed or variable amount set by an administrator, which may be added to the determined time 2911 to determine a real time padding amount. In some embodiments, if the template requires a secure element identifier, 2912, the merchant POS terminal will request a point-of-sale card reader 2902 to read the secure element identifier from the card and return it to the point-of-sale terminal, 2913. An example secure element identifier, substantially in the form of XML is as follows:

```
<secure_element_id>
    <element id="KJHIUUYTUYTRYTGFTY" />
    <can_encrypt_received_values value="true" />
</secure_element_id>
```

In one embodiment, a token calculation string may be determined by concatenating the merchant identifier, the transaction amount, the current time, the padding, and secure element ID, e.g. 2914. In other embodiments, a token calculation string may be determined by concatenating the merchant identifier, the transaction amount, the time, and a padding factor, 2915. In one embodiment, the token calculation string is converted to binary coded decimals which are then transmitted to the point-of-sale card reader 2916. The point-of-sale card reader 2902 may then submit each binary coded decimal to the secure element 2903 for transcoding, e.g., 2917. An example submission for encoding, substantially in the form of XML is as follows:

```
<for_encryption type="bcd">
    <full_text value="EncryptionStringAccountNumReadCountVal" />
    <current_digit value="7" />
    <value>
        <bit number="1" value="0" />
        <bit number="2" value="1" />
        <bit number="3" value="0" />
        <bit number="4" value="1" />
    </value>
</for_encryption>
```

Secure card element 2903 may transcode each binary coded decimal input pin value to determine a secure output value represented by a value across output pins, e.g., 2918. An example secure output value, substantially in the form of XML is as follows:

```
<encrypted_output>
  <full_text value="EncryptionStringAccountNumReadCountVal" />
  <current_digit value="7" />
  <encrypted_value>
    <bit number="1" value="1" />
    <bit number="2" value="1" />
    <bit number="3" value="1" />
    <bit number="4" value="0" />
  </encrypted_value>
</encrypted_output>
```

In one embodiment, the point-of-sale card reader 2902 may receive the transcoded secure output values on the output pins and build an encoded binary coded decimal stream 2919. In one embodiment, the encoded binary coded decimals may be assembled into an transaction token 2920 which is then returned for transaction authorization within the specified time period 2921. In other embodiments, the merchant POS terminal may receive the entire token as an encrypted value from the secure element in one exchange and need not aggregate the results from multiple secure element input/output operations (e.g., as a complete token value and not as an ordered stream of bits, digits, and/or the like).

EAE Controller

FIG. 30 shows a block diagram illustrating embodiments of a EAE controller. In this embodiment, the EAE controller 3001 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 3003 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3029 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the EAE controller 3001 may be connected to and/or communicate with entities such as, but not limited to: one or more users from user input devices 3011; peripheral devices 3012; an optional cryptographic processor device 3028; and/or a communications network 3013.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The EAE controller 3001 may be based on computer systems that may comprise, but are not limited to, components such as: a computer systemization 3002 connected to memory 3029.

Computer Systemization

A computer systemization 3002 may comprise a clock 3030, central processing unit ("CPU(s)" and/or "processor(s)" (these terms are used interchangeable throughout the disclosure unless noted to the contrary)) 3003, a memory 3029 (e.g., a read only memory (ROM) 3006, a random access memory (RAM) 3005, etc.), and/or an interface bus 3007, and most frequently, although not necessarily, are all interconnected and/or communicating through a system bus 3004 on one or more (mother)board(s) 3002 having conductive and/or otherwise transportive circuit pathways through which instructions (e.g., binary encoded signals) may travel to effectuate communications, operations, storage, etc. The computer systemization may be connected to a power source 3086; e.g., optionally the power source may be internal. Optionally, a cryptographic processor 3026 and/or transceivers (e.g., ICs) 3074 may be connected to the system bus. In another embodiment, the cryptographic processor and/or transceivers may be connected as either internal and/or external peripheral devices 3012 via the interface bus I/O. In turn, the transceivers may be connected to antenna(s) 3075, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing EAE controller to determine its location)); Broadcom BCM4329FKUBG transceiver chip (e.g., providing 802.11n, Bluetooth 2.1+ EDR, FM, etc.); a Broadcom BCM4750UB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 3029 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the EAE controller and beyond through various interfaces. Should processing requirements dictate a greater amount speed and/or capacity, distributed processors (e.g., Distributed EAE), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the EAE may be achieved by implementing a microcontroller such as CAST's R8051XC2 microcontroller; Intel's MCS 51 (i.e., 8051 microcontroller); and/or the like. Also, to implement certain features of the EAE, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the EAE component collection (distributed or otherwise) and/or features may be implemented via the microprocessor and/or via embedded components; e.g., via ASIC, coprocessor, DSP, FPGA, and/or the like. Alternately, some implementations of the EAE may be implemented with embedded components that are configured and used to achieve a variety of features or signal processing.

Depending on the particular implementation, the embedded components may include software solutions, hardware solutions, and/or some combination of both hardware/software solutions. For example, EAE features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the EAE features. A hierarchy of programmable interconnects allow logic blocks to be interconnected as needed by the EAE system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the EAE may be developed on regular FPGAs and then migrated into a fixed version that more resembles ASIC implementations. Alternate or coordinating implementations may migrate EAE controller features to a final ASIC instead of or in addition to FPGAs. Depending on the implementation all of the aforementioned embedded components and microprocessors may be considered the "CPU" and/or "processor" for the EAE.

Power Source

The power source 3086 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3086 is connected to at least one of the interconnected subsequent components of the EAE thereby providing an electric current to all subsequent components. In one example, the power source 3086 is connected to the system bus component 3004. In an alternative embodiment, an outside power source 3086 is provided through a connection across the I/O 3008 interface. For example, a USB and/or IEEE 1394 connection carries both data and power across the connection and is therefore a suitable source of power.

Interface Adapters

Interface bus(ses) 3007 may accept, connect, and/or communicate to a number of interface adapters, conventionally although not necessarily in the form of adapter cards, such as but not limited to: input output interfaces (I/O) 3008, storage interfaces 3009, network interfaces 3010, and/or the like. Optionally, cryptographic processor interfaces 3027 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3009 may accept, communicate, and/or connect to a number of storage devices such as, but not limited to: storage devices 3014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3010 may accept, communicate, and/or connect to a communications network 3013. Through a communications network 3013, the EAE controller is accessible through remote clients 3033b (e.g., computers with web browsers) by users 3033a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed EAE), architectures may similarly be employed to pool, load balance, and/or otherwise increase the communicative bandwidth required by the EAE controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 3010 may be used to engage with various communications network types 3013. For example, multiple network interfaces may be employed to allow for the communication over broadcast, multicast, and/or unicast networks.

Input Output interfaces (I/O) 3008 may accept, communicate, and/or connect to user input devices 3011, peripheral devices 3012, cryptographic processor devices 3028, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 3011 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 3012 may be connected and/or communicate to I/O and/or other facilities of the like such as network interfaces, storage interfaces, directly to the interface bus, system bus, the CPU, and/or the like. Peripheral devices may be external, internal and/or part of the EAE controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the EAE controller may be embodied as an embedded, dedicated, and/or monitor-less (i.e., headless) device, wherein access would be provided over a network interface connection.

Cryptographic units such as, but not limited to, microcontrollers, processors 3026, interfaces 3027, and/or devices 3028 may be attached, and/or communicate with the EAE controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400)

line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 3029. However, memory is a fungible technology and resource, thus, any number of memory embodiments may be employed in lieu of or in concert with one another. It is to be understood that the EAE controller and/or a computer systemization may employ various forms of memory 3029. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 3029 will include ROM 3006, RAM 3005, and a storage device 3014. A storage device 3014 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 3029 may contain a collection of program and/or database components and/or data such as, but not limited to: operating system component(s) 3015 (operating system); information server component(s) 3016 (information server); user interface component(s) 3017 (user interface); Web browser component(s) 3018 (Web browser); database(s) 3019; mail server component(s) 3021; mail client component(s) 3022; cryptographic server component(s) 3020 (cryptographic server); the EAE component(s) 3035; PTA component 3041; PTC component 3042; CloudNFC component 3043; TBR component 3044; SBT component 3045; SCETG component 3046 and/or the like (i.e., collectively a component collection). These components may be stored and accessed from the storage devices and/or from storage devices accessible through an interface bus. Although non-conventional program components such as those in the component collection, typically, are stored in a local storage device 3014, they may also be loaded and/or stored in memory such as: peripheral devices, RAM, remote storage facilities through a communications network, ROM, various forms of memory, and/or the like.

Operating System

The operating system component 3015 is an executable program component facilitating the operation of the EAE controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP/Win7 (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the EAE controller to communicate with other entities through a communications network 3013. Various communication protocols may be used by the EAE controller as a subcarrier transport mechanism for interaction, such as, but not limited to: multicast, TCP/IP, UDP, unicast, and/or the like.

Information Server

An information server component 3016 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the EAE controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the EAE database 3019, operating systems, other program components, user interfaces, Web browsers, and/or the like.

Access to the EAE database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the EAE. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the EAE as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 3017 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3018 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the EAE enabled nodes. The combined application may be nugatory on systems employing standard Web browsers.

Mail Server

A mail server component 3021 is a stored program component that is executed by a CPU 3003. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the EAE.

Access to the EAE mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3022 is a stored program component that is executed by a CPU 3003. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3020 is a stored program component that is executed by a CPU 3003, cryptographic processor 3026, cryptographic processor interface 3027, cryptographic processor device 3028, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the EAE may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the EAE component to engage in secure transactions if so desired. The cryptographic component facilitates the secure accessing of resources on the EAE and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The EAE Database

The EAE database component 3019 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the EAE database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the EAE database is implemented as a data-structure, the use of the EAE database 3019 may be integrated into another component such as the EAE component 3035. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 3019 includes several tables 3019a-s. A Users table 3019a may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a EAE. A Devices table 3019b may include fields such as, but not limited to: device_ID, device_name, device_IP, device_GPS, device_MAC, device_serial, device_ECID, device_UDID, device_browser, device_type, device_model, device_version, device_OS, device_apps_list, device_securekey, wallet_app_installed_flag, and/or the like. An Apps table 3019c may include fields such as, but not limited to: app_ID, app_name, app_type, app_dependencies, app_access_code, user_pin, and/or the like. An Accounts table 3019d may include fields such as, but not limited to: account_number, account_security_code, account_name, issuer_acquirer_flag, issuer_name, acquirer_name, account_address, routing_number, access_API_call, linked_wallets_list, and/or the like. A Merchants table 3019e may include fields such as, but not limited to: merchant_id, merchant_name, merchant_address, store_id, ip_address, mac_address, auth_key, port_num, security_settings_list, and/or the like. An Issuers table 3019f may include fields such as, but not limited to: issuer_id, issuer_name, issuer_address, ip_address, mac_address, auth_key, port_num, security_settings_list, and/or the like. An Acquirers table 3019g may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 3019h may include fields such as, but not limited to: gateway_ID, gateway_IP, gateway_MAC, gateway_secure_key, gateway_access_list, gateway_API_call_list, gateway_services_list, and/or the like. A Shop Sessions table 3019i may include fields such as, but not limited to: user_id, session_id, alerts_URL, timestamp, expiry_lapse, merchant_id, store_id, device_type, device_ID, device_IP, device_MAC, device_browser, device_serial, device_ECID, device_model, device_OS, wallet_app_installed, total_cost, cart_ID_list, product_params_list, social_flag, social_message, social_networks_list, coupon_lists, accounts_list, CVV2_lists, charge_ratio_list, charge_priority_list, value_exchange_symbols_list, bill_address, ship_address, cloak_flag, pay_mode, alerts_rules_list, and/or the like. A Transactions table 3019j may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority_account_ratio, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 3019k may include fields such as, but not limited to: batch_id, transaction_id_list, timestamp_list, cleared_flag_list, clearance_trigger_settings, and/or the like. A Ledgers table 3019l may include fields such as, but not limited to: request_id, timestamp, deposit_amount, batch_id, transaction_id, clear_flag, deposit_account, transaction_summary, payor_name, payor_account, and/or the like. A Products table 3019m may include fields such as, but not limited to: product_ID, product_title, product_attributes_list, product_price, tax_info_list, related_products_list, offers_list, discounts_list, rewards_list, merchants_list, merchant_availability_list, and/or the like. An Offers table 3019n may include fields such as, but not limited to: offer_ID, offer_title, offer_attributes_list, offer_price, offer_expiry, related_products_list, discounts_list, rewards_list, merchants_list, merchant_availability_list, and/or the like. A Behavior Data table 3019o may include fields such as, but not limited to: user_id, timestamp, activity_type, activity_location, activity_attribute_list, activity_attribute_values_list, and/or the like. An Analytics table 3019p may include fields such as, but not limited to: report_id, user_id, report_type, report_algorithm_id, report_destination_address, and/or the like. A Tokens table 3019q may include fields such as, but not limited to: token_id, bounded_token_flag, token_generation_time, merchant_id, transaction_id, user_id, token_value, token_key, and/or the like. A Tokens Parameters table 3019r may include fields such as, but not limited to: token_parameter_id, token_id, token_param_name, token_param_value, sub_token_param_id, param_description, and/or the like. A Secure elements table 3019s may include fields such as, but not limited to: secure element_id, token_ids, card_types, manufacturer, generation_value_range, secure_key, server_validation_ip_address, token_type_generated, and/or the like.

In one embodiment, the EAE database may interact with other database systems. For example, employing a distributed database system, queries and data access by search EAE component may treat the combination of the EAE database, an integrated data security layer database as a single database entity.

In one embodiment, user programs may contain various user interface primitives, which may serve to update the EAE. Also, various accounts may require custom database tables depending upon the environments and the types of clients the EAE may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3019a-s. The EAE may be configured to keep track of various settings, inputs, and parameters via database controllers.

The EAE database may communicate to and/or with other components in a component collection, including itself, and/or facilities of the like. Most frequently, the EAE database communicates with the EAE component, other program components, and/or the like. The database may contain, retain, and provide information regarding other nodes and data.

The EAEs

The EAE component 3035 is a stored program component that is executed by a CPU. In one embodiment, the EAE component incorporates any and/or all combinations of the aspects of the EAE that was discussed in the previous figures. As such, the EAE affects accessing, obtaining and the provision of information, services, transactions, and/or the like across various communications networks. The features and embodiments of the EAE discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the EAE's features and facilities, and in many cases reduce the costs, energy consumption/ requirements, and extend the life of EAE's underlying infrastructure; this has the added benefit of making the EAE more reliable. Similarly, many of the features and mechanisms are designed to be easier for users to use and access, thereby broadening the audience that may enjoy/employ and exploit the feature sets of the EAE; such ease of use also helps to increase the reliability of the EAE. In addition, the feature sets include heightened security as noted via the Cryptographic components 3020, 3026, 3028 and throughout, making access to the features and data more reliable and secure.

The EAE component may transform user enhanced security transaction authorization requests, via EAE components into transaction customized, session specific, time expiring transaction authorization tokens, and/or the like and use the EAE. In one embodiment, the EAE component 3035 takes inputs (e.g., cloud NFC request trigger 211; payment data 215; wallet access input 911; transaction authorization input 914; payment gateway address 918; payment network address 922; issuer server address(es) 925; funds authorization request(s) 926; user(s) account(s) data 928; batch data 1112; payment network address 1116; issuer server address(es) 1124; individual payment request 1125; payment ledger, merchant account data 1131; purchase initiation input 205, purchase execution request 206, transaction bounding token request 208, bounded token transaction authorization request 211, chip/pin transaction payment input 302, hybrid bounded token transaction request 307, purchase authorization request 309, and/or the like) etc., and transforms the inputs via various components (e.g., SCETG 3046, SBT 3045, TBR 3044, EAE 3043, CloudNFC 3043; PTC 3042; PTA 3041; and/or the like), into outputs (e.g., NFC data request 213; cloud NFC data response 217; NFC signal transmission 219; card authorization request 916, 923; funds authorization response(s) 930; transaction authorization response 932; batch append data 934; purchase receipt 935; batch clearance request 1114; batch payment request 1118; transaction data 1120; individual payment confirmation 1128, 1129; updated payment ledger, merchant account data 1133; purchase execution response 214, transaction bounding token response 210, bounded token transaction authorization response 213, hybrid bounded token transaction response 311, purchase authorization response 310, purchase approval output 312 and/or the like).

The EAE component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery (UI); MooTools; Prototype; script.acu-lo.us; Simple Object Access Protocol (SOAP); SWFObject; Yahoo! User Interface; and/or the like), WebObjects, and/or the like. In one embodiment, the EAE server employs a cryptographic server to encrypt and decrypt communications. The EAE component may communicate to and/or with other components in a component collection, including itself, and/or facilities of the like. Most frequently, the EAE component communicates with the EAE database, operating systems, other program components, and/or the like. The EAE may contain, communicate, generate, obtain, and/or provide program component, system, user, and/or data communications, requests, and/or responses.

Distributed EAEs

The structure and/or operation of any of the EAE node controller components may be combined, consolidated, and/ or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the EAE controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the EAE controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//set ip address and port to listen to for incoming data
$address = '192.168.0.100';
$port = 255;
//create a server-side SSL socket, listen
//for/accept incoming communication
$sock = socket_create(AF_INET, SOCK_STREAM, 0);
socket_bind($sock, $address, $port)
    or die('Could not bind to address');
socket_listen($sock);
$client = socket_accept($sock);
//read input data from client device in 1024 byte
//blocks until end of message
do {
    $input = "";
    $input = socket_read($client, 1024);
    $data .= $input;
} while($input != "");
```

-continued

```
// parse data to extract variables
$obj = json_decode($data, true);
// store input data in a database
mysql_connect("10.1.1.1",$srvr,$pass); // access database server
mysql_select("CLIENT_DB.SQL"); // select database to append
mysql_query("INSERT INTO UserTable (transmission) VALUES
($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Further embodiments of the EAE may include:

Embodiment A

A cloud-based in-store virtual wallet secure transaction processor-implemented method, comprising:
receiving, from a consumer device in proximity to a merchant point-of-sale terminal, a transaction bounding token associated with a purchase transaction authorization request;
providing the transaction bounding token to a payment network in lieu of a consumer card account number;
receiving an indication that the purchase transaction has been authorized.

Embodiment B

The method of embodiment A, additionally comprising:
transmitting a purchase transaction receipt to a device other than the consumer device, for delivery to the consumer device.

Embodiment C

The method of embodiment B, wherein the consumer device is one of a smart phone, a web browser and a virtual wallet.

Embodiment D

A secure element transaction bounding token generation method, comprising:
receiving, at a secure element, from a merchant point of sale terminal, a request to generate a transaction bounding token, wherein the request includes a sequence of binary coded decimals corresponding to payment transaction details;
for each binary coded decimal, generating an equivalent encoded binary coded decimal;

providing the sequence of generated encoded binary coded decimals in response to the request to generate a transaction bounding token.

Embodiment E

The method of embodiment D, wherein the transaction details are one of an item, an item list, a transaction amount, a consumer identifier, a merchant identifier, and a time bounding quantum.

Embodiment F

The method of embodiment D, wherein the binary coded decimals are communicated to the secure element for encoding via a plurality of input pins on the secure element.

Embodiment G

The method of embodiment D, wherein the encoded binary coded decimals are communicated from the secure element for encoding via a plurality of output pins on the secure element.

Embodiment H

The method of embodiment G, wherein the output pins are in communication with a merchant point of sale card reader.

In order to address various issues and advance the art, the entirety of this application for EAE (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a EAE individual and/or enterprise user, database configuration and/or relational model, data type, data transmission and/or network framework, syntax structure, and/or the like, various embodiments of the EAE, may be implemented that enable a great deal of flexibility and customization. For example, aspects of the EAE may be adapted for restaurant dining, online shopping, brick-and-mortar shopping, secured information processing, and/or the like. While various embodiments and discussions of the EAE have been directed to electronic purchase transactions, however, it is to be understood that the embodiments described herein may be readily configured and/or customized for a wide variety of other applications and/or implementations.

What is claimed is:

1. A cloud-based virtual wallet secure transaction processor-implemented method, comprising:

receiving, by a merchant computer, a purchase payment request from a consumer device in a transaction;

obtaining, by the merchant computer, transaction details including a payment amount from the purchase payment request;

determining, by the merchant computer, that a transaction bounding token is required to process the purchase payment request;

determining, by the merchant computer, a transaction bounding token type;

querying, by the merchant computer, a security digital certificate database for a token generation certificate based on the purchase payment request and the transaction bounding token type;

receiving, by the merchant computer, the token generation certificate;

transmitting, by the merchant computer, a transaction bounding token request including the token generation certificate and the transaction details to a third-party server, which determines that the token generation certificate matches a stored token generation certificate, and then generates the transaction bounding token;

receiving, by the merchant computer, the transaction bounding token from the third-party server, after the third-party server determines that the token generation certificate matches the stored token generation certificate;

providing, by the merchant computer, the transaction bounding token to a transaction security server in a transaction authorization request to process a payment for the transaction, wherein the transaction security server determines whether or not the transaction bounding token is valid for the transaction; and receiving, by the merchant computer, a transaction authorization response indicating whether the transaction is approved or declined, wherein the method further comprises:

signing, by the merchant computer, using a cryptographic key, a concatenated string comprising a merchant ID, a transaction amount, a consumer identifier, and a time of the transaction to form an encrypted string, wherein the encrypted string is included in the transaction token bounding request, and wherein the third-party server decrypts the encrypted string and generates the transaction bounding token based upon the decrypted encrypted string.

2. A cloud-based virtual wallet secure transaction processor-implemented method, comprising:

receiving, by a merchant computer, a purchase payment request from a consumer device in a transaction;

obtaining, by the merchant computer, transaction details including a payment amount from the purchase payment request;

determining, by the merchant computer, that a transaction bounding token is required to process the purchase payment request;

transmitting, by the merchant computer, a transaction bounding token request including a token generation certificate to a server, which then generates the transaction bounding token;

receiving, by the merchant computer, the transaction bounding token related to a payment account from the server after the server determines that the token generation certificate matches a stored token generation certificate, wherein the transaction bounding token sets boundaries for authorizing transactions on the payment account based upon transaction parameters, the boundaries associated with one or more of a certain length of time, a certain user, or a certain amount; and providing, by the merchant computer, the transaction bounding token to a transaction security server in a transaction authorization request to process the transaction, wherein the transaction security server approves the transaction after the transaction security server determines that the transaction parameters associated with the transaction satisfy the boundaries associated with the transaction bounding token;

receiving, by the merchant computer, a transaction authorization response indicating whether the transaction is approved or declined, and wherein the method also comprises:

querying a security digital certificate database for the token generation certificate based on the purchase payment request; and receiving the token generation certificate, wherein the token generation certificate is associated with the transaction bounding token, wherein the method further comprises:

signing, by the merchant computer, using a cryptographic key, a concatenated string comprising a merchant ID, a transaction amount, a consumer identifier, and a time of the transaction to form an encrypted string, wherein the encrypted string is included in the transaction token bounding request, and wherein the third-party server decrypts the encrypted string and generates the transaction bounding token based upon the decrypted encrypted string.

3. The method of claim 2, wherein the consumer device is a smart phone having a connection via NFC to a point-of-sale terminal.

4. The method of claim 2, wherein the transaction details additionally include an indication of the items for purchase and wherein the consumer device is a pin-and-chip card in communication with a smart phone having a connection via NFC to a point-of-sale terminal.

5. The method of claim 3, additionally comprising:
determining a type of transaction bounding token to generate, and wherein querying the security digital certificate database for the token generation certificate is based on the transaction bounding token type.

6. The method of claim 2, wherein the received purchase payment request is oblivious of any actual payment card credential.

7. The method of claim 3,
wherein the token generation certificate is received from a remote certificate database.

8. The method of claim 2, wherein the transaction bounding token is time bounded.

9. The method of claim 8, wherein the time bounded transaction bounding token may not be used to process the transaction after a time quantum has elapsed.

10. The method of claim 8, wherein the time bounded transaction bounding token may not be used to process the transaction until a time quantum has elapsed.

11. A cloud-based virtual wallet secure transaction processor-implemented system, comprising:

a processor; and a non-transitory computer readable medium comprising code, executable by the processor, for implementing a method comprising receiving a purchase payment request from a consumer device operated by a consumer;

obtaining transaction details including a payment amount from the purchase payment request;

determining that a transaction bounding token is required to process the purchase payment request;

transmitting a transaction bounding token request including a token generation certificate to a server, which then generates the transaction bounding token;

receiving the transaction bounding token related to a payment account of the consumer, wherein the transaction bounding token sets boundaries for authorizing transactions on the payment account based upon transaction parameters, the boundaries associated with one or more of a certain length of time, a certain user, or a certain amount from the server after the server determines that the token generation certificate matches a stored token generation certificate; and providing the transaction bounding token to a transaction security server in a transaction authorization request to process a transaction, wherein the transaction security server approves the transaction after the transaction security server determines that the transaction parameters associated with the transaction satisfy the boundaries associated with the transaction bounding token; and receiving a transaction authorization response indicating whether the transaction is approved or declined, and wherein the method also comprises querying a security digital certificate database for a generation certificate based on the purchase payment request; and receiving the token generation certificate, wherein the token generation certificate is associated with the transaction bounding token, wherein the method further comprises:

signing, by the merchant computer, using a cryptographic key, a concatenated string comprising a merchant ID, a transaction amount, a consumer identifier, and a time of the transaction to form an encrypted string, wherein the encrypted string is included in the transaction token bounding request, and wherein the third-party server decrypts the encrypted string and generates the transaction bounding token based upon the decrypted encrypted string.

12. The system of claim 11, wherein the consumer device is a smart phone having a connection via NFC to a point-of-sale terminal.

13. The system of claim 11, wherein the transaction details additionally include an indication of the items for purchase and wherein the consumer device is a pin-and-chip card in communication with a smart phone having a connection via NFC to a point-of-sale terminal.

14. The system of claim 12, wherein the method additionally comprises:

determining a type of transaction bounding token to generate, and wherein querying the security digital certificate database for the token generation certificate is based on the transaction bounding token type.

15. The system of claim 11, wherein the system comprises a merchant server.

16. The method of claim 2, wherein the purchase payment request is received from the consumer device by the merchant computer via the Internet.

17. The method of claim 2, wherein the boundaries include the certain length of time, the certain user, and the certain amount.

18. The method of claim 2, wherein the transaction is a remote transaction wherein the merchant computer is remote with respect to the consumer device.

19. The method of claim 1, wherein the transaction security server is the same as the third-party server.

20. The method of claim 1, wherein the transaction bounding token is decrypted by the transaction security server to determine an amount, which is compared with an amount in the transaction authorization request.

* * * * *